US010259562B2

(12) United States Patent
Beckman et al.

(10) Patent No.: US 10,259,562 B2
(45) Date of Patent: Apr. 16, 2019

(54) PROPELLER BLADE TRAILING EDGE FRINGES FOR IMPROVED SOUND CONTROL

(71) Applicant: Amazon Technologies, Inc., Seattle, WA (US)

(72) Inventors: Brian C. Beckman, Newcastle, WA (US); Gur Kimchi, Bellevue, WA (US); Allan Ko, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 608 days.

(21) Appl. No.: 14/975,274

(22) Filed: Dec. 18, 2015

(65) Prior Publication Data

US 2017/0174320 A1    Jun. 22, 2017

(51) Int. Cl.
*B64C 11/18*  (2006.01)
*B64C 11/20*  (2006.01)
*B64C 27/06*  (2006.01)

(52) U.S. Cl.
CPC .............. *B64C 11/18* (2013.01); *B64C 11/20* (2013.01); *B64C 27/06* (2013.01); *B64C 2201/024* (2013.01); *B64C 2201/108* (2013.01); *B64C 2201/128* (2013.01)

(58) Field of Classification Search
CPC ...... B64C 11/18; B64C 11/205; B64C 27/467
See application file for complete search history.

(56) References Cited

U.S. PATENT DOCUMENTS

| | | | |
|---|---|---|---|
| 1,946,129 A | 2/1934 | Joseph | |
| 2,049,832 A | 8/1936 | John | |
| 2,065,343 A | 12/1936 | Moore et al. | |
| 2,071,012 A * | 2/1937 | Adams | B64C 11/00 244/1 R |
| 2,650,752 A | 9/1953 | Hoadley | |

(Continued)

FOREIGN PATENT DOCUMENTS

| | | |
|---|---|---|
| CN | 105620727 A | 6/2016 |
| DE | 202011106150 U1 | 1/2012 |

(Continued)

OTHER PUBLICATIONS

International Search Report for PCT Application No. PCT/US2016/066706 dated Apr. 10, 2017.

(Continued)

*Primary Examiner* — Brian M O'Hara

(74) *Attorney, Agent, or Firm* — Athorus, PLLC

(57) ABSTRACT

Sounds are generated by an aerial vehicle during operation. For example, the motors and propellers of an aerial vehicle generate sounds during operation. Disclosed are systems, methods, and apparatus for actively adjusting the position of one or more propeller blade treatments of a propeller blade of an aerial vehicle during operation of the aerial vehicle. For example, the propeller blade may have one or more propeller blade treatments that may be adjusted between two or more positions. Based on the position of the propeller blade treatments, the airflow over the propeller is altered, thereby altering the sound generated by the propeller when rotating. By altering the propeller blade treatments on multiple propeller blades of the aerial vehicle, the different sounds generated by the different propeller blades may effectively cancel, reduce, and/or otherwise alter the total sound generated by the aerial vehicle.

20 Claims, 29 Drawing Sheets

(56) References Cited

U.S. PATENT DOCUMENTS

| | | |
|---|---|---|
| 3,092,558 A | 6/1963 | Hughes et al. |
| 3,559,923 A | 2/1971 | Moore |
| 3,776,363 A | 12/1973 | Kuethe |
| 3,853,428 A | 12/1974 | Hayden et al. |
| 4,687,691 A | 8/1987 | Kay |
| 5,533,865 A | 7/1996 | Dassen et al. |
| 5,540,406 A | 7/1996 | Occhipinti |
| 5,551,840 A | 9/1996 | Benoit et al. |
| 5,755,408 A | 5/1998 | Schmidt et al. |
| 5,785,282 A | 7/1998 | Wake et al. |
| 5,961,067 A | 10/1999 | Hall et al. |
| 6,161,800 A | 12/2000 | Liu et al. |
| 6,358,013 B1 | 3/2002 | Rose et al. |
| 6,671,590 B1 | 12/2003 | Betzina et al. |
| 7,413,408 B1 | 8/2008 | Tafoya |
| 7,604,461 B2 | 10/2009 | Bonnet |
| 7,878,457 B2 | 2/2011 | Narramore |
| 8,414,261 B2 | 4/2013 | Bonnet |
| 8,425,191 B2 | 4/2013 | Ali |
| 8,523,515 B2 | 9/2013 | Drobietz et al. |
| 8,535,008 B2 | 9/2013 | Dewar et al. |
| 8,870,124 B2 | 10/2014 | Ireland |
| 9,752,559 B2 | 9/2017 | Herr et al. |
| 2005/0163963 A1 | 7/2005 | Munro et al. |
| 2006/0060721 A1 | 3/2006 | Watts et al. |
| 2006/0263223 A1 | 11/2006 | Gustafson et al. |
| 2008/0080977 A1 | 4/2008 | Bonnet |
| 2008/0166241 A1* | 7/2008 | Herr .................. F03D 1/065 416/241 R |
| 2008/0217485 A1 | 9/2008 | Ikeda |
| 2008/0243313 A1 | 10/2008 | Schaeffer |
| 2008/0286110 A1 | 11/2008 | Gupta et al. |
| 2010/0266416 A1 | 10/2010 | Marshall et al. |
| 2010/0329879 A1 | 12/2010 | Presz et al. |
| 2011/0015034 A1 | 1/2011 | Ehinger et al. |
| 2011/0041494 A1 | 2/2011 | Parker et al. |
| 2011/0142628 A1 | 6/2011 | Xiong |
| 2011/0223030 A1 | 9/2011 | Huck et al. |
| 2011/0229321 A1 | 9/2011 | Kilaras |
| 2011/0260008 A1 | 10/2011 | Smith |
| 2011/0262705 A1 | 10/2011 | Gupta et al. |
| 2014/0186188 A1 | 7/2014 | Takeuchi |
| 2014/0248148 A1 | 9/2014 | Abdallah et al. |
| 2014/0312166 A1 | 10/2014 | Zhu |
| 2015/0050154 A1 | 2/2015 | Dixon et al. |
| 2016/0131108 A1 | 5/2016 | Shimura et al. |
| 2017/0276117 A1 | 9/2017 | Church |

FOREIGN PATENT DOCUMENTS

| | | |
|---|---|---|
| EP | 2774843 A1 | 9/2014 |
| WO | 2010028653 A3 | 9/2010 |
| WO | 2012110267 A1 | 8/2012 |

* cited by examiner

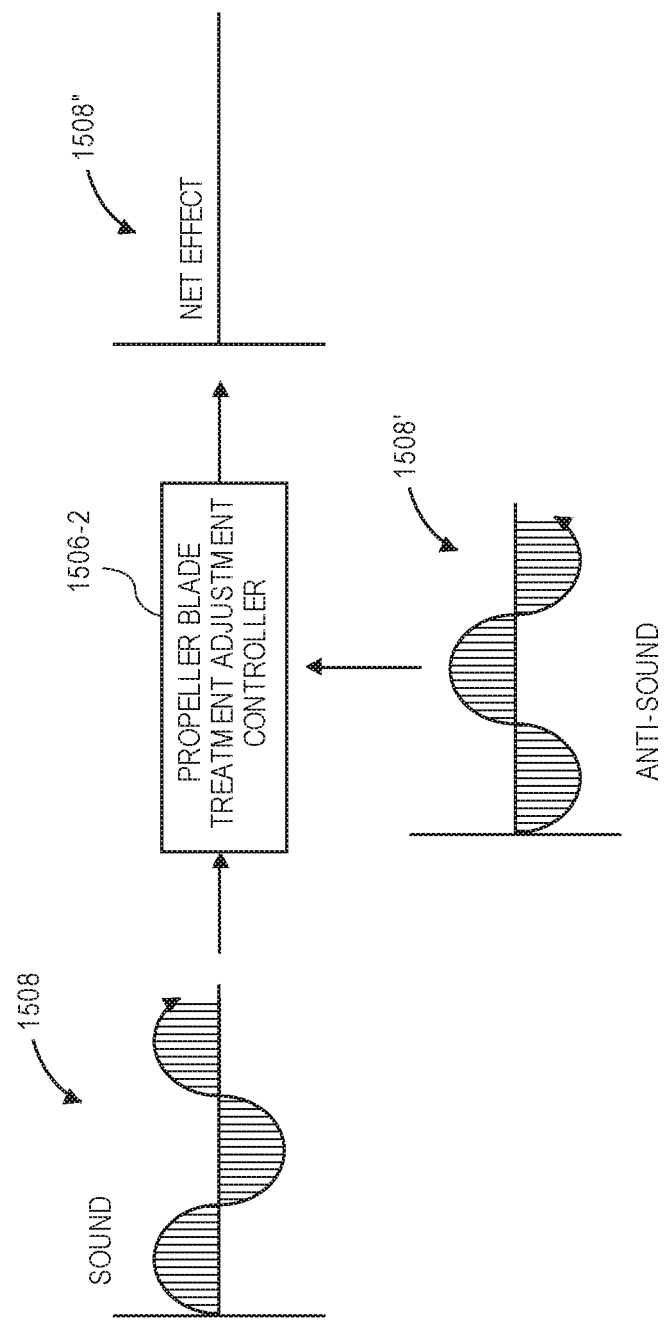

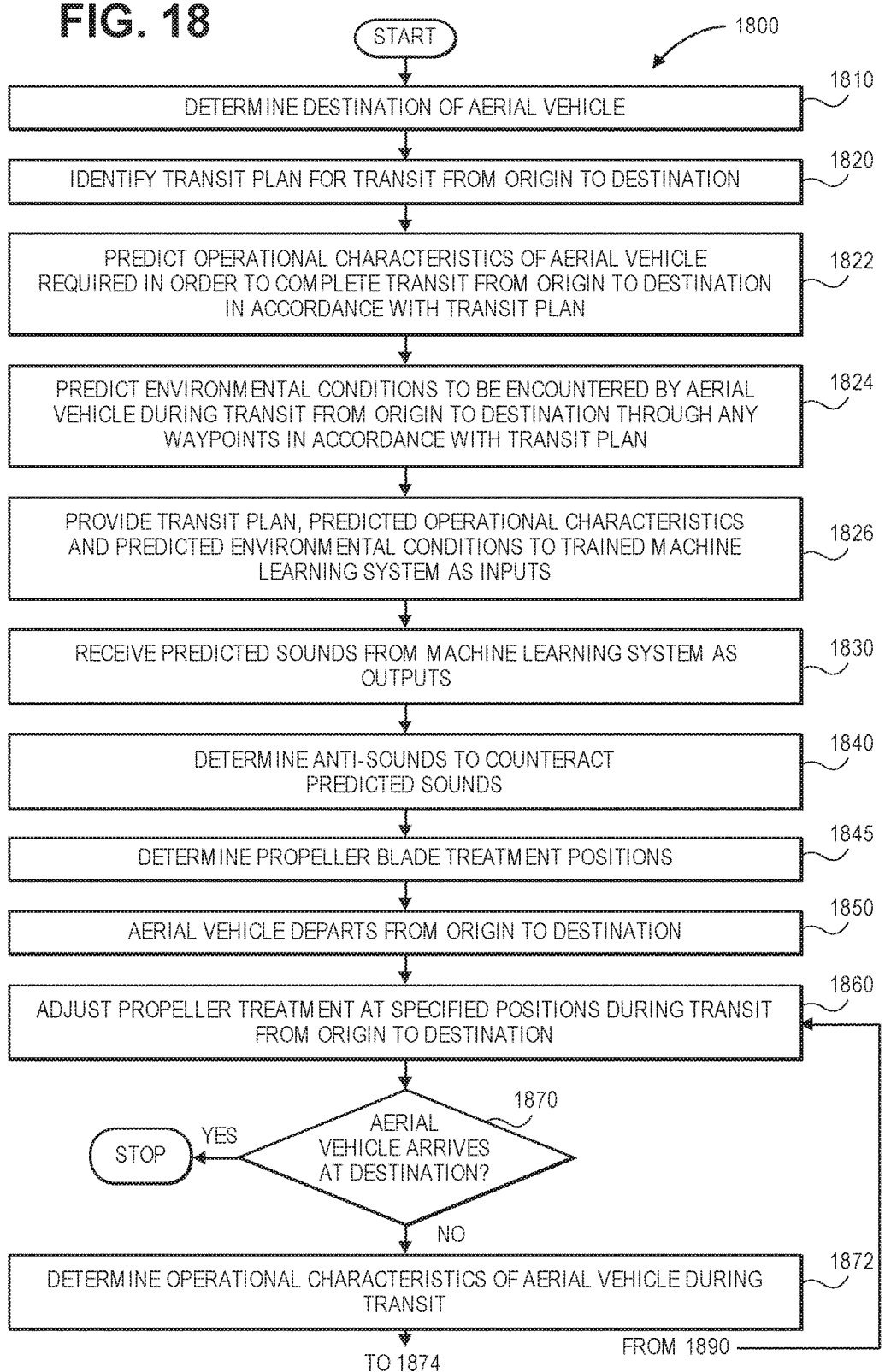

PROPELLER BLADE TRAILING EDGE FRINGES FOR IMPROVED SOUND CONTROL

BACKGROUND

Vehicle traffic around residential areas continues to increase. Historically, vehicle traffic around homes and neighborhoods was primarily limited to automobile traffic. However, the recent development of aerial vehicles, such as unmanned aerial vehicles, has resulted in a rise of other forms of vehicle traffic. For example, hobbyists may fly unmanned aerial vehicles in and around neighborhoods, often within a few feet of a home. Likewise, there is discussion of electronic-commerce retailers, and other entities, delivering items directly to a user's home using unmanned aerial vehicles. As a result, such vehicles may be invited to navigate into a backyard, near a front porch, balcony, patio, and/or other locations around the residence to complete delivery of packages.

BRIEF DESCRIPTION OF THE DRAWINGS

FIGS. 15A-15D are block diagrams illustrating active airborne sound control, according to an implementation.

DETAILED DESCRIPTION

Figure 1:
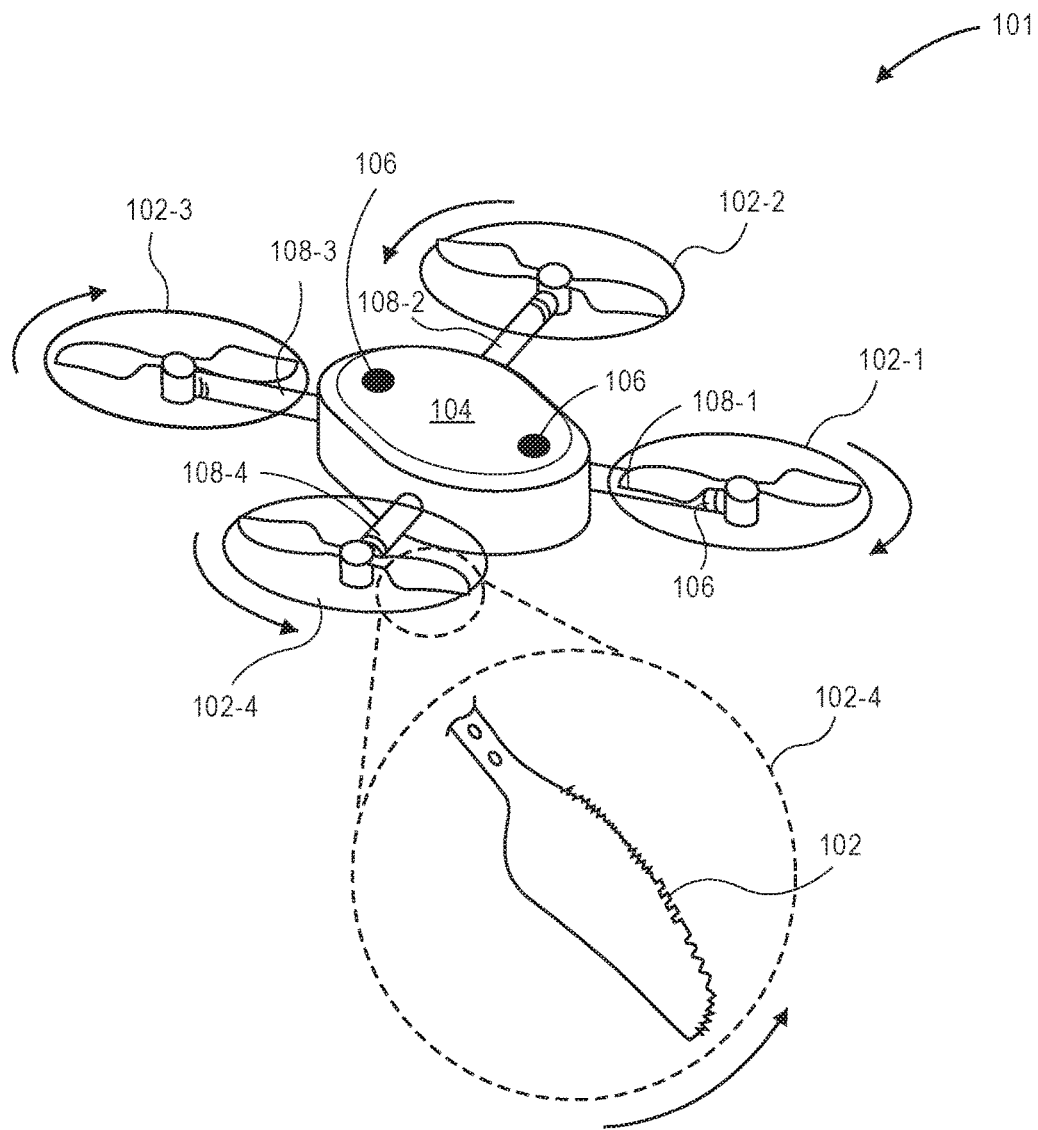
FIG. 1 is a view of an aerial vehicle, according to an implementation.

The present disclosure is directed to controlling, reducing, and/or altering sound generated by an aerial vehicle, such as an unmanned aerial vehicle ("UAV"), while the aerial vehicle is airborne. For example, one or more propellers of the aerial vehicle include propeller blade treatments that alter the sound generated by the propeller. For example, the propeller blade treatments may disrupt the airflow around the propeller blades as they rotate and/or absorb sound generated by the propeller blade as it rotates. By using propellers with different propeller blade treatments on the same aerial vehicle, the propellers may generate sounds that destructively interfere with each other, thereby reducing or altering the overall sound generated by the aerial vehicle. Likewise, some of the propeller blade treatments, in addition to altering the sound, reduce and/or otherwise alter the total sound generated by a propeller.

A propeller blade may include propeller blade treatments along one or more portions of the propeller blade. For example, the propeller blade may only include propeller blade treatments along the leading edge of the propeller blade. In other implementations, the propeller blade treatments may be along the leading edge, on an upper surface area of the propeller blade, on a lower surface area of the propeller blade, on a trailing edge of the propeller blade, on the tip of the propeller blade, or any combination thereof.

The propeller blade treatments may be of any variety of sizes and/or shapes, and may extend from or conform to the propeller blade in a variety of manners. For example, some propeller blade treatments may extend from the propeller blade in a direction that includes a vertical component and/or a horizontal component with respect to the surface area of the propeller blade. Alternatively, or in addition thereto, some of the propeller blade treatments may extend into the propeller blade. In some implementations, some or all of the propeller blade treatments may be moved or activated while the propeller is rotating. For example, the propeller may include a propeller blade treatment adjustment controller that retracts and/or extends one or more of the propeller blade treatments. When one or more propeller blade treatments are moved, the sound generated by the rotating propeller is altered. Propeller blade treatments that may be moved (e.g., retracted, extended, shifted, or rotated) are sometimes referred to herein as active propeller blade treatments.

In some implementations, one or more sensors may be positioned on the aerial vehicle that measure sound generated by or around the aerial vehicle. Based on the measured sound, the position of the one or more of the propeller blade treatments of a propeller blade on the aerial vehicle may be altered to generate an anti-sound that, when combined with the sound generated by the aerial vehicle, alters the sound generated by the aerial vehicle. For example, a processor of the aerial vehicle may maintain information relating to the different sounds generated by different propeller blade treatment positions. Based on the measured sound and the desired rotational speed of the propeller, propeller blade treatment positions are selected that will result in the propeller generating an anti-sound as it rotates that will cancel out, reduce, and/or otherwise alter the measured sound when the propeller is rotating at the desired rotational speed.

In another example, some propeller blade treatments, rather than being designed to generate a specific anti-sound, may dampen, reduce, and/or otherwise alter the sound generated by the propeller blade as it rotates. For example, the propeller blade may include fringes (a type of propeller blade treatment) that can be retracted or extended from the trailing edge of the propeller blade. When the fringes are extended, the fringes alter the airflow and dampen, reduce, and/or otherwise alter the sound generated by the propeller blade as the propeller passes through the air.

In some implementations, measured sounds may be recorded along with and/or independently of other operational and/or environmental data. Such information or data may include, but is not limited to, extrinsic information or data, e.g., information or data not directly relating to the aerial vehicle, or intrinsic information or data, e.g., information or data relating to the aerial vehicle itself. For example, extrinsic information or data may include, but is not limited to, environmental conditions (e.g., temperature, pressure, humidity, wind speed, and wind direction), times of day or days of a week, month or year when an aerial vehicle is operating, measures of cloud coverage, sunshine, surface conditions or textures (e.g., whether surfaces are wet, dry, covered with sand or snow or have any other texture) within a given environment, a phase of the moon, ocean tides, the direction of the earth's magnetic field, a pollution level in the air, a particulates count, or any other factors within the given environment. Intrinsic information or data may include, but is not limited to, operational characteristics (e.g., dynamic attributes such as altitudes, courses, speeds, rates of climb or descent, turn rates, or accelerations; or physical attributes such as dimensions of structures or frames, numbers of propellers or motors, operating speeds of such motors) or tracked positions (e.g., latitudes and/or longitudes) of the aerial vehicles. In accordance with the present disclosure, the amount, the type and the variety of information or data that may be captured and collected regarding the physical or operational environments in which aerial vehicles are operating and correlated with information or data regarding measured sounds is theoretically unbounded.

The extrinsic information or data and/or the intrinsic information or data captured by aerial vehicles during flight may be used to train a machine learning system to associate an aerial vehicle's operations or locations, or conditions in such locations, with sounds generated by the aerial vehicle. The trained machine learning system, or a sound model developed using such a trained machine learning system, may then be used to predict sounds that may be expected when an aerial vehicle operates in a predetermined location, or subject to a predetermined set of conditions, at given velocities or positions, or in accordance with any other characteristics. Once such sounds are predicted, propeller blade treatment positions that will result in the propellers generating anti-sounds are determined. An anti-sound, as used herein, refers to sounds having amplitudes and frequencies that are approximately but not exclusively opposite and/or approximately but not exclusively out-of-phase with the predicted or measured sounds (e.g., having polarities that are reversed with respect to polarities of the predicted sounds). During airborne operation of the aerial vehicle, the propellers blade treatments are positioned so that the propellers will generate the anti-sound. When the anti-sounds are generated by the propeller blades, such anti-sounds effectively modify the effects of some or all of the predicted sounds at those locations. In this regard, the systems and methods described herein may be utilized to effectively control, reduce, and/or otherwise alter the sounds generated by aerial vehicles during flight.

FIG. 1 is a view of an aerial vehicle 101 configured for sound control including propeller blade treatments on one or more of the propellers 102-1, 102-2, 102-3, and 102-4. The propellers 102-1, 102-2, 102-3, and 102-4 are powered by propeller motors and spaced about a body 104 of the aerial vehicle 101 as part of a propulsion system. A control system (not shown), which may be positioned within the body 104, is utilized for controlling the propeller motors for flying the aerial vehicle 101, as well as controlling other operations of the aerial vehicle 101. Each of the propeller motors may be rotated at different speeds, thereby generating different lifting forces by the different propellers 102.

The motors may be of any type and of a size sufficient to rotate the propellers 102 at speeds sufficient to generate enough lift to aerially propel the aerial vehicle 101 and any items engaged by the aerial vehicle 101 so that the aerial vehicle 101 can navigate through the air, for example, to deliver an item to a location. As discussed further below, the outer body or surface area of each propeller 102 may be made of one or more suitable materials, such as graphite, carbon fiber, etc. While the example of FIG. 1 includes four motors and propellers, in other implementations, more or fewer motors and/or propellers may be utilized for the propulsion system of the aerial vehicle 101. Likewise, in some implementations, the motors and/or propellers may be positioned at different locations and/or orientations on the aerial vehicle 101. Alternative methods of propulsion may also be utilized in addition to the propellers and propeller motors. For example, engines, fans, jets, turbojets, turbo fans, jet engines, and the like may be used in combination with the propellers and propeller motors to propel the aerial vehicle.

The body 104 or frame of the aerial vehicle 101 may be of any suitable material, such as graphite, carbon fiber, and/or aluminum. In this example, the body 104 of the aerial vehicle 101 includes four motor arms 108-1, 108-2, 108-3, and 108-4 that are coupled to and extend from the body 104 of the aerial vehicle 101. The propellers 102 and corresponding propeller motors are positioned at the ends of each motor arm 108. In some implementations, all of the motor arms 108 may be of approximately the same length while, in other implementations, some or all of the motor arms may be of different lengths. Likewise, the spacing between the two sets of motor arms may be approximately the same or different.

In some implementations, one or more sensors 106 configured to measure sound at the aerial vehicle are included on the aerial vehicle 101. The sensors 106 may be at any location on the aerial vehicle 101. For example, a sensor 106 may be positioned on each motor arm 108 and adjacent to the propeller 102 and/or propeller motor so that different sensors can measure different sounds generated at or near the different propellers 102. In another example, one or more sensors may be positioned on the body 104 of the aerial vehicle 101. The sensors 106 may be any type of sensors capable of measuring sound and/or sound waves. For example, the sensor may be a microphone, transducer, piezoelectric sensor, an electromagnetic pickup, an accelerometer, an electro-optical sensor, an inertial sensor, etc.

As discussed in further detail below, one or more of the propellers 102 may include propeller blade treatments. In some implementations, some or all of the propeller blade treatments may be adjustable during operation of the aerial vehicle (i.e., active propeller blade treatments). As the position of the propeller blade treatments changes, different sounds are generated by the propeller as it rotates. In other implementations, the propeller blade treatments may be part of the propeller blade. In such implementations, the overall shape of the propeller blade and included propeller blade treatments may be designed such that the propeller will generate a particular sound when the propeller is rotating. In such a configuration, the different propellers of the aerial vehicle may be designed to generate different sounds. The different sounds generated by the different propellers may be selected such that they cause destructive or constructive interference with other sounds generated by other propellers and/or the aerial vehicle such that, when the sounds combine, the net effect is no sound, reduced sound, and/or otherwise altered sound.

In some implementations, some or all of the propellers may include propeller blade adjustment controllers. Likewise, some or all of the propeller blade adjustment controllers may be affixed to the propellers. Alternatively, some or all of the propeller blade adjustment controllers may be moveable or otherwise adjusted during operation of the aerial vehicle and rotation of the propeller blade.

In some implementations, by measuring sounds at or near each propeller 102 and altering the position of propeller blade treatments of each respective propeller 102 to generate anti-sounds, the measured sounds and anti-sounds at each propeller are independent. Accordingly, each sensor and propeller may operate independent of other sensors and propellers on the aerial vehicle and each may include its own processing and/or memory for operation. Alternatively, one or more sensors 106 positioned on the body 104 of the aerial vehicle may measure generated sounds and a propeller blade adjustment controller may send instructions to different propellers to cause the positions of different propeller blade treatments to be altered, thereby generating different anti-sounds.

While the implementations of the aerial vehicle discussed herein utilize propellers to achieve and maintain flight, in other implementations, the aerial vehicle may be configured in other manners. For example, the aerial vehicle may be a combination of both propellers and fixed wings. In such configurations, the aerial vehicle may utilize one or more propellers to enable takeoff, landing, and anti-sound generation and a fixed wing configuration or a combination wing and propeller configuration to sustain flight while the aerial vehicle is airborne. In some implementations, one or more of the propulsion mechanisms (e.g., propellers and motors) may have a variable axis such that it can rotate between vertical and horizontal orientations.

Figure 2A:
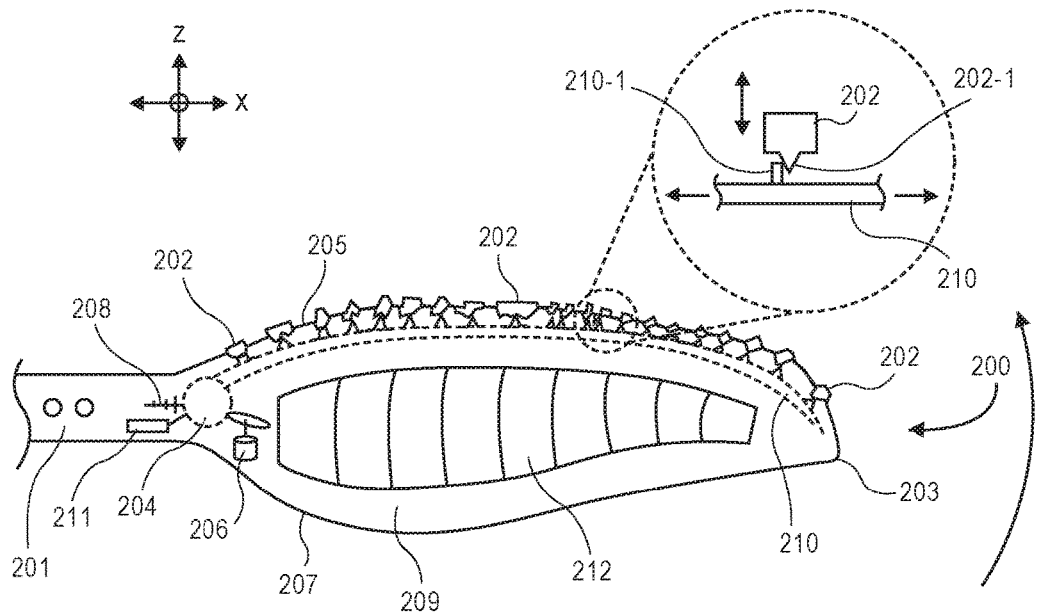
FIG. 2A is a top-down view of a propeller blade with propeller blade treatments, according to an implementation.

FIG. 2A illustrates a top-down view of a propeller blade 200 that includes propeller blade treatments 202 along the leading edge of the propeller blade, according to an implementation. The propeller blade includes a hub 201, a tip 203, a leading edge 205, a trailing edge 207, and a surface area 209 that extends between the hub 201, the tip 203, the leading edge 205, and the trailing edge 207. As used herein, the term "hub" (e.g., 201) refers to the portion of the blade (e.g., 200) opposite the tip (e.g., 203) where the blade is mounted to a motor or other propulsion device (not shown). The term hub shall not be limited to any particular mounting structure, circular or otherwise. The surface area includes an upper or top surface area, which is viewable in the example illustrated in FIG. 2A, and a lower or bottom surface area that is opposite the upper surface area.

In this implementation, the propeller blade treatments 202 extend along the leading edge 205 and may be adjusted in a direction that includes a horizontal component and/or a vertical component with respect to a surface area 209 of the propeller blade 200. For example, the propeller blade may include a propeller blade treatment adjustment controller 211, which includes an actuator 210, also referred to as an adjustment arm. The components of the propeller blade treatment adjustment controller 211 may be incorporated into the propeller blade 200 and positioned such that the actuator 210 contacts one or more of the propeller blade treatments and is configured to move or reposition the propeller blade treatments 202. For example, the propeller blade treatment adjustment controller 211 may include a drive mechanism 204, such as a servo motor, that moves the actuator 210. As illustrated in the expanded view, the actuator may include one or more protrusions 210-1 that move as the actuator is moved by the drive mechanism. As the protrusions 210-1 move, they contact one or more ridges 202-1 of the propeller blade treatments 202, thereby causing the propeller blade treatments 202 to move from a first position to a second position. As each propeller blade treatment moves positions, the sound generated by the propeller as it rotates is altered because the airflow is disrupted.

In some implementations, movement of the actuator 210 may be based on the rotational speed of the propeller. For example, the drive mechanism may be a counterweight that moves with an increase in the centrifugal force generated by the rotation of the propeller blade 200. As the counterweight moves, it causes the actuator 210 to move, thereby altering the position of one or more propeller blade treatments. In other implementations, the propeller blade treatment adjustment controller 211 may be powered by one or more power supplies 206 and the drive mechanism 204 may adjust the position of the actuator based on instructions received from the propeller blade treatment adjustment controller 211. For example, the propeller blade treatment adjustment controller 211 may include a processor and memory that includes a table of different propeller blade treatment positions and resultant sounds that are generated when the propeller is rotated. The propeller blade treatment adjustment controller 211 may also receive information and/or instructions through a wireless communication component 208, such as an antenna, and determine positions for each of the propeller blade treatments of the propeller blade. For example, the propeller blade treatment adjustment controller 211 may receive position information, environmental information, and/or operational information and determine a predicted sound that is expected based on that information. For the predicted sound, propeller blade treatment positions are determined that will cause the propeller to generate an anti-sound when rotated. In another example, the position of propeller blade treatments may be selected that will dampen, reduce, and/or otherwise alter the sound, such as by altering the relative and/or absolute amplitudes of various frequency components of the sound.

In other implementations, the propeller blade treatment adjustment controller 211 may receive additional or less information and determine positions for propeller blade treatments. In some implementations, the propeller blade treatment adjustment controller 211 may receive instructions for each propeller blade treatment position. In still another example, the propeller blade treatment adjustment controller 211 may receive a predicted sound, for example, from a sensor positioned on the aerial vehicle, determine an anti-sound, and select propeller blade treatment positions that will cause the propeller to generate the anti-sound when rotated and/or dampen or alter the predicted sound.

While the illustrated example shows the propeller blade treatment adjustment controller controlling a single drive mechanism and actuator of a propeller blade 200, in some implementations, the propeller blade treatment adjustment controller may be coupled to and control multiple drive mechanisms, adjustment controllers, and corresponding propeller blade treatments for multiple propeller blades. For example, a propeller of an aerial vehicle may include one, two, three, four, five, or any number and/or shape of propeller blades. One or more of the propeller blades may include a drive mechanism 204, actuator 210, and propeller blade treatments, all of which may be controlled by the propeller blade treatment adjustment controller. Likewise, one or more of the propeller blades 200 may include a power supply 206 and/or a power source. In this example, the power source is a series of solar panels 212 that collect solar energy for use in powering the propeller blade treatment adjustment controller 211 and drive mechanism 204. Likewise, the energy collected by the solar panels 212 may be stored in one or more fuel cells 206, such as a battery.

While the example illustrated in FIG. 2A includes a drive mechanism 204 and actuator 210 in the form of an adjustable arm that may be moved by the drive mechanism, it will be appreciated that any variety of techniques may be used to alter the positions of the adjustable propeller blade treatments. For example, an actuator, such as a piezoelectric actuator, servo motor, pneumatics, solenoid, etc., may be positioned at or coupled to each propeller blade treatment and configured to receive instructions from the propeller blade treatment adjustment controller 211 as to a position for the propeller blade treatment. For example, if the actuator 210 is a piezoelectric actuator positioned adjacent a propeller blade treatment, when activated, it may cause the propeller blade treatment to move in a direction that includes a horizontal component and/or a vertical component with respect to the surface area of the propeller blade.

It will be appreciated that, in some implementations, the propeller blade treatment adjustment controller may be fully or partially contained within the surface area or outer body of the propeller blade and may not be externally visible, except for the propeller blade treatments that protrude from the propeller blade.

Figure 2B:
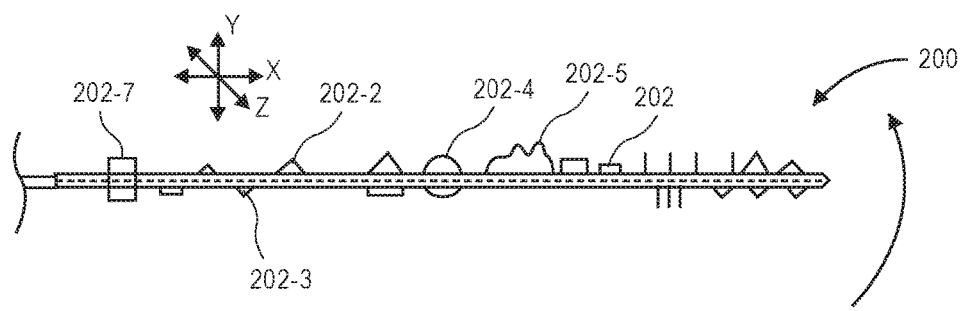
FIG. 2B is a side-view of a propeller blade with propeller blade treatments, according to an implementation.

The propeller blade treatments 202 may be formed of any material, may be of any size, and/or of any shape. Likewise, the propeller blade treatments 202 may be positioned anywhere on the propeller blade 200 and may extend in any direction. For example, referring to FIG. 2B, illustrated is a side-view of the propeller blade 200 that includes a plurality of propeller blade treatments 202. As can be seen, the propeller blade treatments 202 vary in size, shape, and position along the leading edge of the propeller blade 200. For example, propeller blade treatment 202-7 is substantially rectangular in shape, protrudes in a direction vertically above and below the leading edge of the propeller blade, and extends out beyond the leading edge of the propeller blade 200. In comparison, propeller blade treatment 202-2 is substantially triangular in shape and only protrudes above the upper surface area of the propeller blade 200 and does not extend below the propeller blade 200 or protrude out beyond the leading edge of the propeller blade. Likewise, propeller blade treatment 202-3 is substantially triangular in shape but only extends below the lower surface area of the propeller blade 200 and does not protrude beyond the leading edge of the propeller blade. As further examples, propeller blade treatment 202-4 is approximately a half-circle that protrudes above the upper surface area of the propeller blade, and propeller blade treatment 202-5 is an irregular shape that protrudes above the upper surface area of the propeller blade 200.

As will be appreciated, a propeller blade may include any number, size, shape, and/or position of propeller blade treatments. Likewise, some or all of the propeller blade treatments may be stationary and some or all of the propeller blade treatments may be adjustable. In some implementations, a propeller may be fabricated that includes a plurality of propeller blade treatments on one or more of each of the propeller blades. Upon fabrication, the propeller may be tested to determine the different sounds generated by the propeller as it rotates and those sounds may be stored in a sound table associated with the propeller. If some of the propeller blade treatments are adjustable, the different sounds for each different configuration of positions of the adjustable propeller blade treatments may also be determined and stored in a sound table associated with the propeller, along with the corresponding positions of each adjustable propeller blade treatment.

Likewise, as discussed further below, while the propeller blade treatments discussed above with respect to FIG. 2A and FIG. 2B are positioned on the leading edge of the propeller blade, in other implementations, the propeller blade treatments may also be on the surface area, the hub, the tip, the trailing edge, or any combination thereof in addition to or as an alternative to positioning the propeller blade treatments on the leading edge of the propeller blade.

Figure 3A:
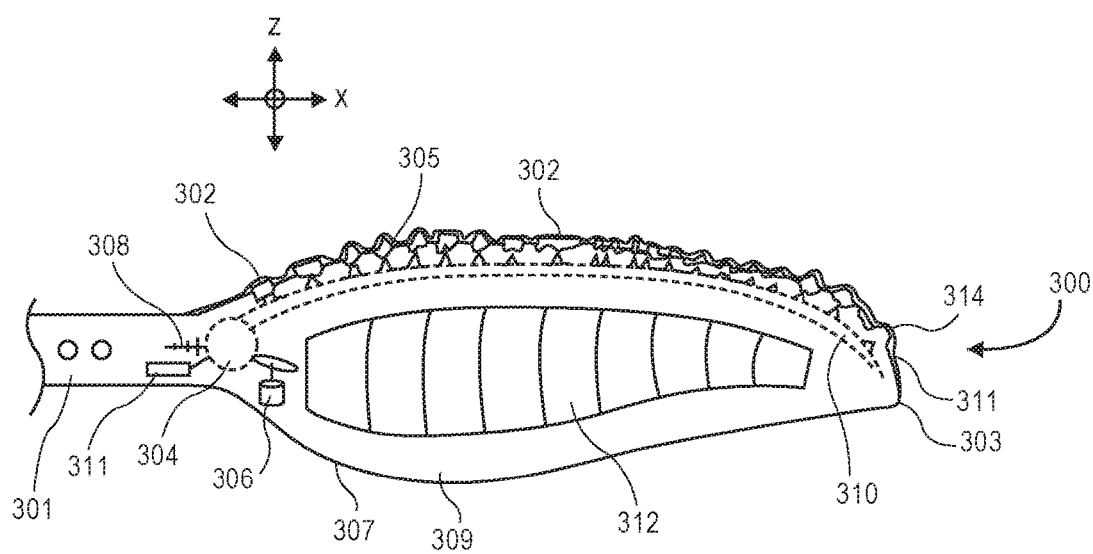
FIG. 3A is a top-down view of a propeller blade with propeller blade treatments, according to an implementation.

FIG. 3A is a top-down view of a propeller blade 300 with a plurality of propeller blade treatments 302, according to an implementation. The propeller blade 300 may be configured in a manner similar to that discussed above with respect to FIG. 2A. For example, the propeller blade 300 may include a hub 301, a tip 303, a leading edge 305, a trailing edge 307, and a surface area 309. Likewise, the propeller blade 300 may include a propeller blade treatment adjustment controller 311 that controls a drive mechanism 304 and an actuator 310, all of which may be powered by a power supply 306 and/or a solar panel 312 positioned on the surface area of the propeller blade. Likewise, a wireless communication component 308 may be included to enable wireless communication to and from the propeller blade treatment adjustment controller 311.

In this example, a flexible material 314 is positioned over the propeller blade treatments and moves with the adjustment of the propeller blade treatments. The flexible material may be fabricated of any flexible material, such as rubber, polyethylene, polypropylene, nylon, polyester, laminate, fabric, Kevlar, carbon fiber, etc. When the propeller blade treatments are moved in a direction that includes a horizontal and/or vertical component with respect to the surface area, the flexible material 314 expands or contracts in response to the movement, thereby altering the shape of the flexible material and, thus, the shape of the propeller blade 300. The flexible material may encompass the entire propeller blade or may only be formed over the propeller blade treatments. Regardless, as the propeller blade treatment positions are adjusted, the flexible material adjusts, thereby altering the airflow over the propeller blade as the propeller rotates. The altered airflow changes the sound generated by the propeller when rotating.

Figure 3B:
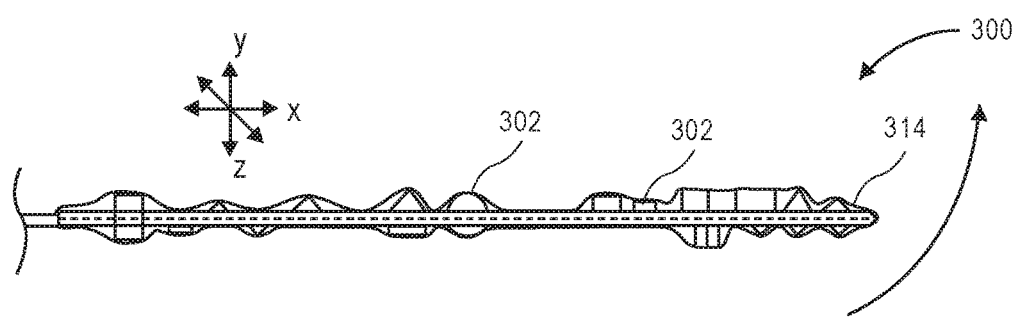
FIG. 3B is a side-view of a propeller blade with propeller blade treatments, according to an implementation.

FIG. 3B illustrates a side-view of a propeller blade 300 that includes a plurality of propeller blade treatments 302 covered with a flexible material 314, according to an implementation. As illustrated, as the propeller blade treatments 302 protrude from the surface area of the propeller blade, the flexible material 314 stretches around the propeller blade treatment 302, thereby altering the overall shape and resulting sound generated by the propeller blade.

Figure 4A:
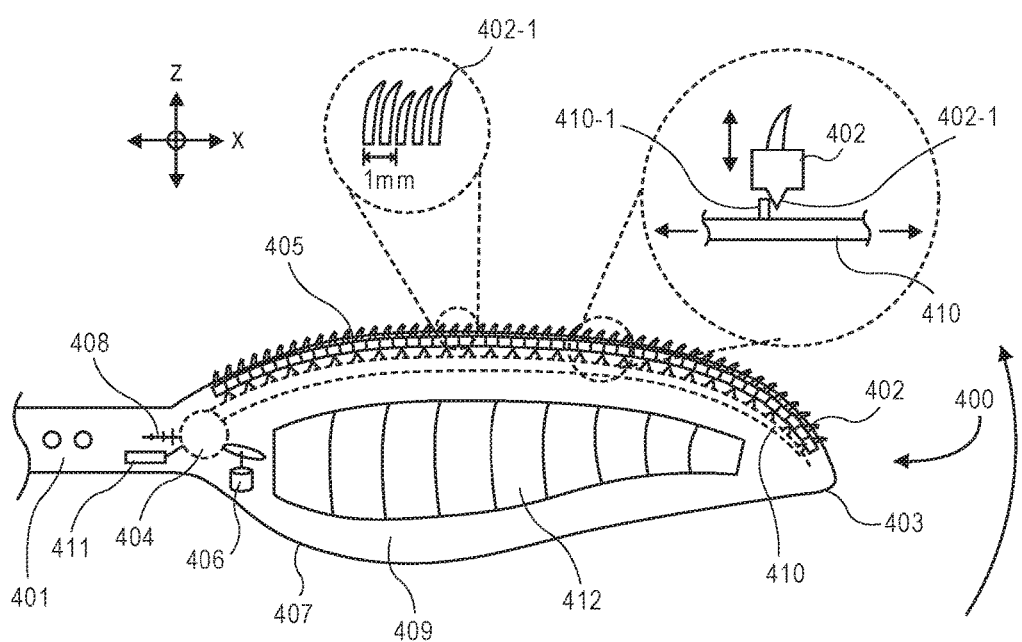
FIGS. 4A-4B are top-down views of a propeller blade with propeller blade treatments, according to an implementation.

FIG. 4A is another top-down view of a propeller blade 400 with propeller blade treatments, according to an implementation. Similar to the discussion above with respect to FIG. 2A, the propeller blade includes a hub 401, a tip 403, a leading edge 405, a trailing edge 407 and a surface area 409 that extends between the hub 401, the tip 403, the leading edge 405, and the trailing edge 407. The surface area includes an upper surface area, which is viewable in the example illustrated in FIG. 4A, and a lower surface area that is opposite the upper surface area.

In this implementation, the propeller blade treatments are in the form of serrations 402 that extend along the leading edge 405. The serrations may be of any size, shape, diameter, and/or curvature. Likewise, spacing between the serrations 402 along the leading edge may vary. As illustrated in the expanded view, the serrations may be less than one millimeter ("mm") apart and range between 0.5-2.3 mm in length. In other implementations, the spacing and/or size of the serrations may be greater or less than the spacing and size illustrated in FIG. 4A. Likewise, the curvature of the serrations may vary between serrations and/or between propeller blades.

The serrations 402 may be adjusted in a direction that includes a horizontal component and/or a vertical component with respect to a surface area 409 of the propeller blade 400. For example, the propeller blade may include a propeller blade treatment adjustment controller 411, which includes an actuator 410. The components of the propeller blade treatment adjustment controller 411 may be incorporated into the propeller blade 400 and positioned such that the actuator 410 contacts one or more of the propeller blade treatments and is configured to move or reposition the serrations 402. For example, the propeller blade treatment adjustment controller 411 may include a drive mechanism 404, such as a servo motor, solenoid, etc., that moves the actuator 410. As illustrated in the expanded view, the actuator may include one or more protrusions 410-1 that move as the actuator is moved by the drive mechanism. As the protrusions 410-1 move, they contact one or more ridges 402-1 of the serrations 402, thereby causing the serrations 402 to move from a first position to a second position.

As each serration 402 moves positions, the sound generated by the propeller blade as it rotates is altered because the airflow is disrupted by the serrations 402. For example, the serrations, when extended from the leading edge 405 of the propeller blade 400, may disrupt the airflow such that the airflow creates small vortices and/or turbulent flows between the serrations. The small vortices and/or turbulent flows may produce varying sounds (e.g., different amplitudes, frequencies, etc.), resulting in a total sound that is dampened and/or that generates a broadband sound that is similar to white noise. White noise refers to a sound containing equal amplitudes at all frequencies. Broadband noise is generally more acceptable to humans than other sounds with larger tonal components typically generated by rotating propellers. In contrast, when the serrations 402 are retracted into the propeller blade 400 such that they do not extend beyond the leading edge 405 of the propeller blade 400, the air passing over the propeller blade 400 as it rotates creates less turbulence, and the overall sound has more tonal prominence at harmonics of the blade-passing frequency and less broadband character.

In some implementations, movement of the actuator 410 may be based on the rotational speed of the propeller, the sound measured by one or more sensors, and/or based on the altitude of the aerial vehicle. For example, the drive mechanism may be a counterweight that moves with an increase in the centrifugal force generated by the rotation of the propeller blade 400. As the counterweight moves, it causes the actuator 410 to move, thereby altering the position of one or more serrations 402. In other implementations, the propeller blade treatment adjustment controller 411 may be powered by one or more power supplies 406 and the drive mechanism 404 may adjust the position of the actuator based on instructions received from the propeller blade treatment adjustment controller 411. For example, the propeller blade treatment adjustment controller 411 may include a processor and memory that includes a table of different propeller blade serration 402 positions and resultant sounds that are generated when the propeller is rotated with the serrations in those positions. The propeller blade treatment adjustment controller 411 may also receive information and/or instructions through a wireless communication component 408, such as an antenna, and determine positions for each of the serrations 402. For example, the propeller blade treatment adjustment controller 411 may receive position information, environmental information, and/or operational information and determine a predicted sound that is expected based on that information. For the predicted sound, serration positions are determined that will cause the propeller to generate an anti-sound when rotated. In another example, the position of propeller blade treatments may be selected to dampen, reduce, and/or otherwise alter the sound generated by the rotation of the propeller, such as by altering the relative and/or absolute amplitudes of various frequency components of the sound.

In other implementations, the propeller blade treatment adjustment controller 411 may receive additional or less information and determine positions for serrations 402. In some implementations, the propeller blade treatment adjustment controller 411 may receive instructions for each serration position, and/or instructions for sets of serrations. As discussed further below with respect to FIG. 4B, serrations may be grouped into sets, each set including at least one serration.

While the illustrated example shows the propeller blade treatment adjustment controller controlling a single drive mechanism and actuator of a propeller blade 400, in some implementations, the propeller blade treatment adjustment controller may be coupled to and control multiple drive mechanisms, adjustment controllers, and corresponding serrations for multiple propeller blades. For example, a propeller of an aerial vehicle may include one, two, three, four, five, or any number and/or shape of propeller blades. One or more of the propeller blades may include a drive mechanism 404, actuator 410, serrations 402, and/or other types of propeller blade treatments. All of the propeller blade treatments of the different propeller blades, including the serrations 402, may be controlled by the propeller blade treatment adjustment controller. Likewise, one or more of the propeller blades 400 may include a power supply 406 and/or a power source. In this example, the power source is a series of solar panels 412 that collect solar energy for use in powering the propeller blade treatment adjustment controller 411 and drive mechanism 404. Likewise, the energy collected by the solar panels 412 may be stored in one or more fuel cells 406, such as a battery.

Figure 4B:
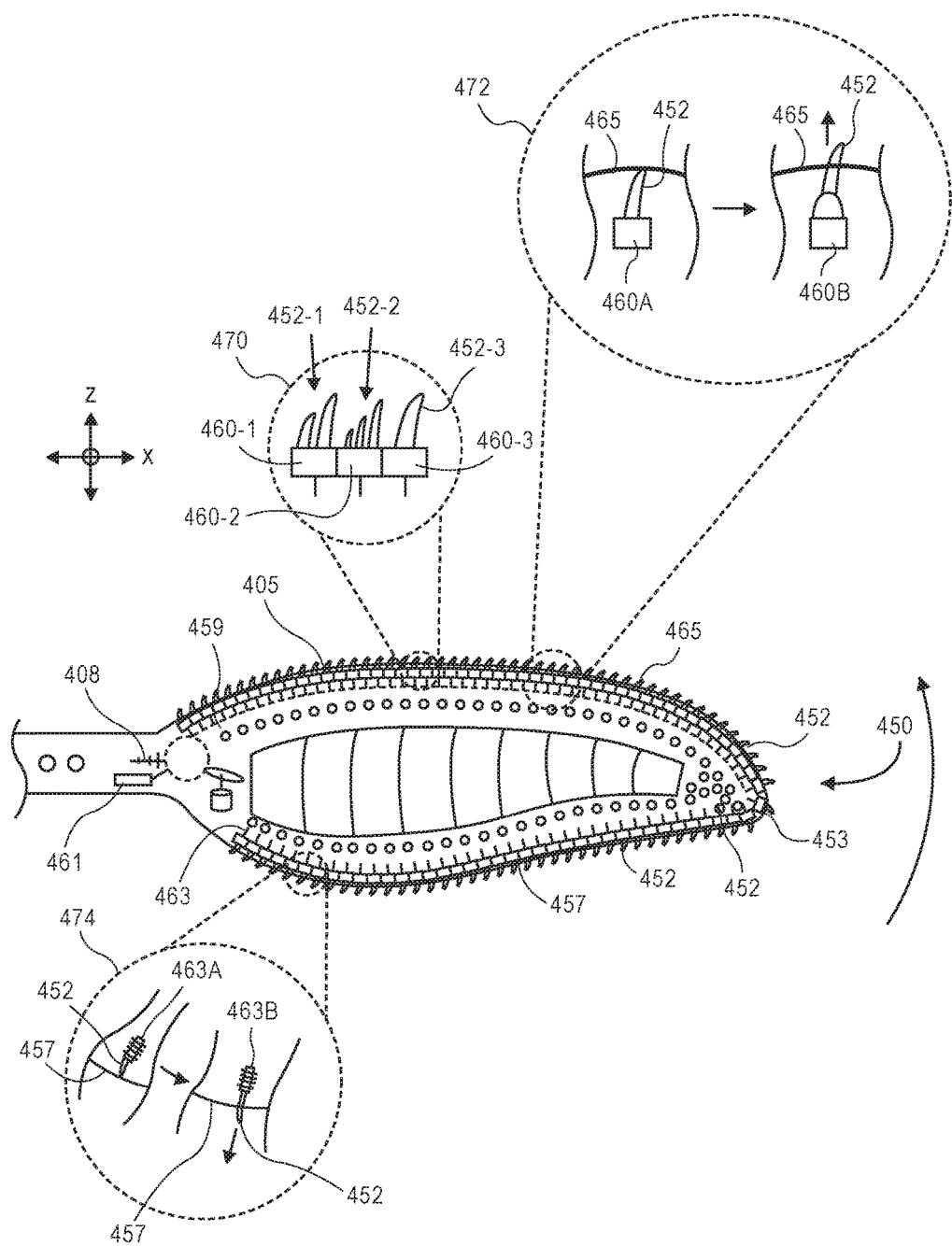

While the example illustrated in FIG. 4A includes a drive mechanism 404 and actuator 410 in the form of an adjustable arm that may be moved by the drive mechanism, it will be appreciated that any variety of techniques may be used to alter the positions of the serrations 402. As discussed above, the actuator may be any type of device or component (e.g., piezoelectric actuator, solenoid, pneumatics, etc.) that can move the propeller blade treatments (e.g., serrations). For example, referring to FIG. 4B, illustrated is a top-down view of a propeller blade 450 in which the actuator 460 that moves the serrations 452 along the leading edge 465 is in the form of multiple piezoelectric actuators. In such a configuration, the propeller blade treatment adjustment controller 461 can individually control each actuator, thereby causing different sets of serrations along the leading edge to be adjusted independent of other sets of serrations.

Referring to the expanded view 470, illustrated are three sets of serrations 452-1, 452-2, 452-3, each set affixed to a separate actuator 460-1, 460-2, and 460-3. As illustrated, the serrations 452 may be different sizes, shapes, lengths, diameters, have different curvatures, and/or be formed of different materials. Each set of serrations includes one or more serrations. For example, the third set of serrations 452-3 includes a single serration. In comparison, the first set of serrations 452-1 includes two serrations and the second set of serrations 452-2 includes three serrations. In some implementations, the serrations are formed of a fibrous material that flexes during rotation of the propeller. In other implementations, the serrations may be formed of, for example, ceramic, plastic, rubber, composites, metal, carbon fiber, etc.

Referring to the expanded view 472, in some implementations, when an actuator is not activated, such as actuator 460A, the set of serrations 452 coupled to the actuator may be in a retracted position in which the serrations 452 do not extend beyond the leading edge 465 of the propeller blade. When the propeller blade treatment adjustment controller sends a signal to activate the actuator, and the actuator activates, as illustrated by actuator 460B, the serration 452 is moved to an extended position in which at least a portion of the serration extends beyond the leading edge 465 of the propeller blade. As the propeller rotates, different actuators 460 may be activated or deactivated such that different sets of serrations move between extended positions and retracted positions, thereby altering the sound generated by the rotation of the propeller blade.

In addition to including serrations along the leading edge 465 of the propeller, serrations may be included on other portions of the propeller. For example, FIG. 4B illustrates serrations extending from the leading edge 465 of the propeller, serrations extending from the trailing edge 457, serrations extending from the tip 453, and serrations extending from the surface area 459. Similar to the serrations 452 along the leading edge, serrations on other portions of the propeller may be stationary or actively moved between two or more positions. For example, the serrations 452 along the trailing edge of the propeller 457 may be actively adjusted between a retracted position and an extended position. In some implementations, the serrations 452 may be moved using any of the examples discussed above (e.g., mechanical adjustment arm, piezoelectric actuators, pneumatics, and solenoids). The actuator 463 that moves the serrations 452 along the trailing edge 457 is in the form of multiple solenoids. In such a configuration, the propeller blade treatment adjustment controller 461 can individually control each actuator 463, thereby causing different sets of serrations along the trailing edge to be adjusted independent of other sets of serrations.

Referring to the expanded view 474, in some implementations, when an actuator is not activated, such as actuator 463A, the set of serrations 452 coupled to the actuator may be in a retracted position in which the serrations 452 do not extend beyond the trailing edge 457 of the propeller blade. When the propeller blade treatment adjustment controller sends a signal to activate the actuator, and the actuator activates, as illustrated by actuator 463B, and the serration 452 is moved to an extended position in which at least a portion of the serration extends beyond the leading edge 465 of the propeller blade. As the propeller rotates, different actuators 463 may be activated or deactivated such that different sets of serrations move between extended positions and retracted positions along the trailing edge of the propeller blade 450, thereby altering the sound generated by the rotation of the propeller blade.

The serrations 452 influence the airflow around the propeller blade, inducing vortices, turbulence, and/or other flow characteristics that can reduce, dampen, and/or otherwise alter the sound generated by the rotation of the propeller. For example, the air may be disrupted because the serrations generate small channels between each serration and the air passes through the small channels as the propeller blade rotates. These small channels of air generate smaller vortices and/or turbulent flows as the propeller blade passes through the air, along with larger vortices and/or turbulent flows being generated. The smaller vortices and/or turbulent flows generate less and/or different sounds than larger vortices, and some of the sounds generated by the smaller vortices and/or turbulent flows have relatively high amplitudes at different frequencies. By disrupting the sound and generating smaller vortices and/or turbulent flows, the total sound generated from the propeller blade is dampened, reduced, and/or otherwise altered. For example, the frequency of the sounds that are generated may be more representative of white noise.

Figure 5A:
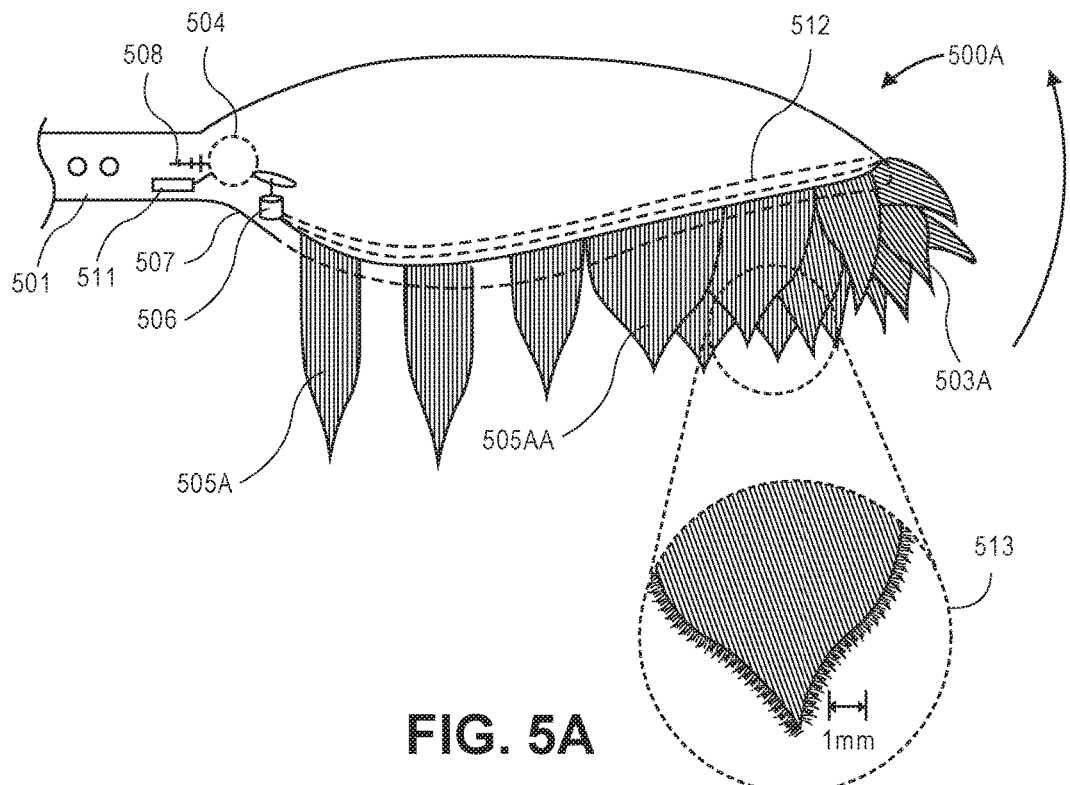
FIGS. 5A-5D are top-down views of a propeller blade with propeller blade treatments, according to an implementation.

FIG. 5A is a top-down view of a propeller blade 500 with propeller blade treatments, according to an implementation. In this example, the propeller blade treatments are in the form of fringes 503, 505 that extend from the trailing edge 507 of the propeller blade 500A. The fringes may be formed of any variety of materials and some fringes may be formed from materials that are different than other fringes. For example, the fringes may be formed of an elastic material, a rigid material like a ceramic or carbon composite, a porous material, fabric material, feathers, a fibrous material, leather, fur, synthetic-fabric materials, fibers, etc.

As illustrated, the length, size, and/or shape of the fringes 503, 505 may vary. For example, longer and/or narrower fringes 505A may be positioned toward the hub 501 of the propeller blade 500A, larger and/or wider fringes 505AA may be positioned toward a center of the trailing edge of the propeller blade 500A, and smaller fringes 503A may be positioned toward a tip of the propeller blade 500. Likewise, in some implementations, the density or number of fringes may vary along the length of the propeller blade 500. Referring to the expanded view 513, the fringes may be formed of numerous fibers that extend from the trailing edge 507 of the propeller blade 500. The fibers may be frayed or diffused at the end of each fiber, in a manner similar to that illustrated in the expanded view 513.

The fringes, such as the fibers, can move in the air as the propeller rotates, disrupting and/or smoothing the flow of air as the propeller blade 500A passes through the air. The disrupted and/or smoothed air results in less and/or different sound being generated by the propeller as it rotates. Likewise, the fringes and/or the frays extending from the end of the fringes 505 also absorb some of the sound generated by the propeller rotating through the air, thereby decreasing the total sound generated by the propeller blade. In some implementations, the fringes may be formed such that they can move in a vertical direction as the propeller rotates but the horizontal direction of the fringes may be limited. For example, the fibers of a fringe may be configured to flex in a vertical direction with a rotation of the propeller blade and flex in a horizontal direction to a position in which the fringes are aligned with a rotational direction of the propeller blade.

The fringes 505, when extended beyond the trailing edge of the propeller blade, may create additional drag as the propeller rotates, requiring additional power to rotate the propeller at a commanded speed. Accordingly, in some implementations, the fringes 505 may be adjustable such that they can be moved between an extended position in which the fringes extend beyond the trailing edge 507 of the propeller blade and a retracted position in which the fringes are retracted, at least partially, into the propeller blade. Likewise, in some implementations, some fringes may be moved independently of other fringes on the propeller blade 500.

In one implementation, the propeller blade treatment adjustment controller 511 may be configured to adjust the position of the fringes 503, 505. For example, the propeller blade treatment adjustment controller 511 may include a drive mechanism, such as a servo motor, that can rotate or adjust a position of an adjustment component 512 that extends along the trailing edge 507 of the propeller blade 500. The adjustment component 512 may be internal to the propeller blade 500. In some implementations, the adjustment component may be a cylinder or a series of cylinders that can be rotated in either direction. The internal ends of the fringes may be attached to a cylinder and the propeller blade treatment adjustment controller 511 may utilize the drive mechanism to rotate one or more of the cylinders to either extend or retract the fringes 503, 505. When the cylinders are rotated in a first direction, the fringes roll-up or wrap around the cylinders into a retracted position within the propeller blade. When the cylinders are rotated in a second direction, the fringes 503, 505 extend or unwrap from the cylinders into an extended position beyond the trailing edge of the propeller blade 500.

In FIG. 5A, all of the fringes 503A, 505A, 505AA are in an extended position. When in the extended position, the sound generated by the propeller blade may be dampened by the fringes, but the power required to rotate the propeller blade may be increased due to the added drag from the extended fringes. In comparison, referring to FIG. 5B, the fringes 505B and fringes 505BB that are closer toward the hub of the propeller blade and the center of the propeller blade are retracted into the propeller blade 500B and the fringes 503B remain in the extended position. In such a configuration, the sound generated by the tip vortices and/or turbulent flows that are shed from the tip of the blade are dampened by the extended fringes 503B but the drag resulting from extended fringes is reduced by retracting the fringes 505B, 505BB.

Figure 5B:
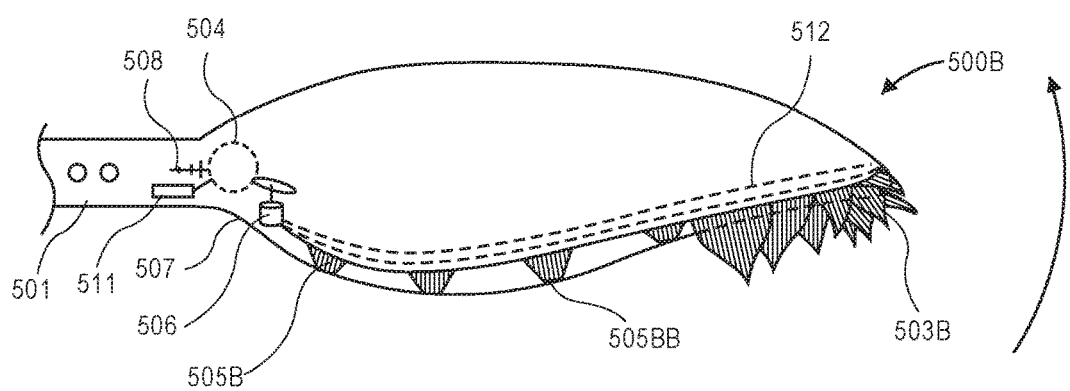
Figure 5C:
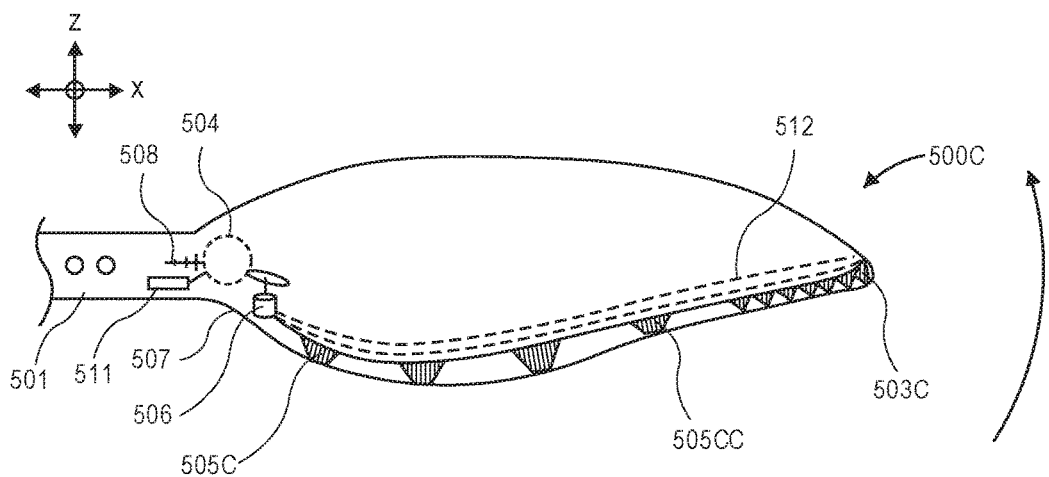

Referring now to FIG. 5C, all three sets of fringes 505C, 505CC, and 503C of the propeller blade 500C are in the retracted position. By retracting all of the fringes 503C, 505C, and 505CC, the drag on the propeller blade 500C is further reduced, thereby reducing the power required to rotate the propeller. However, the sound generated by the propeller blade 500C may be louder because the fringes are not extended to dampen the sound generated as the propeller passes through the air.

In comparing the configurations of FIGS. 5A, 5B, and 5C, assuming the propeller blades 500A, 500B, 500C are rotating at the same speed (and all other factors being equal—wind, air pressure, etc.), the total sound generated by the rotation of propeller blade 500A (FIG. 5A) is less than and/or different than the total sound generated by the rotation of propeller blade 500B (FIG. 5B). Likewise, the sound generated by the rotation of propeller blade 500B is less than and/or different than the sound generated by the rotation of propeller blade 500C (FIG. 5C). However, the power needed to rotate propeller blade 500A to generate a desired lift and/or thrust is higher than the power needed to rotate propeller blade 500B to generate the same desired lift and/or thrust. Likewise, the power needed to rotate propeller 500B to generate the desired lift and/or thrust is higher than the power needed to rotate propeller blade 500C to generate the same desired lift and/or thrust.

Figure 5D:
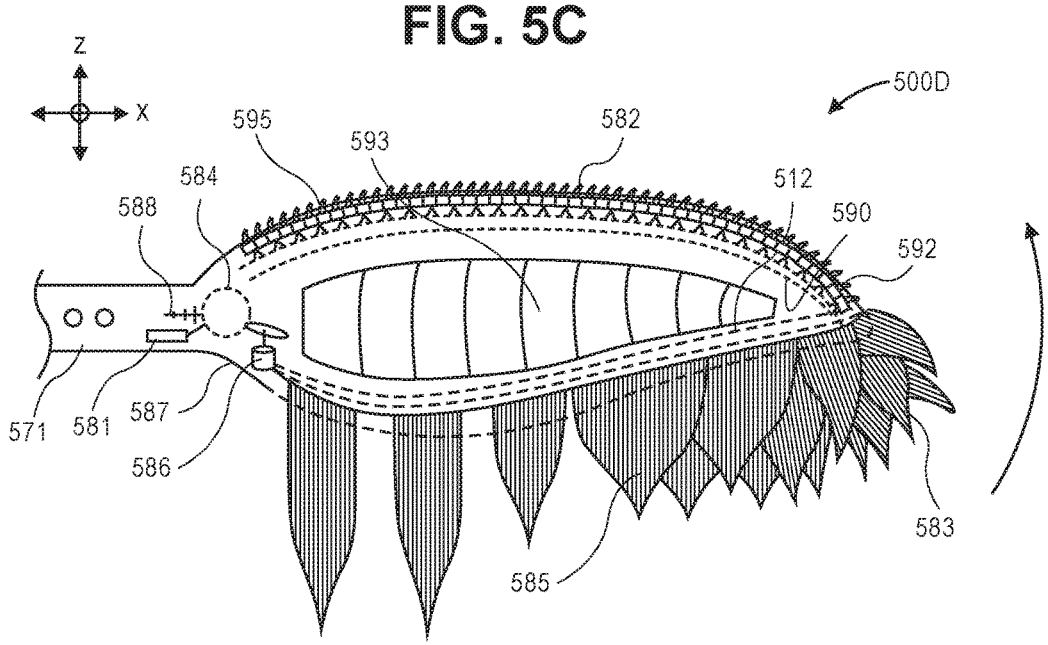

FIG. 5D illustrates a top-down view of a propeller blade 580 that includes both serrations 582 along the leading edge 595 of the propeller blade 580 and fringes 583, 585 extending from the trailing edge of the propeller blade 500D. Depending on the configuration, the propeller blade 580 may also include one or more of a propeller blade treatment adjustment controller 581, power supply 586, solar panels 593, wireless communication component 588, a drive mechanism 584, an adjustment arm 590 that may be used to adjust and/or extend or retract the serrations 582, and/or an adjustment controller 592 that may be used to extend or retract the fringes 583, 585.

In the described implementations, the aerial vehicle can determine when efficiency of power is of higher importance and when reduction or alteration of sound is of higher importance and adjust the serrations 582, and/or the fringes 583, 585 accordingly. For example, when the aerial vehicle is at a high altitude (e.g., in transit between two locations), power efficiency may be more important than sound dampening or other alteration, and the aerial vehicle control system may cause the serrations 582 and/or the fringes 583, 585 to be retracted. In comparison, when the UAV is below a defined altitude (e.g., 50 feet), it may determine that sound dampening or other alteration is more important and cause the serrations 582 and/or the fringes 583, 585 to extend, thereby reducing and/or otherwise altering the sound generated by the rotation of the propellers but increasing the power needed to rotate the propellers and generate the required thrust or lift. Sound dampening or alteration may be of higher importance at lower altitudes because the UAV may be entering areas that are populated by humans, such as to deliver a package to a human's residence.

In some implementations, the serrations 582, and/or fringes 583, 585 may be adjusted as the aerial vehicle changes altitude. For example, as the aerial vehicle begins to descend, the serrations 582 may be extended first to initially dampen, reduce, and/or otherwise alter the sound generated by the rotation of the propeller. As the aerial vehicle continues to descend, the fringes 583 toward the tip of the propeller blade may be extended to dampen, reduce, and/or otherwise alter the sound generated by the shed tip vortices and/or turbulent flows. Finally, as the aerial vehicle continues to descend, the fringes 585 may be extended to dampen, reduce, and/or otherwise alter the sound generated as the propeller blade passes through the air. By progressively extending the serrations 582 and fringes 583, 585, the power to sound alteration ratio is adjusted as the aerial vehicle approaches lower altitudes, thereby conserving power while altering sound as needed. In a similar manner, the fringes 583, 585 and serrations 582 may be retracted as the aerial vehicle ascends to higher altitudes, thereby reducing the power needed to rotate the propellers and generate the desired lift or thrust.

In some implementations, as discussed below, one or more sensors positioned on the propeller or the aerial vehicle may measure sound generated at or around the aerial vehicle and the serrations 582 and/or fringes 583, 585 may be extended or retracted based on the measured sounds. For example, an allowable sound level and/or frequency spectrum for the aerial vehicle may be defined. As the sound measured by the aerial vehicle reaches the allowable sound level or frequency spectrum, the serrations 582, and/or fringes 583, 585 may be extended to dampen, reduce, and/or otherwise alter the sound generated by the aerial vehicle, such as by altering the frequency spectrum of the produced sound. In some implementations, the allowable sound level or frequency spectrum may vary depending on, for example, the altitude of the aerial vehicle, and/or the position of the aerial vehicle. For example, when the aerial vehicle is at lower altitudes and/or in areas populated by humans, the allowable sound level may be lower than when the aerial vehicle is at higher altitudes and/or in areas not populated by humans.

Figure 6A:
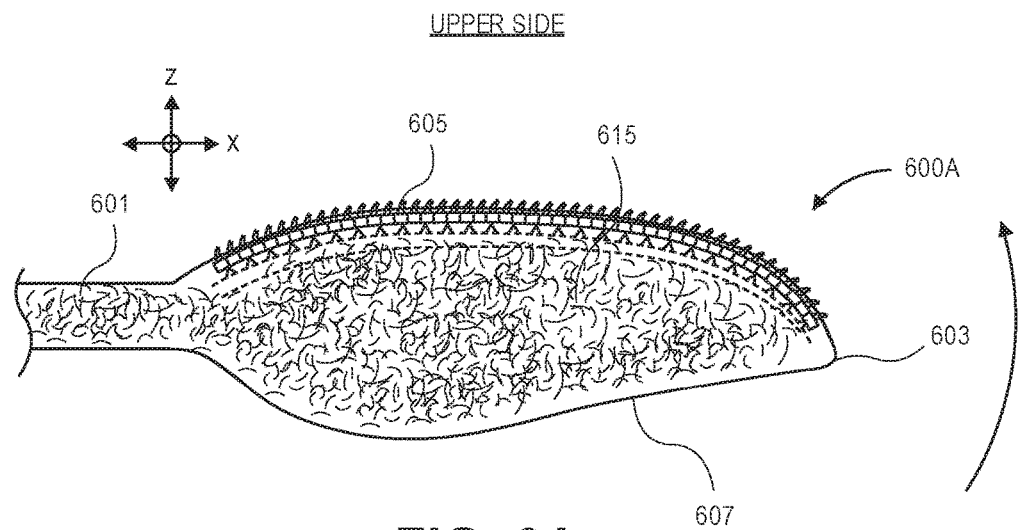
FIG. 6A is a top-down view of a propeller blade with propeller blade treatments, according to an implementation.
Figure 6B:
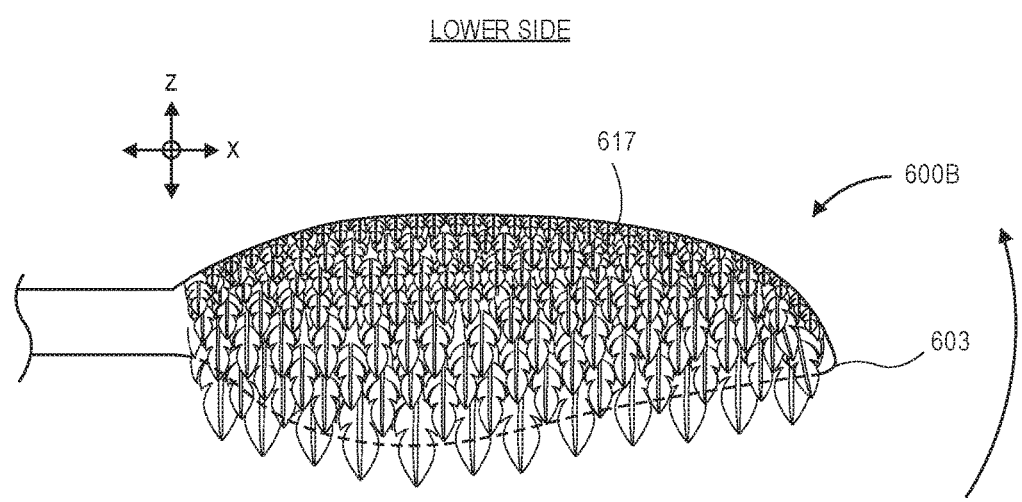
FIG. 6B is a view of a lower or underneath side of a propeller blade with propeller blade treatments, according to an implementation.

FIG. 6A is a top-down view of an upper side of propeller blade 600A with propeller blade treatments, according to an implementation. Likewise, FIG. 6B is a view of a lower side of a propeller blade 600B with propeller blade treatments, according to an implementation. In the examples illustrated in FIGS. 6A and 6B, the propeller blade treatments are sound dampening materials 615, 617 affixed to the surface area of the propeller blade. In some implementations, the sound dampening material 615 may only be affixed to the upper side of the propeller blade 600A, as illustrated in FIG. 6A. In other implementations, the sound dampening material 617 may only be affixed to the lower side of the propeller blade 600B. In still other implementations, the sound dampening material may be affixed to both the upper side of the propeller blade 600A and the lower side of the propeller blade 600B.

In some implementations, the sound dampening material may be affixed to only a portion of the upper side of the propeller blade 600A and/or affixed to only a portion of the lower side of the propeller blade 600B. Likewise, different types of sound dampening materials may be affixed to different portions of the surface areas of the propeller blade. For example, one type of sound dampening material 615 may be affixed to some or all of the upper side of the propeller blade 600A and another type of sound dampening material 617 may be affixed to some or all of the lower side of the propeller blade 600B. In still other implementations, multiple types of sound dampening materials may be affixed to either, or both, the upper side of the propeller blade 600A or the lower side of the propeller blade 600B. Finally, in some implementations, the sound dampening material may extend between the upper side of the propeller blade 600A and the lower side of the propeller blade 600B covering all or a portion of the leading edge 605, covering all or a portion of the trailing edge 607, and/or covering all or a portion of the hub 601. The sound dampening material may be the only propeller blade treatment utilized. In other implementations, the sound dampening material may be used in conjunction with other propeller blade treatments.

Any size, type, density, or variation of sound dampening material may be utilized with the implementations discussed herein. For example, the sound dampening materials 615, 617 may be feathers, flocking, velvet, satin, cotton, rayon, nylon, suede, synthetic fibers, rope, hemp, silk, etc. In general, the sound dampening material may be any form of material that dampens, reduces, absorbs, and/or otherwise alters sound generated by the rotation of the propeller blade as it passes through the air.

In the example illustrated in FIGS. 6A and 6B, the sound dampening material 615 affixed to the upper side of the propeller blade 600A is a first type of sound dampening material and the sound dampening material 617 affixed to the lower side of the propeller blade 600B is a second type of sound dampening material. For example, the sound dampening material 615 may be fibrous material and the sound dampening material 617 on the lower side of the propeller blade are down feathers. The down feather sound dampening material 617 may include actual down feathers. Alternatively, some or all of the sound dampening material 617 may be a synthetic material that has sound dampening properties similar to that of down feathers. Likewise, as illustrated, the size and/or shape of the sound dampening material may vary over the surface area of the propeller blade 600. The sound dampening material may be affixed to the propeller blade and/or otherwise incorporated into the propeller blade.

Figure 6C:
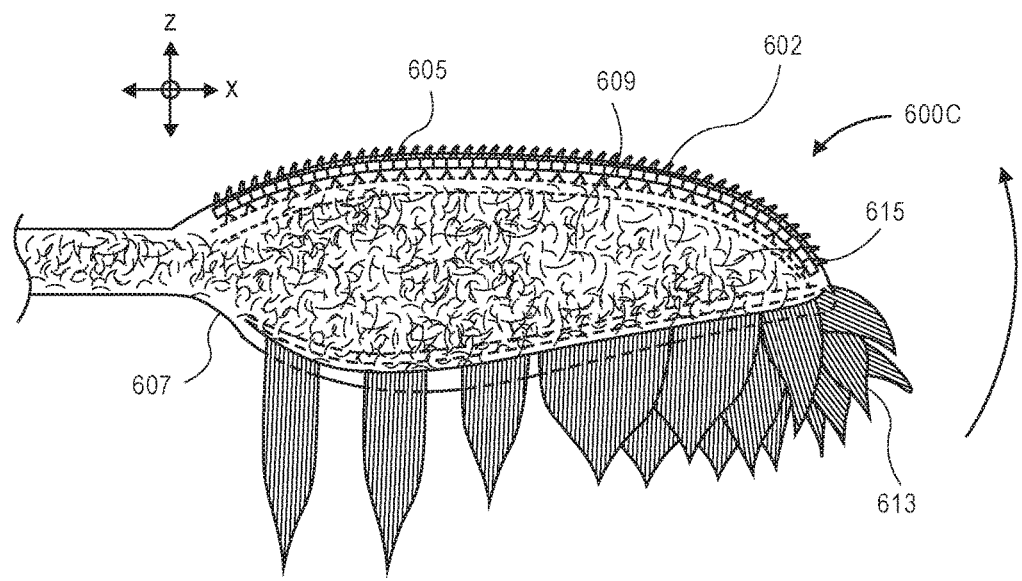
FIG. 6C is a top-down view of a propeller blade with propeller blade treatments, according to an implementation.

FIG. 6C is a top-down view of a propeller blade 600C that includes multiple types of propeller blade treatments, according to an implementation. In this example, the propeller blade 600C includes propeller blade treatments in the form of serrations 602 extending along the leading edge of the propeller blade 600C, fringes 613 extending from the trailing edge 607, and sound dampening material 615 affixed to the surface area 609 of the propeller blade 600C.

As discussed above, either or both of the serrations 602 and the fringes 613 may be active such that a propeller blade treatment adjustment controller can extend, retract, or otherwise alter the position of the serrations 602 and/or the fringes 613. In some implementations, when the serrations 602 are extended, as discussed above, the air is separated in the channels passing between the serrations 602 and forms smaller vortices and/or turbulent flows that move along the surface area 609 of the propeller blade 600C. These smaller vortices and/or turbulent flows produce a softer, less tonal, whiter total sound than larger vortices and/or turbulent flows formed when the serrations are retracted (or non-existent). Likewise, the smaller vortices and/or turbulent flows vary in frequency generating a total sound that is more representative of white noise, or other broadband noise.

Likewise, the sound dampening material 615 affixed to the surface area (the upper surface area and/or the lower surface area) of the propeller blade 600C absorbs, scatters, and/or otherwise alters some of the sound generated by the smaller vortices, especially those having a higher frequency. The absorption and/or other alteration of sound generated by the smaller vortices and/or turbulent flows further dampens, reduces, and/or otherwise alters the total sound generated by the propeller as the propeller passes through the air. Finally, the fringes 613 further disrupt the air, breaking down the smaller vortices and/or smoothing turbulent flows of the air as the propeller passes through the air. The disruption and/or smoothing of the air by the fringes 613 still further dampens, reduces, and/or otherwise alters the sound generated by the propeller blade as it rotates through the air.

Figure 7:
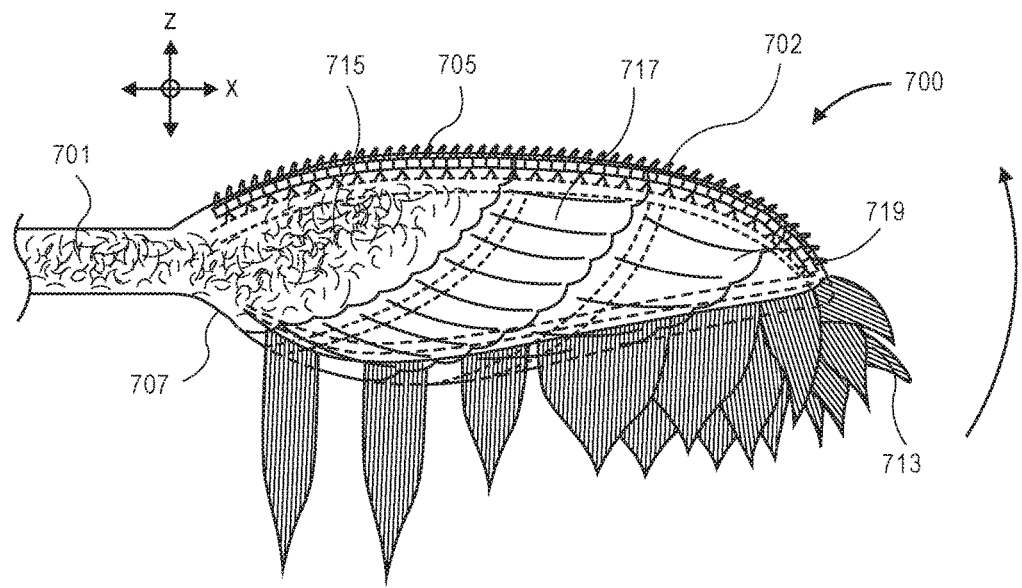
FIG. 7 is a top-down view of a propeller blade with propeller blade treatments, according to an implementation.

FIG. 7 is a top-down view of a propeller blade 700 with still another configuration of propeller blade treatments, according to an implementation. In FIG. 7, the propeller blade includes serrations 702 extending along the leading edge 705 of the propeller blade, fringes 713 extending from the trailing edge 707 of the propeller blade and multiple types of sound dampening materials 715, 717, 719 affixed to the surface area of the propeller blade 700, which includes either or both the upper side or the lower side of the propeller blade. Like the other examples, in some implementations, either or both of the serrations 702 and/or the fringes 713 may be adjustable between an extended position and a retracted position, or otherwise altered.

The different sound dampening materials 715, 717, 719 may be selected based on characteristics of the propeller, such as the total sound spectrum, the size, and/or shape of the propeller, the pitch of the propeller blade, etc. In this example, a first sound dampening material 715 is affixed to a first portion of the surface area of the propeller blade 700 nearest the hub 701 of the propeller blade. A second sound dampening material 717 is affixed to the central portion of the surface area of the propeller blade, and a third sound dampening material 719 is affixed to the surface area nearest the tip of the propeller blade 700. In this configuration, the third sound dampening material 719 may have the highest sound dampening properties but cause the greatest amount of additional drag on the propeller, thereby requiring additional power to rotate the propeller. The second sound dampening material 717 may have the second highest sound dampening properties and the second highest amount of drag. Finally, the first sound dampening material 715 may have the least amount of sound dampening material and the least amount of drag.

By selecting different sound dampening materials for different portions of the surface area, the power requirements and sound dampening properties may be balanced or otherwise tailored. For example, the sound generated from the area near the tip of the propeller blade is generally louder than the sound generated from the area of the propeller blade nearest the hub 701, because the tip of the propeller blade is rotating faster. As such, sound dampening materials with higher dampening properties may be placed toward the tip of the propeller blade to dampen the sound to a desired level. In comparison, a sound dampening material 715 may be used closer to the hub that will generate less drag but still dampen, reduce, and/or otherwise alter the sound generated from that portion of the propeller blade to a desirable level.

As will be appreciated, any number, type, and/or combination of propeller blade treatments, from serrations, sound dampening materials, to fringes may be used alone or in combination to dampen or otherwise alter sound generated by rotation of a propeller blade. As discussed above, altering the sound may include, but is not limited to, altering a frequency spectrum of the sound, generating an anti-sound, dampening the sound, etc.

Figure 8A:
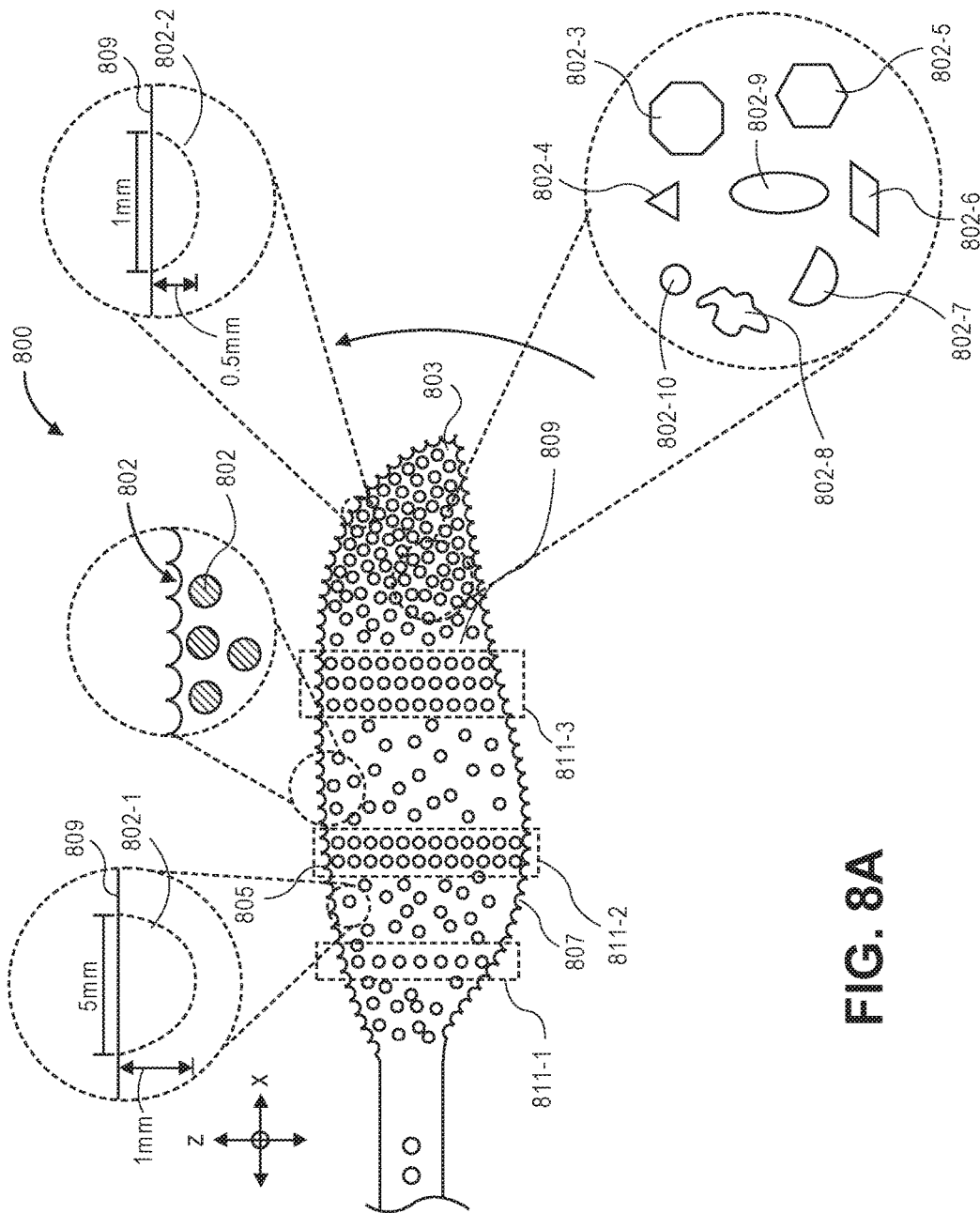
FIGS. 8A-8C are top-down views of a propeller blade with propeller blade treatments, according to an implementation.

FIG. 8A is a top-down view of a propeller blade 800 with a plurality of propeller blade treatments, according to an implementation. In this example, the propeller blade treatments are incorporated into the propeller blade in the form of dimples or indentations 802 into the surface area of the propeller blade. The indentations 802 on the propeller blade 800 may be positioned on the leading edge 805 of the propeller blade 800, on the trailing edge 807, on the tip 803, and/or on the upper side and/or lower side of the surface area 809 of the propeller blade 800. The indentations 802 may be of any shape, size, pattern, and/or density. For example, the indentations 802 may be more densely positioned at the tip of the propeller blade and less dense toward the middle of the propeller blade 800. In other implementations, the indentations 802 may be larger in size and/or depth toward the tip 803 of the propeller blade 800 than toward the middle of the propeller blade 800. Alternatively, as illustrated, the indentations 802 may be smaller in size and/or depth toward the tip of the propeller blade than toward the central portion of the propeller blade 800. For example, as illustrated in the expanded view, in one implementation, the indentations 802-2 toward the tip of the propeller blade may have a width of approximately 1.0 mm and a depth of approximately 0.5 mm. In comparison, the indentations 802-1 toward the central portion of the propeller blade may have a width of approximately 5.0 mm and a depth of approximately 1.0 mm.

In addition to varying the size of the indentations, the shape of the indentations may likewise vary. For example, as illustrated in the expanded view, the indentations may be in the shape of an octagon 802-3, a triangle 802-4, a hexagon 802-5, a parallelogram 802-6, a semi-circle 802-7, an irregular shape 802-8, an oval 802-9, a circle 802-10, a trapezoid, a parallelogram, a rhomboid, a square, a rectangle, or a general quadrilateral, or any other shape, such as a polygon shape, that can be formed into the surface area of the propeller blade 800.

In some implementations, the indentations 802 may be randomly positioned along the surface area of the propeller blade 800. In other implementations, some or all of the indentations 802 may be positioned to form one or more regular or irregular patterns. For example, a first set 811-1 of indentations 802 are aligned to form a first pattern, a second set 811-2 of indentations 802 are aligned to form a second pattern, and a third set 811-3 of indentations 802 are aligned to form a third pattern along the surface area of the propeller blade. In this example, the sets 811-1-811-3 of indentations arranged in patterns are designed to create air-flow channels that route air over the indentations as the propeller passes through the air. The channeled air creates a first predictable sound. In a similar manner, indentations on another propeller blade of the aerial vehicle may be arranged in different patterns to create a second predictable sound. The second sound may be an anti-sound to the first sound such that when the first sound and the second sound combine they cause destructive interference and cancel each other out, thereby reducing and/or otherwise altering the total sound generated by the aerial vehicle. In other implementations, the designs of the indentations may also be formed to generate other predicted sounds that may be used as anti-sounds for other aerial vehicle created sounds, such as sounds created by a motor of the aerial vehicle.

The indentations 802 on the propeller blade 800 alter the airflow over the blade and/or cause turbulence. Specifically, the indentations 802 cause the air to remain attached to the surface area of the propeller blade 800 for a longer period of time, thereby reducing and/or otherwise altering the wake and tip vortices caused by the rotation of the propeller through the air. Altering the wake and tip vortices, and the created turbulence, alters the sound generated by the propeller as it rotates and passes through the air. Likewise, the improved airflow and attachment of the air to the propeller blade allows the aerial vehicle to operate a higher angles of attack and/or higher speeds before the performance of the propeller blade is impacted.

Figure 8B:
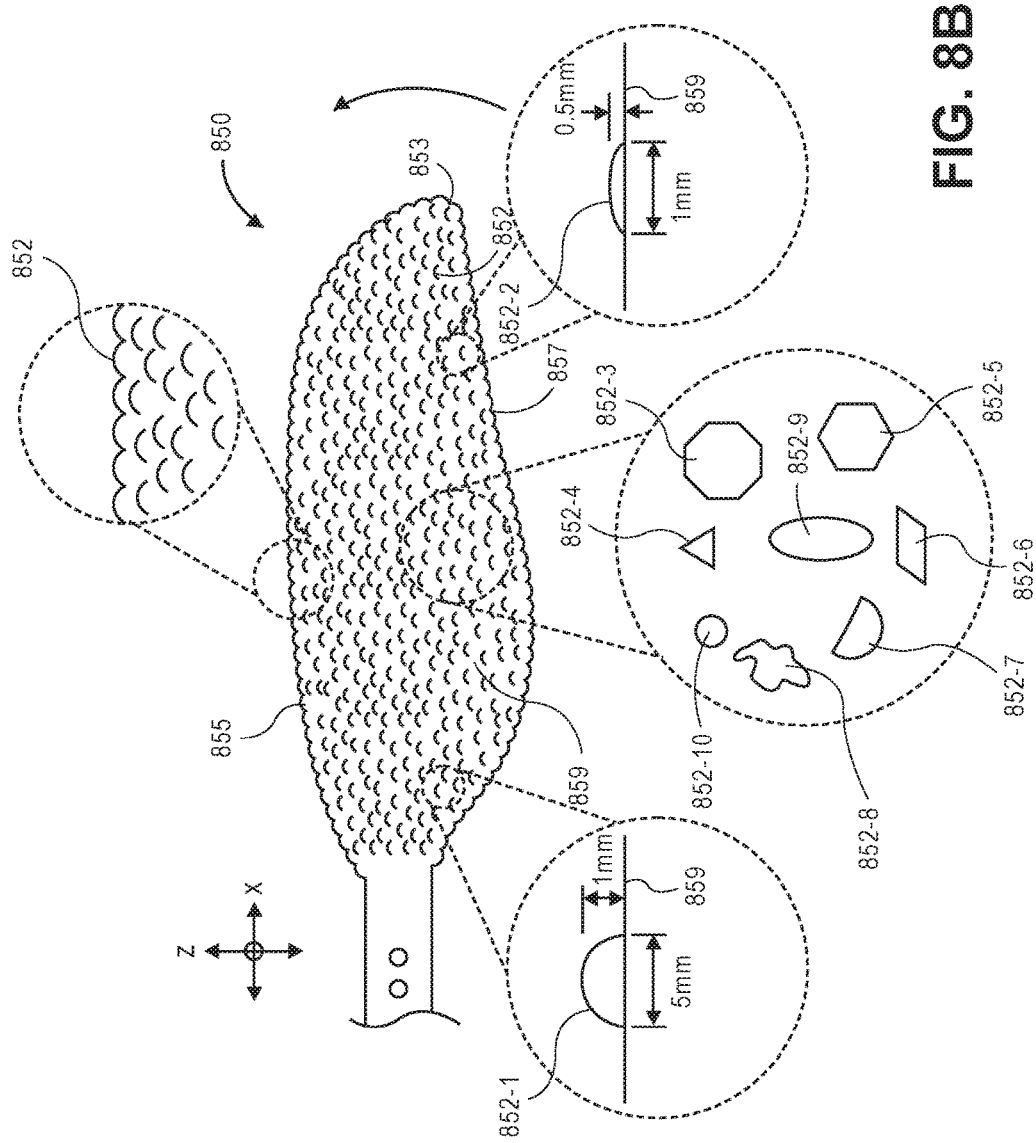

FIG. 8B is a top-down view of a propeller blade 850 with a plurality of propeller blade treatments, according to an implementation. In this example, the propeller blade treatments are incorporated into the propeller blade in the form of protrusions 852 or bumps on the surface of the propeller blade 850. The protrusions 852 on the propeller blade 850 may be positioned on the leading edge 855 of the propeller blade 850, on the trailing edge 857, on the tip 853, and/or on the upper and/or lower surface area 859 of the propeller blade 850. In this example, the protrusions 852 on the propeller blade 850 may be of any shape, size, pattern, and/or density. For example, the propeller blade treatments may be more densely positioned at the tip of the propeller blade and less dense toward the middle of the propeller blade 850. The propeller blade treatments 852 may be larger in size and/or height toward the tip 853 of the propeller blade 850 than toward the middle of the propeller blade 850. Alternatively, as illustrated, the protrusions 852 may be smaller in size and/or height toward the tip of the propeller blade than toward the central portion of the propeller blade 850. For example, as illustrated in the expanded view, in one implementation, the protrusions 852-2 toward the tip of the propeller blade may have a width of approximately 1 mm and a height above the surface area 859 of approximately 0.5 mm. In comparison, the protrusions 852-1 toward the central portion of the propeller blade 850 may have a width of approximately 5.0 mm and a height of approximately 1.0 mm.

In addition to varying the size of the protrusions, the shape of the protrusions may likewise vary. For example, as illustrated in the expanded view, the protrusions may be in the shape of an octagon 852-3, a triangle 852-4, a hexagon 852-5, a parallelogram 852-6, a semi-circle 852-7, an irregular shape 852-8, an oval 852-9, a circle 852-10, a trapezoid, a parallelogram, a rhomboid, a square, a rectangle, or a general quadrilateral, and/or any other shape, such as a polygon shape, that can be formed on the surface area of the propeller blade 850.

In some implementations, the protrusions 852 may be randomly positioned along the surface area of the propeller blade 850. In other implementations, some or all of the protrusions 852 may be positioned to form one or more regular or irregular patterns. The protrusions 852 on the propeller blade 850 alter the airflow over the blade and cause turbulence.

Similar to the other examples of propeller blades with propeller blade treatments, the propeller blades 800, 850 may be fabricated and tested to generate particular sound profiles when rotating. Different propellers may be used on the same aerial vehicle and selected such that the sounds generated by the rotation of the propellers cause destructive interface with each other and/or with other sounds generated by or near the aerial vehicle. The resulting net effect of the sounds is thus dampened, reduced, and/or otherwise altered.

Figure 8C:
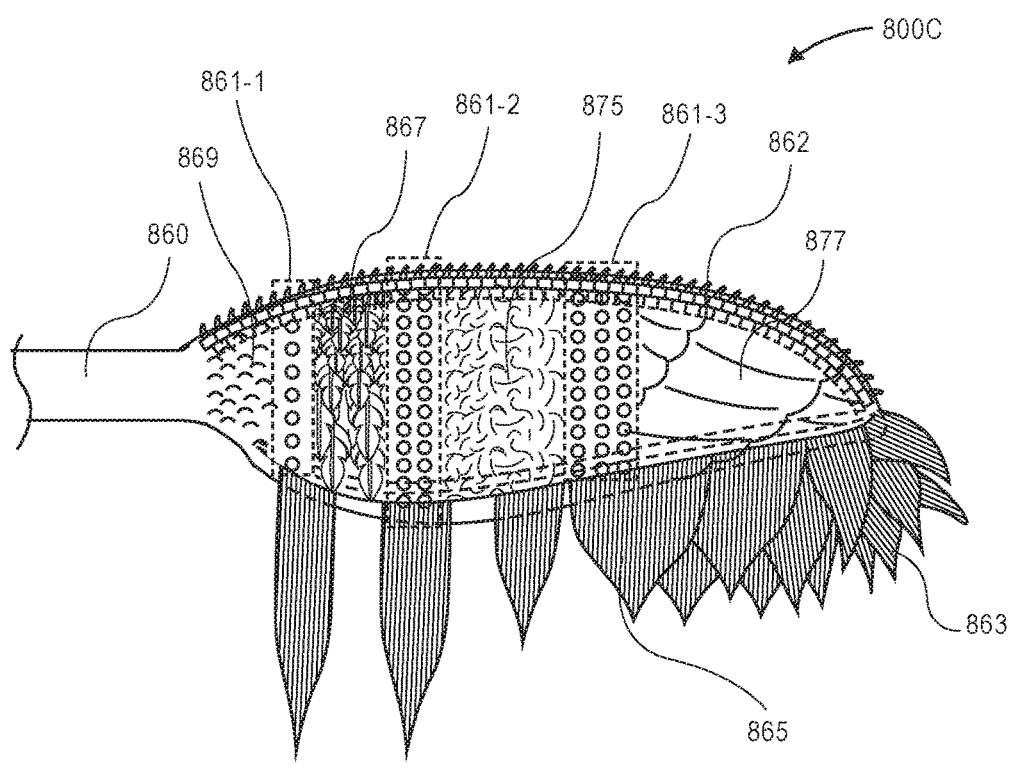

FIG. 8C is a top-down view of a propeller blade 800C with multiple propeller blade treatments, according to an implementation. In this example, the propeller blade 800C includes propeller blade treatments in the form of serrations 862 extending along the leading edge of the propeller blade 800C, fringes 863, 865 extending from the trailing edge of the propeller blade, protrusions 869, a first set 861-1 of indentations arranged in a first pattern, a first sound dampening material 867, a second set 861-2 of indentations arranged in a second pattern, a second sound dampening material 875, a third set 861-3 of indentations arranged in a third pattern, and a third sound dampening material 857.

Similar to the above discussion, some or all of the propeller blade treatments, such as the serrations, fringes, etc., may be fixed or adjustable. In this example, the serrations 862 extend along the leading edge of the propeller blade and may be extended or retracted under the control of a propeller blade treatment adjustment controller. The fringes 865, 863 extend along the trailing edge of the propeller blade and may likewise be extended or retracted under control of the propeller blade treatment adjustment controller. The three sets, 861-1, 861-2, 861-3, of indentations arranged in patterns are positioned in-line with a rotation of the propeller blade 800C and spaced a defined distance apart along the propeller blade 800C. The protrusions are positioned between the hub 860 and the first set 861-1 of indentations. The first sound dampening material is affixed to the surface area between the first set 861-1 of indentations and the second set 861-2 of indentations. The second sound dampening material 875 is affixed to the surface area between the second set 861-2 of indentations and the third set 861-3 of indentations. The third sound dampening material is positioned between the third set 861-3 of indentations and the tip of the propeller blade.

While the example illustrated in FIG. 8C shows an upper side of the propeller blade 800C, it will be appreciated that a similar, or different, arrangement of propeller blade treatments may be affixed to the lower side of the propeller blade. Alternatively, the lower side of the propeller blade may not include any propeller blade treatments or it may only include one type of propeller blade treatment, such as a sound dampening material. Any type, number, and/or arrangement of propeller blade treatments may be affixed to any portion of the propeller blade to generate different sounds, alter frequency spectra, dampen sound, and/or generate anti-sounds. Likewise, while the discussion above has described that the serrations and/or the fringes may be active, in some implementations, other types of propeller blade treatments may also be active.

Figure 9A:
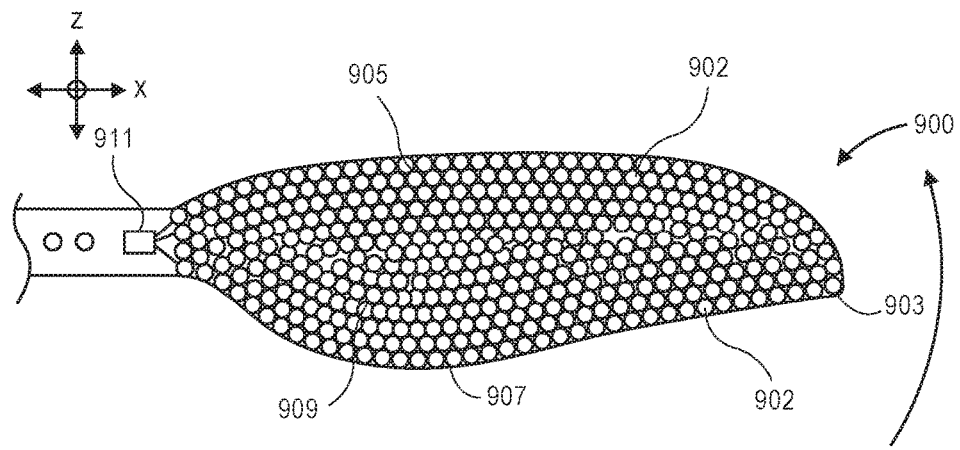
FIG. 9A is a top-down view of a propeller blade with propeller blade treatments, according to an implementation.

For example, FIG. 9A is a top-down view of a propeller blade 900 that includes a plurality of propeller blade treatments 902, according to an implementation. In this example, the propeller blade treatments may be actuated and moved from a first position to a second position. For example, each of the propeller blade treatments may include piezoelectric actuators that are individually addressable by the propeller blade treatment adjustment controller 911 such that the actuators can be activated or deactivated by instructions from the propeller blade treatment adjustment controller 911. When a propeller blade treatment is activated, the actuator expands causing the propeller blade treatment 902 to protrude from the surface of the propeller blade 900, forming a protrusion, as discussed above. When the propeller blade treatment 902 is deactivated, the actuator retracts causing the propeller blade treatment 902 to contract toward the surface of the propeller blade 900.

The propeller blade treatments 902 on the propeller blade 900 may be positioned on the leading edge 905, the trailing edge 907, the tip 903, and/or on the upper and/or lower surface area 909 of the propeller blade 900. Likewise, the propeller blade treatments may be of any shape, size, pattern, and/or density. For example, the propeller blade treatments may be more densely positioned at the tip of the propeller blade and less dense toward the middle of the surface area of the propeller blade 900. In other implementations, the propeller blade treatments 902 may be larger and/or protrude further from the surface area near the tip 903 of the propeller blade 900 than toward the middle of the propeller blade 900. In still other implementations, the propeller blade treatments 902, when activated, may move inward forming indentations, such as those discussed above.

Figure 9B:
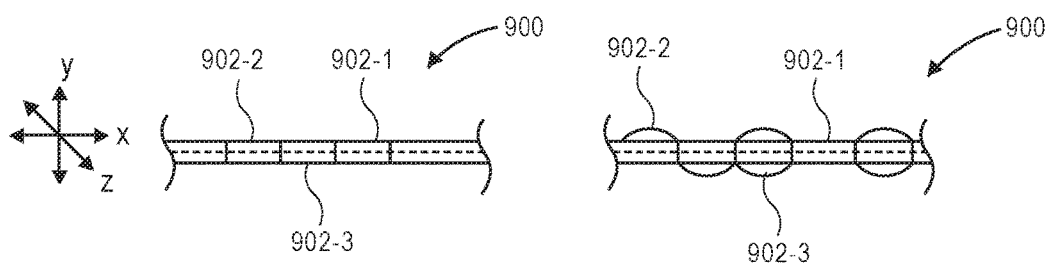
FIGS. 9B-9C are side-views of a propeller blade with propeller blade treatments, according to an implementation.
Figure 9C:
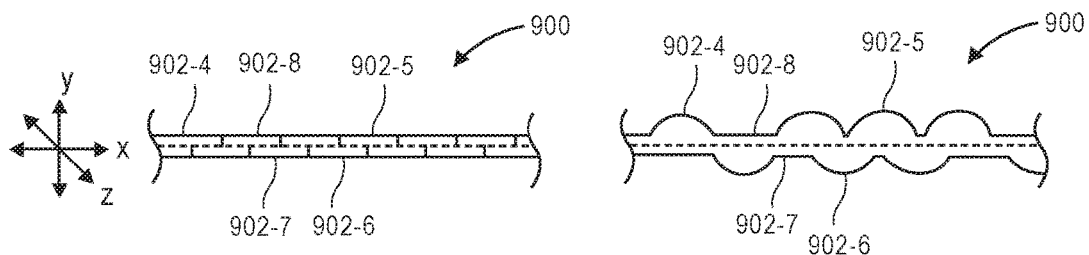

FIG. 9B illustrates a side-view of a portion of a propeller blade illustrating a first position when the propeller blade treatments 902-1, 902-2, 902-3 are not activated and are approximately in a same plane as the surface of the propeller blade. In a second mode, the actuators of propeller blade treatments 902-2 and 902-3 have been activated causing the propeller blade treatments to protrude from the surface area of the propeller blade 900, while propeller blade treatment 902-1 has not been activated and remains approximately in the same plane as the surface area of the propeller blade 900. In some implementations, as illustrated in FIG. 9B, the propeller blade treatments may be aligned in a pattern on the upper side of the surface area of the propeller blade and/or on the lower side of the propeller blade. In other implementations, as illustrated in FIG. 9C, the positioning of the propeller blade treatments on the upper side of the propeller blade 900 may be offset with respect to the position of the propeller blade treatments on the lower side of the propeller blade 900. For example, FIG. 9C illustrates the propeller blade treatments 902-4, 902-5, 902-6, 902-7, and 902-8 positioned in an offset matter. When the propeller blade treatments 902-4, 902-5, 902-6, 902-7, and 902-8 are in a first position and retracted, they are approximately in a same plane as the propeller blade. However, as illustrated, when propeller blade treatments 902-4, 902-5, and 902-6 are activated, they protrude from the surface area of the propeller blade. Likewise, as illustrated, the propeller blade treatments 902-4, 902-5, and 902-8 on the upper side of the propeller blade are offset with respect to the propeller blade treatments 902-6 and 902-7 positioned on the underneath side of the propeller blade 900.

Figure 10:
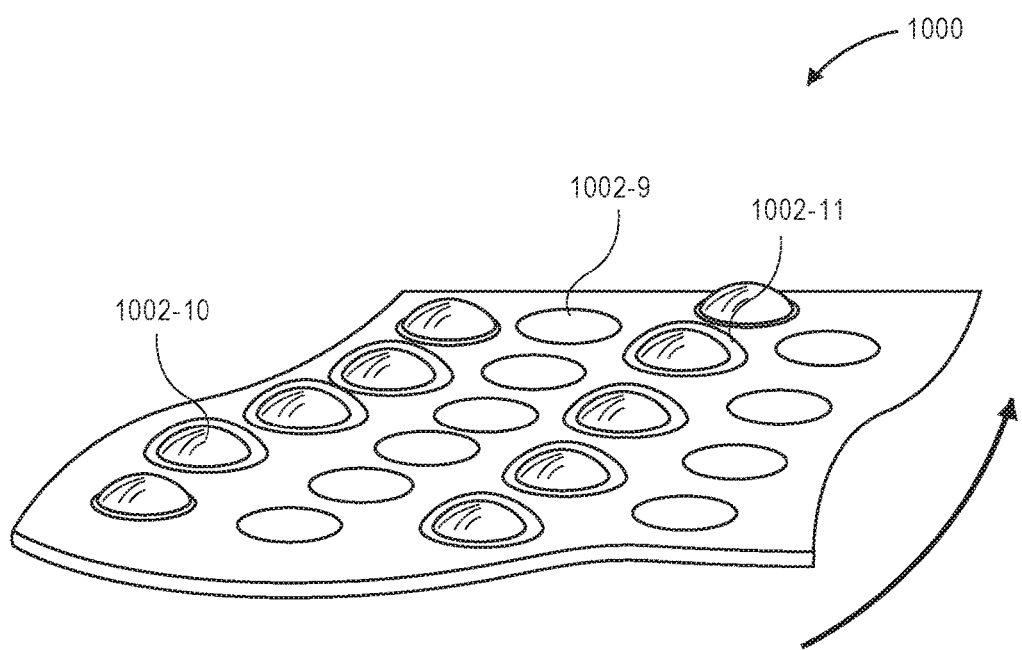
FIG. 10 is another view of a propeller blade with propeller blade treatments, according to an implementation.

By individually activating and deactivating the propeller blade treatments, a multitude of different surface area patterns, and thus resulting sounds, may be generated by the same propeller. Likewise, by activating certain propeller blade treatments and not activating others, different patterns may be formed on the propeller blade to control or channel the airflow over the blade, thereby altering the sound generated by the propeller blade as the propeller is rotating. For example, referring to FIG. 10, illustrated is a partial view of an upper side of the surface area of a propeller blade 1000, according to an implementation. Continuing with the example discussed with respect to FIGS. 9A-9C, the propeller blade treatments 1002 include piezoelectric actuators that may be individually activated or deactivated to alter the shape of the propeller blade treatments. In this example, by activating the propeller blade treatments in the row aligned with propeller blade treatment 1002-10, activating the propeller blade treatments in the row aligned with propeller blade treatment 1002-11, and not activating the propeller blade treatments in the row aligned with propeller blade treatment 1002-9, a channel is formed between the two rows of activated propeller blade treatments. This pattern results in increased airflow passing through the channel, thereby altering the sound generated by the propeller blade as it rotates.

Figure 11A:
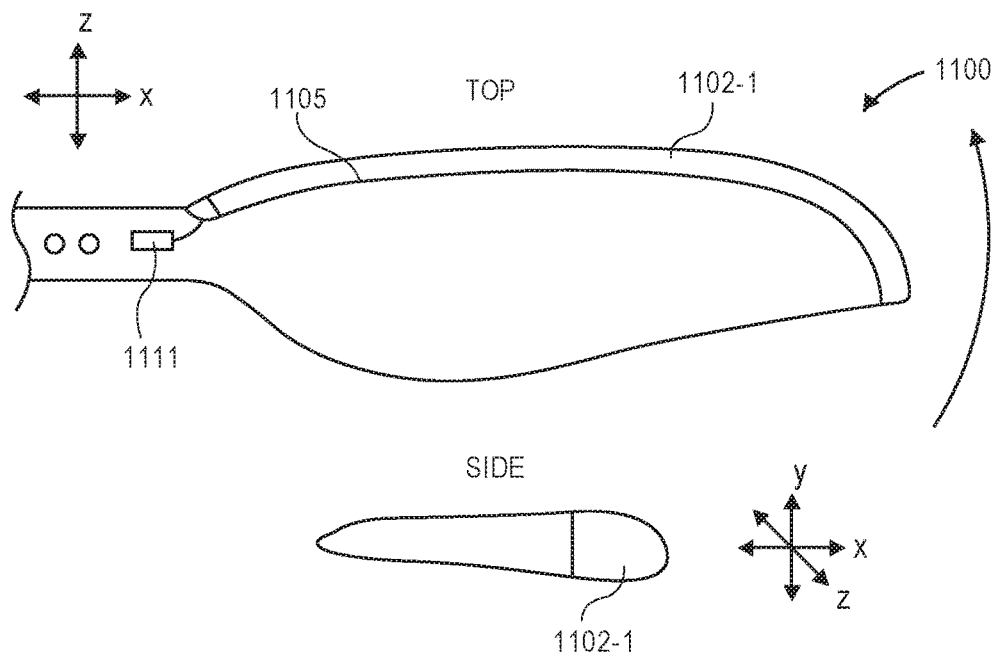
FIG. 11A is a top-down and side-view of a propeller blade with propeller blade treatments, according to an implementation.

FIG. 11A is a top-view and a side-view of a propeller blade 1100 that includes a propeller blade treatment 1102-1, according to an implementation. In this example, the propeller blade treatment 1102-1 is an inflatable bladder that extends along the leading edge 1105 of the propeller blade. When the propeller blade treatment 1102-1 is in a first position, it is deflated and retracted against the leading edge 1105 of the propeller blade such that it is substantially in line with the propeller blade, as illustrated in FIG. 11A.

Figure 11B:
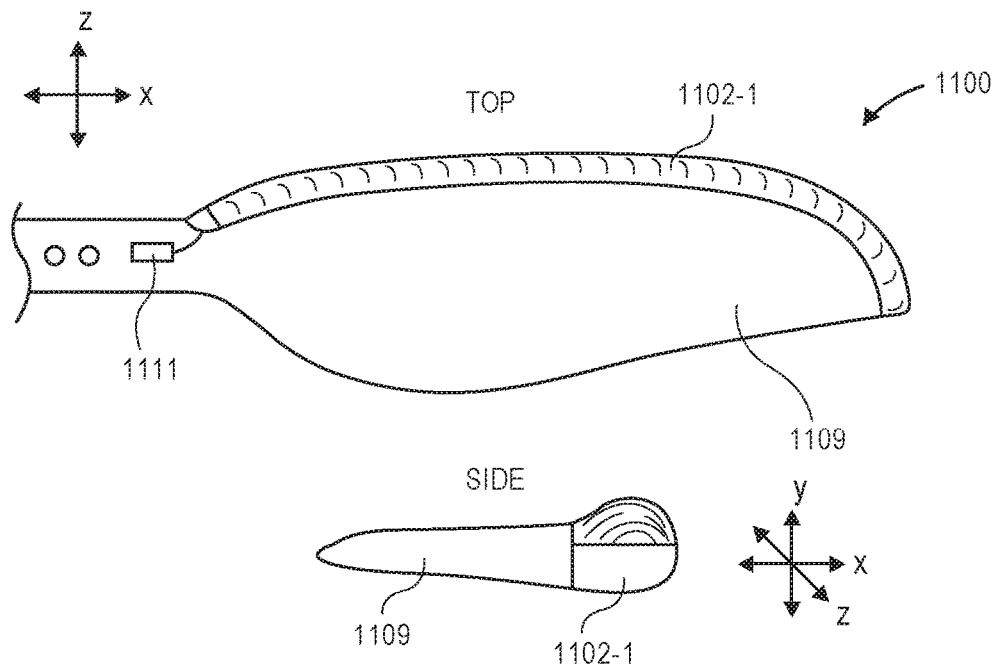
FIG. 11B is a top-down and side-view of a propeller blade with propeller blade treatments, according to an implementation.

To alter the position of the propeller blade treatment 1102 from the first position, illustrated in FIG. 11A, to a second position, illustrated in FIG. 11B, the propeller blade treatment adjustment controller 1111 causes the propeller blade treatment 1102-1 to inflate. When the propeller blade treatment inflates, it expands in a direction that includes a vertical and/or horizontal component with respect to the surface area 1109 of the propeller blade 1100. For example, as illustrated in the side view of FIG. 11B, the propeller blade treatment 1102-1 expands out of the plane of the surface area 1109 of the propeller blade 1100. This altered shape of the propeller blade disrupts the airflow as it passes over the propeller blade, thereby changing the sound generated by the propeller blade as the propeller rotates.

The propeller blade treatment 1102 illustrated in FIG. 11A and FIG. 11B may be of any type of expandable or flexible material. Likewise, while this example illustrates the propeller blade treatment 1102 extending along the leading edge, in other implementations, the propeller blade treatment 1102 may be at other positions and/or orientations along the propeller blade. Similar to the other propeller blades discussed herein in which the propeller blade treatment may be moved between a first position and a second position, the propeller will generate different sounds when the propeller blade treatments are at different positions. In this example, the propeller blade may be capable of generating multiple different sounds as it rotates, depending on the amount of inflation of the propeller blade treatment 1102-1. For example, the propeller blade 1100 may generate a first sound when rotating and the propeller blade treatment 1102-1 is in a first position (e.g., not inflated), generate a second sound when rotating and the propeller blade treatment 1102-1 is in a second position (e.g., 50% inflated), and generate a third sound when the propeller is rotating and the propeller blade treatment 1102-1 is in a third position (e.g., 100% inflated). By varying the amount of inflation, and thus the shape of the propeller blade treatment, different sounds may be generated by the propeller blade 1100 as the propeller rotates.

Figure 12A:
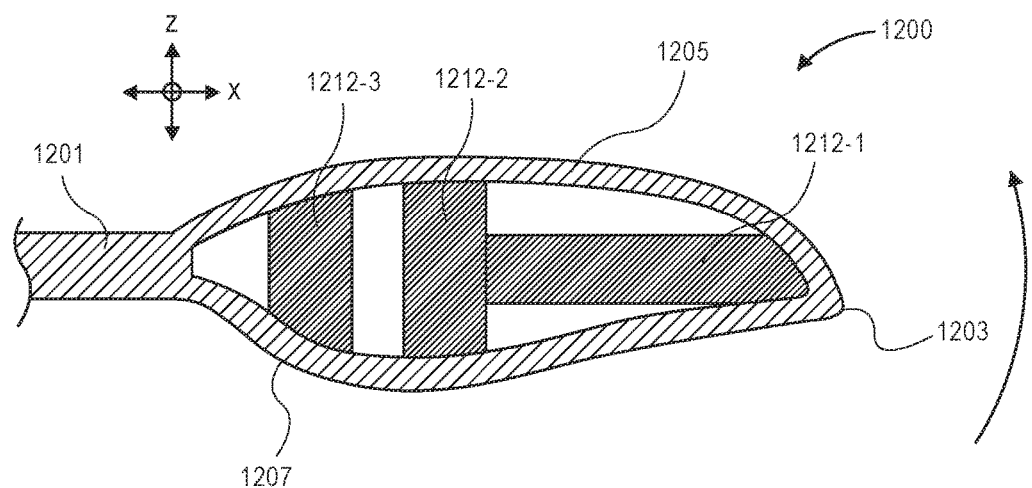
FIGS. 12A-12B are top-down views of a propeller blade, according to an implementation.
Figure 12B:
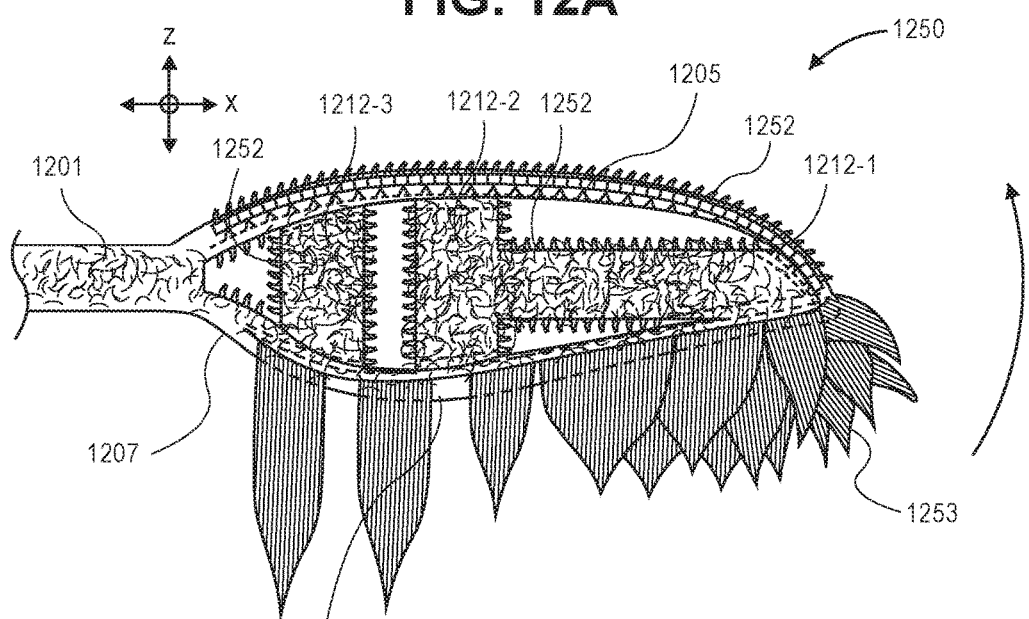

FIGS. 12A and 12B are top-down views of a propeller blade 1200, 1250, according to an implementation. In the examples illustrated in FIGS. 12A and 12B, a portion of the surface area of the propeller blades has been removed. Referring first to FIG. 12A, the propeller blade includes a hub 1201, a tip 1203, a leading edge 1205 that extends between the hub 1201 and the tip, and a trailing edge 1207 that extends between the hub 1201 and the tip. With the exception of the segments 1212-1, 1212-2, and 1212-3, the surface area of the propeller blade has been removed. With the removed surface area, air is able to pass through the propeller blade as it rotates and the weight of the propeller blade is reduced. The leading edge 1205, trailing edge 1207, and remaining segments 1212-1, 1212-2, and 1212-3 produce the commanded lift.

As illustrated in FIG. 12B, one or more propeller blade treatments may be included on the propeller blade 1250 to alter the sound generated when the propeller blade is rotating. For example, serrations 1252 may be included in the leading edge 1205 of the propeller blade, along the leading edge of the segment 1212-1 and/or along the edges of segments 1212-2, 1212-3. Likewise, fringes may be included that extend from the trailing edge 1207 and/or from the trailing edge of segment 1212-1. Sound dampening material may be included on the surface area of segments 1212-1, 1212-2, and 1212-3, which may include either or both the upper surface area or the lower surface area of the segments 1212-1, 1212-2, and 1212-3.

Eliminating portions of the surface area of the propeller blade 1250 and including additional propeller blade treatments on the remaining segments of the propeller blade 1250 further alters the sound profile of the propeller blade. For example, when the propeller is rotating, the air is channeled through the serrations 1252 on the leading edge of the propeller and forms small vortices and/or turbulent flows. Rather than small vortices and/or turbulent flows traveling across the surface area of the propeller, some of the vortices and/or turbulent flows pass through the opening in the surface area and are channeled through the serrations 1252 extending from the leading edge of the segment 1212-1. The smaller vortices and/or turbulent flows passing through the serrations on the leading edge of the segment 1212-1 of the surface area are further disrupted by the serrations and then absorbed by the sound dampening material affixed to the surface area of the segment 1212-1. Similar disruptions and/or absorptions are realized on the segments 1212-2, 1212-3. Finally, vortices and/or turbulent flows that are not absorbed are smoothed by the fringes 1253 extending from the trailing edge of the propeller. The combined effects of the opening in the propeller blade and the propeller blade treatment dampens, reduces, and/or otherwise alters the total sound generated by the propeller blade as the propeller blade rotates through the air.

Figure 13A:
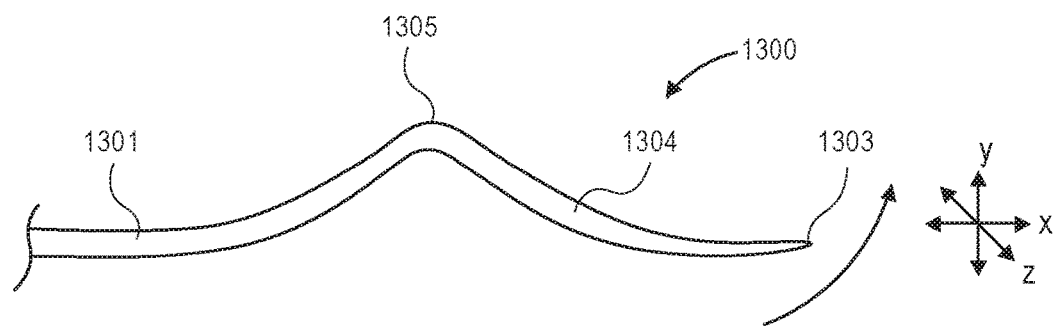
FIGS. 13A-13C are side-views of a propeller blade, according to an implementation.
Figure 13B:
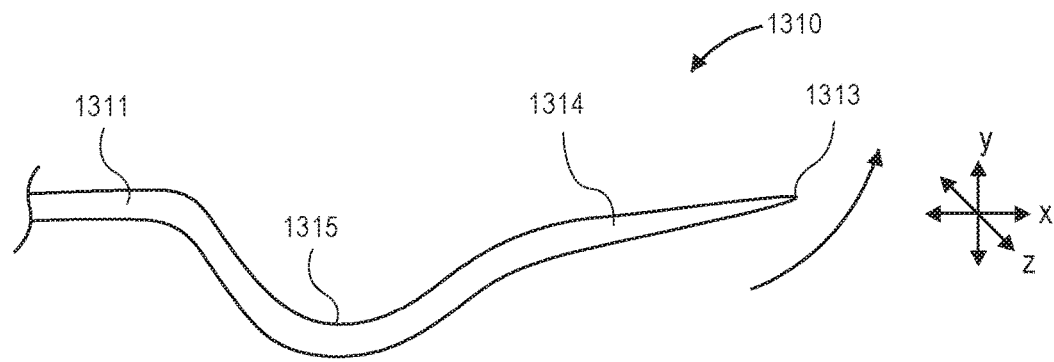
Figure 13C:
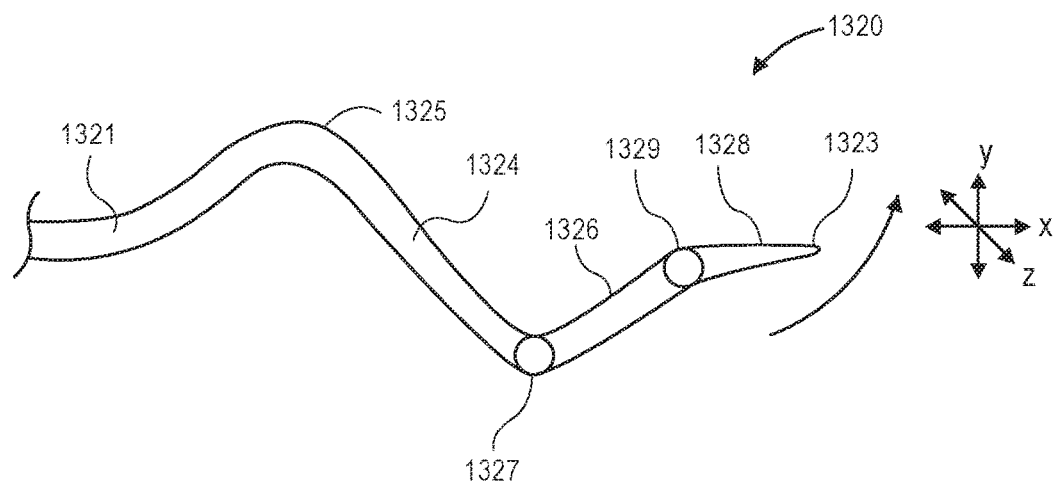

FIGS. 13A-13C are side-views of a propeller blade, according to an implementation. In these examples, rather than the propeller blade being linearly designed, the propeller blades include one or more deviations, bends, or joints. By altering the plane or shape of the propeller blade, the sound generated by the propeller when rotating is altered. For example, a propeller blade having a first shape, such as that illustrated in FIG. 13A, will generate a sound at a first most prominent frequency. A propeller blade having a second shape, such as that illustrated in FIG. 13B, will generate a sound at a second most prominent frequency. A propeller blade having a third shape, such as that illustrated in FIG. 13C, will generate a sound at a third most prominent frequency. By utilizing combinations of different shaped propellers having the same or different propeller blade treatments on the same aerial vehicle, some of the sounds generated by some of the propeller blades will cause destructive interference with sounds generated by other propeller blades, thereby reducing and/or otherwise altering the total sound generated by operation of the aerial vehicle. Likewise, some of the propeller blades may generate sounds that act as anti-sounds with respect to other sounds (e.g., motor sounds) generated during operation of the aerial vehicle.

In FIG. 13A the propeller blade 1300 includes a bend in the Y direction out of the plane of the propeller blade 1300 in an upward direction. As such, the propeller blade 1300 includes a first segment 1301 and a second segment 1304 that form a peak 1305 between the hub of the propeller blade and the tip 1303 of the propeller blade.

In FIG. 13B, the propeller blade 1310 includes a bend in the Y direction out of the plane of the propeller blade 1300 in a downward direction. As such, the propeller blade 1310 includes a first segment 1311 and a second segment 1314 that form a valley 1315 between the hub of the propeller blade and the tip 1313 of the propeller blade.

In FIG. 13C, the propeller blade 1320 includes a first bend in the Y direction out of the plane of the propeller blade 1320 in an upward direction and a second bend in the Y direction out of plane in a downward direction. As such, the propeller blade 1320 includes a first segment 1321 and a second segment 1324 that form a peak 1325 between the hub of the propeller blade and the tip 1323 of the propeller blade. In this example, the propeller blade 1320 also includes a first joint 1327 at which the propeller blade 1320 is altered to form a valley between the second segment 1324 and a third segment 1326 and a second joint 1329 that alters the angle of the propeller blade between the third segment 1326 and a fourth segment 1328.

While the examples illustrated in FIGS. 13A-13C describe altering the shape of the propeller blade in a Y direction, in other implementations, the propeller blade shape may be altered in the X direction, the Z direction, and/or any combination of the X, Y, and Z directions to generate different sounds and/or different frequency spectra. As discussed above, when a propeller blade is fabricated, it may be tested to determine a sound profile. Different shaped propellers with different sound profiles may be used on the same aerial vehicle to generate different sounds that dampen, reduce, and/or otherwise alter a total sound of the aerial vehicle.

In some implementations, different shaped propeller blades may also be combined with one or more of the propeller blade treatments discussed above. For example, if a propeller includes two propeller blades, each propeller blade may have a different shape and/or different types of propeller blade treatments. For example, one of the propeller blades may have a first propeller blade shape and include propeller blade treatments that generate a first sound. The second propeller blade, which may have a different propeller blade shape and/or include different propeller blade treatments, may generate a second sound that will cause destructive or constructive interference with the first sound (i.e., an anti-sound).

As discussed, propeller blades with different propeller blade treatments and/or different shapes generate different sounds at different rotational speeds because the airflow over the propeller blade is disrupted by the different propeller blade treatments and/or shapes. Lifting forces generated by the propeller blade may also vary depending on the size, shape, number, and/or position of the propeller blade treatments and/or the shape of the propeller blade. Likewise, the power required to rotate the propeller to generate a commanded lifting force may also vary depending on the size, shape, number, and/or position of the propeller blade treatments and/or the shape of the propeller blade. For example, if there are multiple propeller blade treatments on the leading edge of the propeller blade, the power required to rotate the propeller to generate a desired lift and/or thrust may be increased or decreased due to the additional drag caused by the propeller blade treatments.

The propeller blade treatment adjustment controller may consider the lifting force to be generated, the anti-sound to be generated, the allowable sound level for the aerial vehicle, and the corresponding power requirements, to determine positions for adjustable propeller blade treatments. For example, a propeller rotating at a first speed with adjustable propeller blade treatments in a first position may generate a first sound, a first lifting force, and draw a first amount of power. Likewise, the same propeller blade with the propeller blade treatments in a second position and rotating at the same speed may generate a second sound, generate the same lifting force, but require a different amount of power. Likewise, placing the propeller blade treatments in a third position and rotating the propeller blade at the same speed may generate the third sound, a different lifting force, and require yet another amount of power. The combinations of propeller blade treatment positions, rotational speeds, resulting lifting forces, sounds, and power requirements that may be selected for use in aerially navigating the aerial vehicle and generating a desired sound are essentially unbounded.

Figure 14:
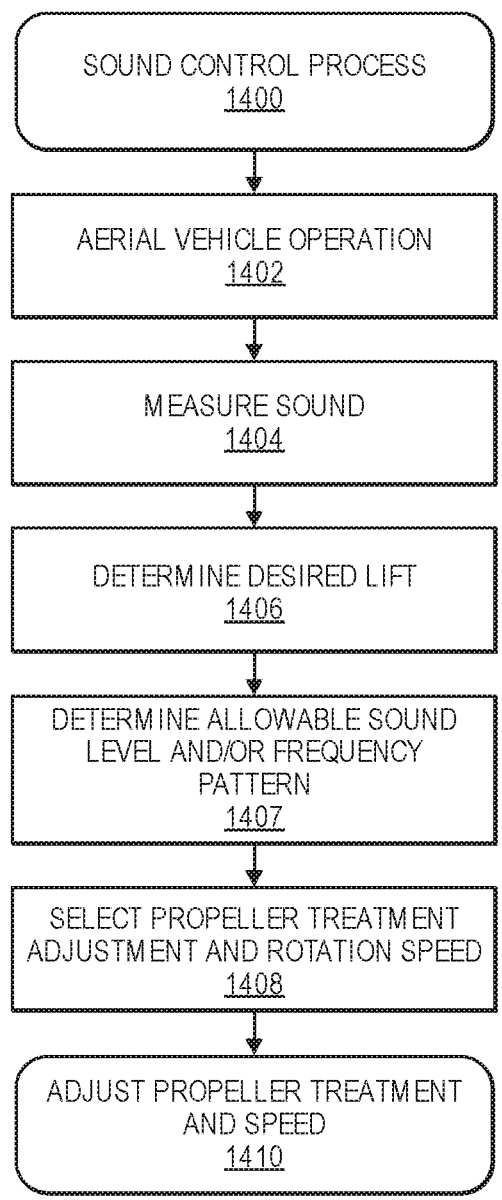
FIG. 14 is a flow diagram of a sound control process, according to an implementation.

FIG. 14 is a flow diagram illustrating an example process 1400 for active sound control, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 1400 may operate independently at each propeller blade and/or may be performed by a central system and propeller adjustment instructions sent by the central system to each of the respective propeller blade treatment adjustment controllers. The example process 1400 begins when an aerial vehicle that includes one or more propeller blade treatment adjustment controllers is operational, as in 1402. In some implementations, the example process 1400 may only operate when the aerial vehicle is airborne and/or the motors are rotating. In other implementations, the example process 1400 may be active at any time in which the aerial vehicle is powered.

When the aerial vehicle is operational, sound generated by and/or around the aerial vehicle is measured by a sensor of the aerial vehicle, as in 1404. For example, a sensor, such as a microphone, may detect and measure sound generated by or around an aerial vehicle. As discussed above, sensors may be positioned at each propeller and independently measure sounds near those propellers. In other implementations, sensors may be positioned on the body of the aerial vehicle and measure all sounds around the aerial vehicle.

In addition to measuring sound, the example process determines the lift to be generated by each of the propellers, as in 1406. The lift for each propeller may be determined based on the commanded flight path, navigation instructions, altitude, heading, wind, emergency maneuvers, etc. Likewise, the example process 1400 may determine an allowable sound level and/or frequency spectrum that may be generated by the aerial vehicle, as in 1407. The allowable sound level and/or frequency spectrum may be defined for the aerial vehicle based on, for example, the position of the aerial vehicle, the altitude of the aerial vehicle, environmental conditions, operational conditions, etc. For example, the allowable sound level may be lower when the aerial vehicle is at a low altitude and in an area populated by humans. In comparison, the allowable sound level may be higher when the aerial vehicle is at a high altitude and/or in an area that is not populated by humans. Similarly, the allowable frequency spectrum may be determined based on the area in which the aerial vehicle is located, other sounds around the aerial vehicle, etc.

Based on the measured sound, the determined lift for the propeller, and/or the allowable sound level, a position of one or more propeller blade treatments and a rotational speed are selected that will generate a sound and produce the desired amount of lift, as in 1408. For example, the sound may be an anti-sound that is the measured sound with a 180 degree phase shift, which is effectively an inverse of the measured sound. Alternatively, or in addition to positioning the propeller blade treatments to generate an anti-sound, some propeller blade treatment positions may be selected that will dampen or otherwise alter a sound generated by the propeller blade. For example, one or more propeller blade treatments, such as serrations on the leading edge of the propeller blade and/or fringes on the trailing edge, may be moved into an extended position that will dampen, reduce, and/or otherwise alter the total sound generated by the rotation of the propeller blade.

As discussed above, there may be multiple positions for propeller blade treatments of a propeller blade, multiple propeller blade shapes, and/or multiple rotational speeds that will generate the desired lift and sounds. For example, the aerial vehicle may maintain or be provided a table, similar to Table 1 below, that includes different positions for adjustable propeller blade treatments, sounds profiles, rotational speeds, and corresponding lifting forces. Because there are potentially multiple configurations of propeller blade treatment positions and/or propeller blade shapes that will generate a similar sound, the example process may also consider a power draw for the different positions of the propeller blade treatments and/or propeller blade shapes that will generate the same lifting force at a rotational speed and select propeller blade treatment positions and/or propeller blade shapes that will generate a particular sound and a commanded lifting force that requires the least amount of power. In selecting positions for adjustable propeller blade treatments and/or propeller blade shapes, the aerial vehicle may query one or more stored tables, such as Table 1 below, to select a desired configuration of positions for the propeller blade treatments, propeller blade shapes, and rotational speed to generate the desired sound and lift.

TABLE 1

| PBT-1 | PBT-2 | PBT-N | Propeller RPM | Lift | Power | Sound |
|---|---|---|---|---|---|---|
| P1 | P1 | P1 | 4,500 | 120N | 1,000 W | 88 dB at 622 Hz |
| P1 | P1 | P2 | 2,800 | 80N | 800 W | 78 dB at 800 Hz |
| P1 | P2 | P1 | 4,000 | 100N | 900 W | 80 dB at 900 Hz |
| P1 | P2 | P2 | 4,300 | 110N | 950 W | 85 dB at 974 Hz |
| P2 | P1 | P1 | 3,000 | 110N | 950 W | 88 dB at 622 Hz |
| P2 | P1 | P2 | 2,500 | 55N | 750 W | 78 dB at 800 Hz |
| P2 | P2 | P1 | 2,800 | 60N | 775 W | 80 dB at 900 Hz |
| P2 | P2 | P2 | 2,900 | 65N | 800 W | 85 dB at 974 Hz |
| . . . | | | . . . | . . . | | . . . |
| PN | PN | PN | . . . | . . . | . . . | . . . |

Instructions are then sent to cause the positions of the propeller blade treatments and/or the shape of the propeller blade to be adjusted based on the selected sound profile and the rotational speed of the propeller motor to be adjusted so that the desired sound and lift are generated by the propeller, as in 1410. Upon adjustment of the positions of the propeller blade treatments, the propeller blade shape, and/or the rotational speed, and while the aerial vehicle is operational, the example process 1400 returns to block 1404 and continues.

Figure 15A:
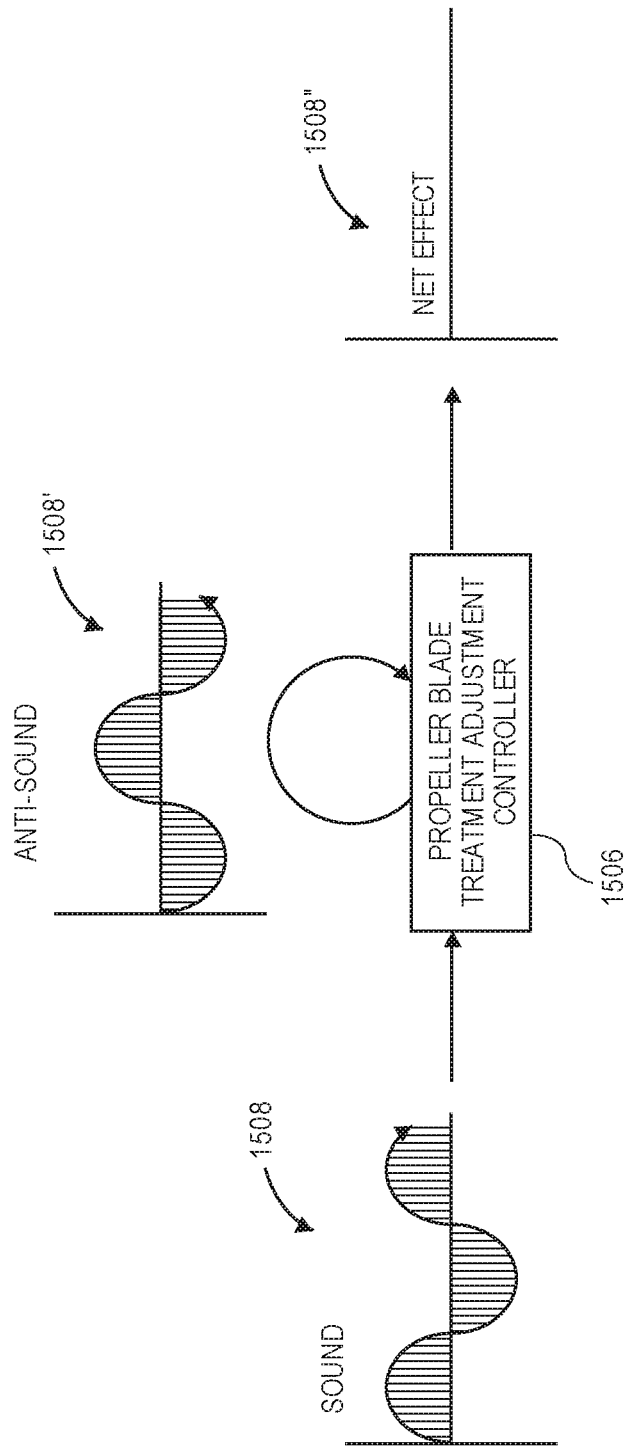

FIGS. 15A-15D are block diagrams illustrating sound control system configurations in which propeller blades with propeller blade treatments are used to generate an anti-sound and/or propeller blades with adjustable propeller blade treatments are used in which the positions of the propeller blade treatments are adjusted to generate different anti-sounds, according to an implementation. Turning first to FIG. 15A, illustrated is a block diagram in which the sound control system includes only a propeller blade with propeller blade treatments 1506 that cause the propeller blade to generate an anti-sound 1508' when rotated. The propeller blade treatments may be stationary, adjustable, or a combination thereof. In the illustrated configuration, sound may not be measured and the anti-sound generated based on the anticipated or predicted sound 1508 at or near the aerial vehicle.

In such a configuration, aerial vehicle sounds may be generated and measured over a period of time and propeller blades with propeller blade treatments selected such that the sounds generated by the rotation of the propeller blade will dampen, reduce, and/or otherwise alter the sound 1508. By knowing the anticipated sounds of the aerial vehicle, the positions of the propeller blade adjustments may be selected so that the propeller will generate sounds 1508' that combine with or alter the generated sound 1508 during aerial vehicle operation. The adjusted sound 1508', when combined with the generated sound 1508, results in a net effect 1508" of reduced or no sound generated from that portion of the aerial vehicle. While the example illustrated in FIG. 15A shows a net effect 1508" of no sound, in some implementations, the sound may only be reduced or partially suppressed, or otherwise altered, such that the net effect 1508" is an altered sound. In other implementations, the sound may be otherwise modified. For example, rather than suppressing or just reducing the sound, the anti-sound 1508' may combine with the sound 1508 to generate a net effect 1508" that results in an audible sound that is more desirable (e.g., has a different frequency spectrum or most prominent tonal frequency component). During operation of the aerial vehicle, the position of one or more of the propeller blade treatments may periodically change so that the resulting anti-sound can be altered or adjusted to account for changes in the sound. For example, as the aerial vehicle descends, the generated sound may change and/or the lift to be generated by the propeller may be reduced. To account for the changes, the position of one or more of the propeller blade treatments may be changed as the rotation of the propeller blade decreases, thereby generating an altered anti-sound.

Figure 15B:
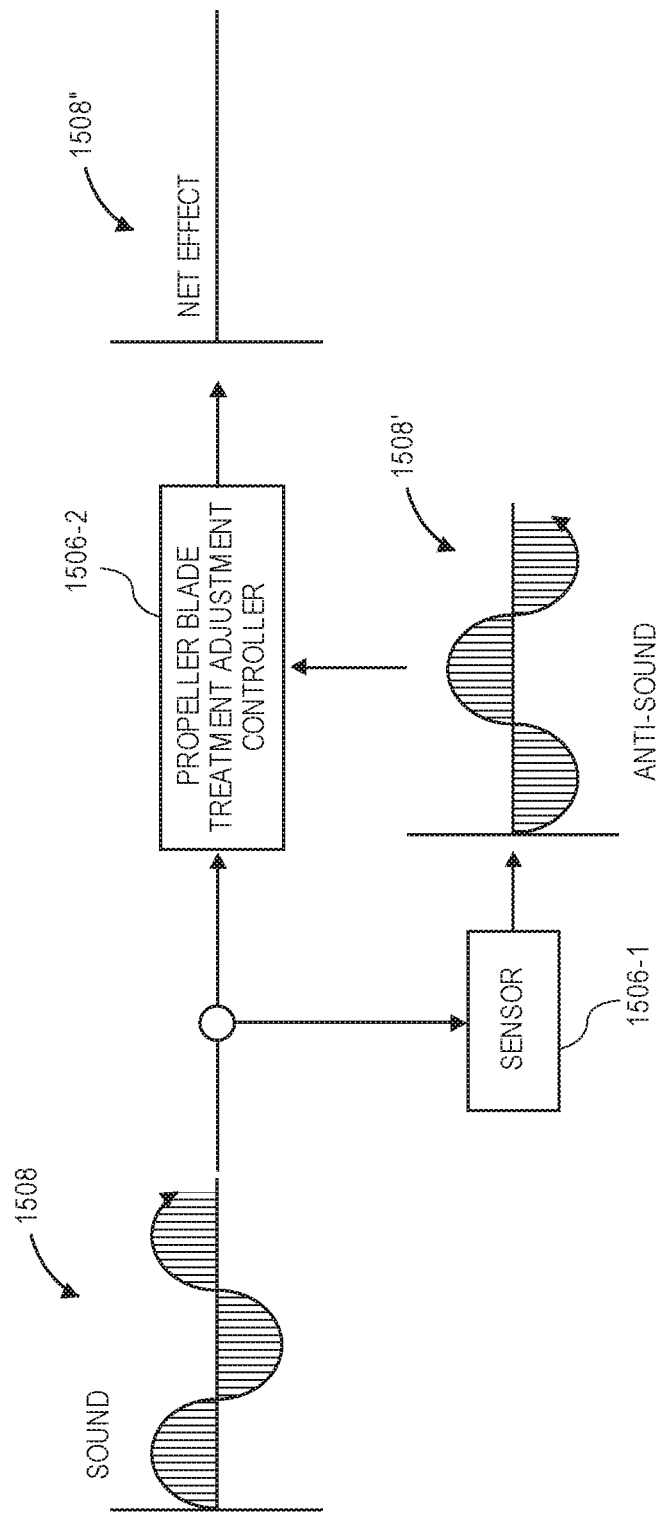

FIG. 15B illustrates a block diagram in which the sound control systems include a sensor 1506-1 and a propeller blade treatment adjustment controller 1506-2. In this illustrated configuration, the sound control system utilizes a feed-forward control. In feed-forward, the sensor measures the sound generated by or around the aerial vehicle and feeds that sound or the anti-sound forward so that the propeller blade treatment adjustment controller 1506-2 can select propeller blade treatment positions and/or a rotational speed that will generate the anti-sound 1508'. This is done without considering the net effect or output from the combined measured sound and anti-sound.

Upon receiving the measured sound 1508 or anti-sound 1508', and determining positions for each of the adjustable propeller blade treatments, the propeller blade treatment adjustment controller 1506-2 alters the positions of the propeller blade treatments and/or changes the rotational speed of the propeller to generate the determined anti-sound. Similar to FIG. 15A, the anti-sound 1508', which may be the measured sound phase shifted 180 degrees, when combined with the sound 1508, results in a net effect 1508" of damped, reduced, or otherwise altered sound (e.g., no sound) from the area of the UAV where the propeller and sensor are positioned.

While the example illustrated in FIG. 15B describes that the sensor measures the sound and provides it to the propeller blade treatment adjustment controller 1506-2, in other implementations, the sensor 1506-1 may provide the measured sound to another computing component that determines positions for the propeller blade treatments and/or rotational speed that is to be used to generate a desired anti-sound. That computing component may then provide instructions to the propeller blade treatment adjustment controller 1506-2 to alter the positions of one or more propeller blade treatments and/or alter the rotational speed of the propeller so that the anti-sound is generated. Likewise, while the example illustrated in FIG. 15B shows a net effect 1508" of no sound, in some implementations, the sound may only be reduced, partially suppressed, and/or otherwise altered.

Figure 15C:
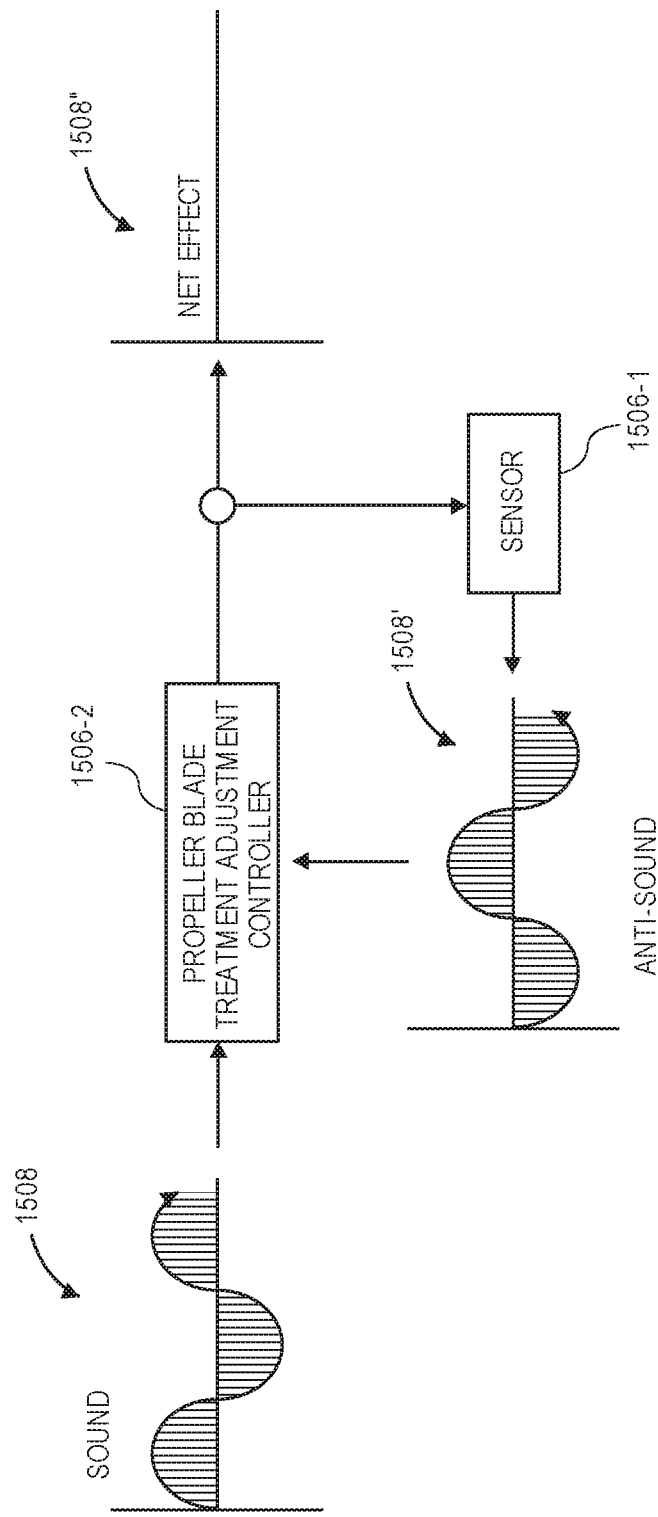

FIG. 15C illustrates a block diagram in which the sound control system includes a sensor 1506-1 and a propeller blade treatment adjustment controller 1506-2. In this illustrated configuration, the sound control system utilizes a feedback control. In feedback, the sensor 1506-1 measures the output or net effect 1508" resulting from a combination of the sound 1508 and the anti-sound 1508' generated by the propeller in which the propeller blade treatments have been adjusted according to the propeller blade treatment adjustment controller 1506-2. The measured sound or anti-sound is fed back to the propeller blade treatment adjustment controller. Based on the updated anti-sound, positions of one or more propeller blade treatments may be altered and/or the rotation speed may be adjusted so that the propeller will generate the desired anti-sound. With a feedback control, the net effect 1508" is considered and utilized to generate or update the anti-sound 1508' that is used to select positions for the propeller blade treatments and/or the propeller rotational speed. Upon determining the updated positions for the propeller blade treatments and/or the rotational speed needed to generate the updated anti-sound, the propeller blade treatment adjustment controller adjusts the position of one or more propeller blade treatments and/or alters the rotational speed of the propeller so that the updated anti-sound is generated.

While the example illustrated in FIG. 15C describes that the sensor 1506-1 feeds back the measured net effect 1508" to the propeller blade treatment adjustment controller 1506-2, in other implementations, the sensor 1506-1 may provide the measured net effect 1508" to another computing system that determines an anti-sound and positions for the propeller blade treatments and/or a rotational speed to generate the anti-sound and commanded lift from the propeller. That computing system may then provide the positions of the propeller blade treatments and/or the determined rotational speed to the propeller blade treatment adjustment controller that adjusts the position of one or more of the propeller blade treatments and/or alters the rotational speed of the propeller so that the propeller will generate the anti-sound 1508'.

Likewise, while the example illustrated in FIG. 15C shows a net effect 1508" of no sound, in some implementations, the sound may only be reduced, partially suppressed, or otherwise altered.

FIG. 15D illustrates a block diagram in which the sound control system only includes a propeller blade treatment adjustment controller 1506-2 and does not include a sensor. In this configuration, the anti-sound and corresponding positions for the propeller blade treatments and/or the rotational speed of the propeller that will generate the desired anti-sound and commanded lift may be determined based on a machine-learned model that considers the operational and/or environmental conditions of the aerial vehicle. Based on the operational and/or environmental conditions, a predicted sound is determined and a corresponding anti-sound 1508' is provided to the propeller blade treatment adjustment controller 1506-2. Upon receiving the anti-sound, the propeller blade treatment adjustment controller 1506-2 selects positions for the propeller blade treatments and/or a rotational speed that will generate the desired anti-sound 1508' and causes the positions of one or more propeller blade treatments and/or the rotational speed to be adjusted. Like the other examples, the sound 1508 and the generated anti-sound 1508' combine to produce a net effect 1508" that is either no sound at or near the propeller, a reduced sound at or near the propeller, and/or a sound that is otherwise altered at or near the propeller.

While the example illustrated in FIG. 15D describes that an anti-sound signal is determined from a predicted sound and provided to the propeller blade treatment adjustment controller 1506-2, in other implementations, the predicted sound may be provided to another computing component and that computing component may determine positions for the propeller blade treatments and/or the rotational speed that will generate the desired anti-sound and commanded lift. Likewise, while the example illustrated in FIG. 15D shows a net effect 1508" of no sound, in some implementations, the sound may only be reduced, partially suppressed, and/or otherwise altered.

The positions of the propeller blade treatments that may be determined with respect to the examples illustrated in FIGS. 15A-15D may include position alterations in the horizontal (x) direction, vertical (y) direction, rotational (z) direction, and/or any combination thereof.

While the examples and configurations discussed above with respect to FIGS. 15A-15D describe selection of propeller blade treatment positions to generate an anti-sound that will combine with and cancel, reduce, and/or otherwise alter the sound generated by the aerial vehicle, in other implementations, the discussed configurations may be utilized to select propeller treatment positions that will reduce, dampen, and/or otherwise alter the sound generated by the aerial vehicle. For example, referring again to FIG. 15C, the sensor 1506-1 may feedback a measured net effect 1508" and it may be determined from the fed back net effect 1508" whether additional propeller blade treatments are to be made that will dampen or otherwise alter the resulting sound generated by the rotation of the propeller blade. Likewise, in addition to altering the position of one or more propeller blade treatments, the examples may likewise alter the shape of one or more of the propeller blades in addition to, or as an alternative to altering the position of one or more propeller blade treatments.

Referring to FIGS. 16A-16D, views of aspects of one system 1600 for active sound control in accordance with an implementation are shown. The illustration corresponding to FIGS. 16A-16D provides additional details of an example implementation for predicting an anti-sound and determining positions for one or more propeller blade treatments, propeller blade shapes, and rotational speed of the propeller that will generate the anti-sound and/or dampen or otherwise alter the sound, as illustrated in FIG. 15D.

Figure 16A:
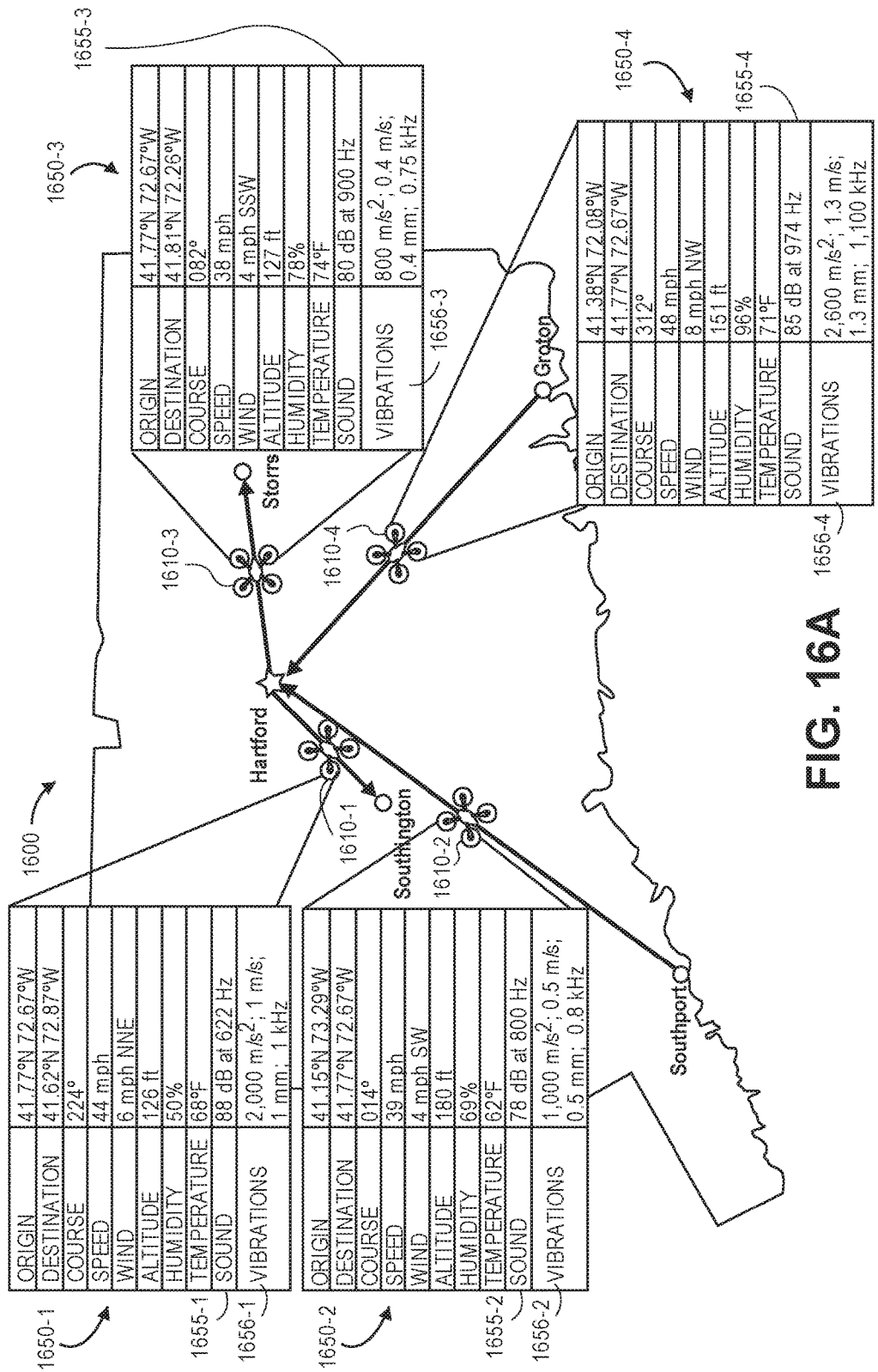
FIGS. 16A-16D are views of aspects of one system for active airborne sound control, according to an implementation.

FIG. 16A illustrates a plurality of aerial vehicles 1610-1, 1610-2, 1610-3, 1610-4 that are engaged in flight between origins and destinations. For example, the aerial vehicle 1610-1 is shown en route between Hartford, Conn., and Southington, Conn., while the aerial vehicle 1610-2 is shown en route between Southport, Conn., and Hartford. The aerial vehicle 1610-3 is shown en route between Storrs, Conn., and Hartford, while the aerial vehicle 1610-4 is shown en route between Hartford and Groton, Conn. The aerial vehicles 1610-1, 1610-2, 1610-3, 1610-4 are configured to capture extrinsic or intrinsic information or data 1650-1, 1650-2, 1650-3, 1650-4 regarding the aerial vehicles 1610-1, 1610-2, 1610-3, and 1610-4 and the environments in which the aerial vehicles 1610-1, 1610-2, 1610-3, 1610-4 are operating, including but not limited to information or data regarding locations, altitudes, courses, speeds, climb or descent rates, turn rates, accelerations, wind velocities, humidity levels and temperatures, sounds, etc., using one or more sensors. The aerial vehicles 1610-1, 1610-2, 1610-3, 1610-4 are also configured to capture sounds 1655-1, 1655-2, 1655-3, and 1655-4, and vibrations 1656-1, 1656-2, 1656-3, and 1656-4 generated by the aerial vehicles during their respective flights.

For example, as is shown in the information or data 1650-1 of FIG. 16A, the aerial vehicle 1610-1 is traveling on a course of 224° and at a speed of 44 miles per hour (mph), in winds of 6 mph out of the north northeast, at an altitude of 126 feet, in air having 50 percent humidity and a temperature of 68 degrees Fahrenheit (° F.), and the sound measured around the aerial vehicle 1610-1 is 88 decibels ("dB") at 622 Hz. The information or data 1650-2 of FIG. 16A indicates that the aerial vehicle 1610-2 is traveling on a course of 014° and at a speed of 39 mph, in winds of 4 mph out of the southwest, at an altitude of 180 feet, in air having 69 percent humidity and a temperature of 62° F., and that the sound around the aerial vehicle 1610-2 is 78 dB at 800 Hz. The information or data 1650-3 of FIG. 16A indicates that the aerial vehicle 1610-3 is traveling on a course of 082° and at a speed of 38 mph, in winds of 4 mph out of the south southwest, at an altitude of 127 feet and in air having 78% humidity, a temperature of 74° F., and that the sound measured around the aerial vehicle 1610-3 is 80 dB at 900 Hz. Finally, the information or data 1650-4 of FIG. 16A indicates that the aerial vehicle 1610-4 is traveling on a course of 312° and at a speed of 48 mph, in winds of 8 mph out of the northwest, at an altitude of 151 feet and in air having 96 percent humidity and a temperature of 71° F., and that the sound measured around the aerial vehicle 1610-4 is 85 dB at 974 Hz. While the illustration in FIG. 16A only shows sound measurements for a single location on the aerial vehicle, it will be appreciated that the information or data 1655 may include sounds measured adjacent or near each propeller of each aerial vehicle. For example, if aerial vehicle 1610-1 includes eight propellers, it may also include eight sensors that measure sound data 1655. The operational information may also indicate the position for one or more propeller blade treatments of each propeller blade, the rotational speed, and/or the power draw required to generate the commanded lifting to aerially navigate the aerial vehicle.

Figure 16B:
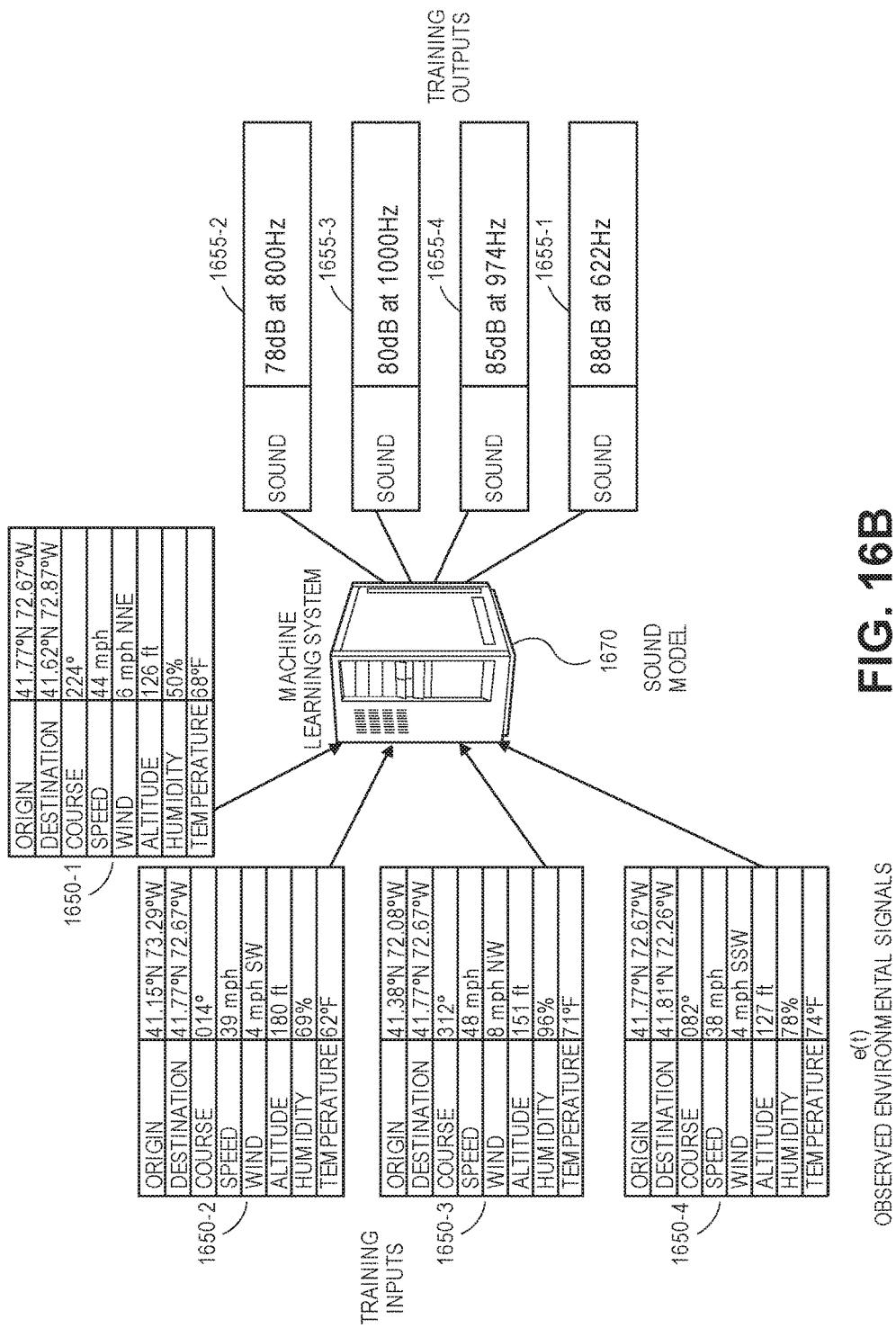

In accordance with the present disclosure, the aerial vehicles 1610-1, 1610-2, 1610-3, 1610-4 may be configured to provide both the extrinsic and intrinsic information or data 1650-1, 1650-2, 1650-3, 1650-4 (e.g., information or data regarding environmental conditions, operational characteristics or tracked positions of the aerial vehicles 1610-1, 1610-2, 1610-3, 1610-4), and also the information or data 1655-1, 1655-2, 1655-3, 1655-4 regarding the sounds recorded during the transits of the aerial vehicles 1610-1, 1610-2, 1610-3, 1610-4, to a data processing system. The information or data 1650-1, 1650-2, 1650-3, 1650-4 and the information or data 1655-1, 1655-2, 1655-3, 1655-4 may be provided to the data processing system either in real time or in near-real time while the aerial vehicles 1610-1, 1610-2, 1610-3, 1610-4 are in transit, or upon their arrival at their respective destinations. Referring to FIG. 16B, the extrinsic and intrinsic information or data 1650-1, 1650-2, 1650-3, 1650-4, e.g., observed environmental signals e(t), is provided to a machine learning system 1670 as a set of training inputs, and the information or data 1655-1, 1655-2, 1655-3, 1655-4, e.g., measured sound data, regarding the sounds recorded by each of the sensors during the transits of the aerial vehicles 1610-1, 1610-2, 1610-3, 1610-4 is provided to the machine learning system 1670 as a set of training outputs for each of the sound control systems of the aerial vehicle. As discussed above, the sound data will be included for each propeller blade treatment adjustment controller of the aerial vehicle.

The machine learning system 1670 may be fully trained using a substantial corpus of observed environmental signals e(t) correlated with measured sounds that are obtained using each of the sensors of one or more of the aerial vehicles 1610-1, 1610-2, 1610-3, 1610-4, and others, to develop sound models for each propeller blade treatment adjustment controller dependent on the location of the sensors on the aerial vehicles. After the machine learning system 1670 has been trained, and the sound models developed, the machine learning system 1670 may be provided with a set of extrinsic or intrinsic information or data (e.g., environmental conditions, operational characteristics, or positions) that may be anticipated in an environment in which an aerial vehicle is operating or expected to operate and the machine learning system 1670 will provide predicted sounds for each propeller blade treatment adjustment controller of the aerial vehicle. In some implementations, the machine learning system 1670 may reside and/or be operated on one or more computing devices or machines provided onboard one or more of the aerial vehicles 1610-1, 1610-2, 1610-3, and 1610-4. The machine learning system 1670 may receive information or data regarding the corpus of sound signals observed and the sounds measured by sensors of the other aerial vehicles 1610-1, 1610-2, 1610-3, 1610-4, for training purposes and, once trained, the machine learning system 1670 may receive extrinsic or intrinsic information or data that is actually observed by the aerial vehicle, e.g., in real time or in near-real time, as inputs and may generate outputs corresponding to predicted sounds based on the information or data.

In other implementations, the machine learning system 1670 may reside and/or be operated on one or more centrally located computing devices or machines. The machine learning system 1670 may receive information or data regarding the corpus of sounds measured by sensors of each of the aerial vehicles 1610-1, 1610-2, 1610-3, and 1610-4. Once the machine learning system 1670 is trained, the machine learning system 1670 may be used to program computing devices or machines of the aerial vehicles in a fleet with sound models that predict sounds at different propeller blade treatment adjustment controllers during operation of the aerial vehicle, based on extrinsic or intrinsic information or data that is actually observed by the respective aerial vehicle. In still other implementations, the machine learning system 1670 may be programmed to receive extrinsic or intrinsic information or data from operating aerial vehicles, e.g., via wireless means, as inputs. The machine learning system 1670 may then generate outputs corresponding to predicted sounds at different propeller blade treatment adjustment controllers on the aerial vehicle based on the received information or data and return such predicted sounds to the aerial vehicles. For example, the aerial vehicle and the machine learning system 1670 may exchange batches of information that is collected over a period of time. For example, an aerial vehicle may measure extrinsic and/or intrinsic information or data for a period of three seconds (or any other period of time) and transmit that measured information or data to the machine learning system 1670. The machine learning system, upon receiving the information or data, generates outputs corresponding to predicted sounds at different propeller blade treatment adjustment controllers on the aerial vehicle based on the received information or data and transmits those outputs to the aerial vehicle. The aerial vehicle may then use the received outputs to determine positions for one or more propeller blade treatments that cause the propeller blade to generate a corresponding anti-sound and produce a commanded lift when the propeller is rotated. Alternatively, or in addition thereto, the received outputs may be used by the aerial vehicle to determine positions for one or more propeller blade treatments that will result in the sound being dampened or otherwise altered (e.g., frequency spectrum changed). Likewise, in addition to altering propeller blade treatments, the shape of the propeller blade may also be adjusted. This process may continue while the aerial vehicle is in-flight or operational.

For example, when variables such as an origin, a destination, a speed and/or a planned altitude for the aerial vehicle 1610 (e.g., a transit plan for the aerial vehicle) are known, and where variables such as environmental conditions and operational characteristics may be known or estimated, such variables may be provided as inputs to the trained machine learning system 1670. Subsequently, sounds that may be predicted at each propeller and/or propeller blade treatment adjustment controller of the aerial vehicle 1610 as the aerial vehicle 1610 travels from the origin to the destination within such environmental conditions and according to such operational characteristics may be received from the trained machine learning system 1670 as outputs. From such outputs, positions of one or more propeller blade treatments, propeller blade shapes and rotational speeds may be determined that will alter the generated sound, e.g., generate an anti-sound, and/or dampen the generated sound. The adjustments may be determined and implemented in real time or near-real time as the aerial vehicle 1610 is en route from the origin to the destination.

Figure 16C:
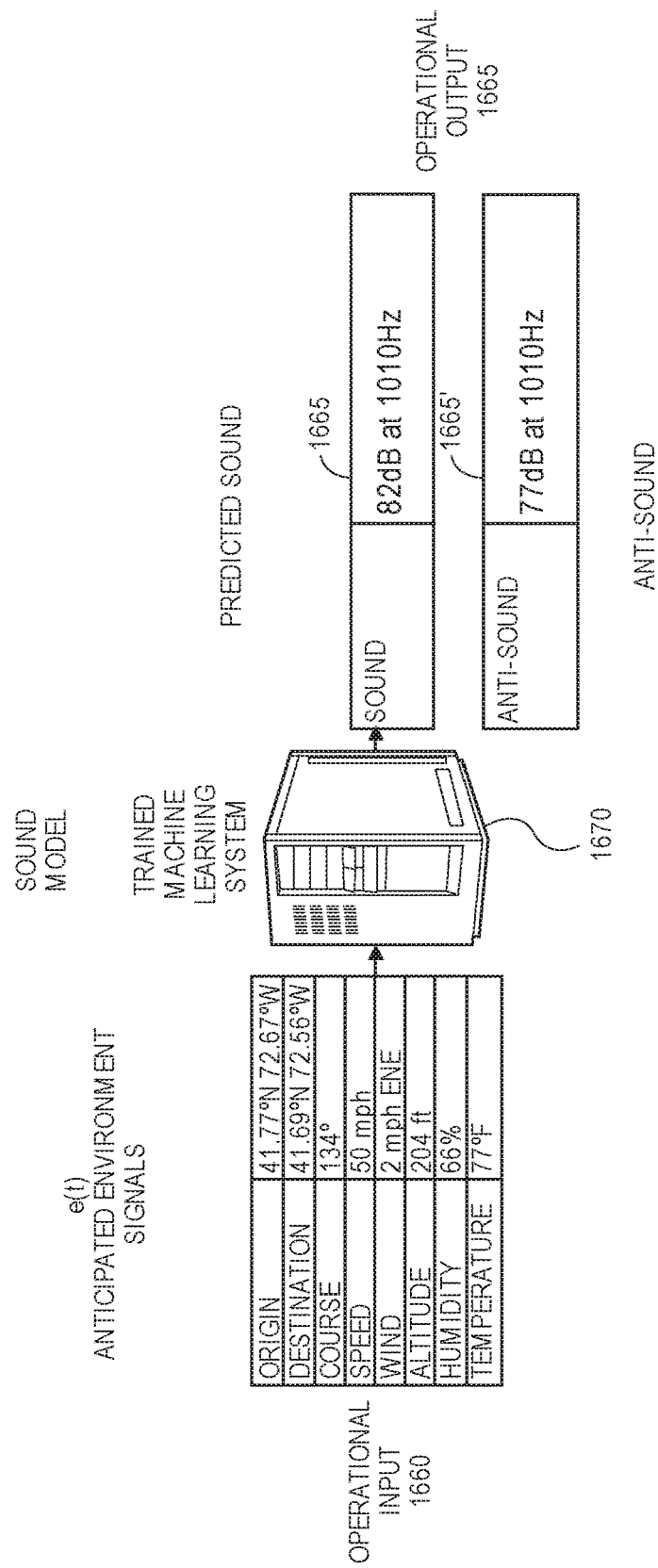

Referring to FIG. 16C, an operational input 1660 in the form of environmental signals e(t) is provided to the trained machine learning system 1670, and an operational output 1665 in the form of predicted sound is produced by the sound model and received from the trained machine learning system 1670. For example, the operational input 1660 may include extrinsic or intrinsic information or data regarding a planned transit of an aerial vehicle (e.g., predicted environmental or operational conditions), or extrinsic or intrinsic information or data regarding an actual transit of the aerial vehicle (e.g., actually observed or determined environmental or operational conditions), including but not limited to coordinates of an origin, a destination, or of any intervening points, as well as a course and a speed of the aerial vehicle, a wind velocity in a vicinity of the origin, the destination or one or more of the intervening points, an altitude at which the aerial vehicle is expected to travel, and a humidity level and a temperature in a vicinity of the origin, the destination or one or more of the intervening points. The operational output 1665 may include information regarding sounds at various propellers of the aerial vehicle that are expected to occur when the aerial vehicle operates in a manner consistent with the operational input 1660, e.g., when the aerial vehicle travels along a similar course or speed, or at a similar altitude, or encounters a similar wind velocity, humidity level, or temperature.

Based at least in part on the operational output 1665 that was determined based on the operational input 1660, an anti-sound 1665', e.g., a sound having an amplitude and frequency that is one hundred eighty degrees out-of-phase with the operational output 1665, is determined. In some implementations, the intensity of the anti-sound 1665' may be selected to completely cancel out or counteract the effects of the sounds associated with the operational output 1665, e.g., such that the intensity of the anti-sound 1665' equals the intensity of the predicted sound during operation of the aerial vehicle 1610, or of the sounds that actually occur. Alternatively, in some implementations, as illustrated in FIG. 16C, the intensity of the anti-sound 1665' may be selected to otherwise modify or counteract the effects of sound associated with the operational output 1665, e.g., such that the intensity of the anti-sound 1665' is less than the intensity of the predicted sound. In still other examples, rather than selecting propeller blade treatment positions and/or propeller blade shapes to generate an anti-sound, propeller blade treatment positions and/or propeller blade shapes may be selected to reduce and/or otherwise alter the generated sound.

Those of ordinary skill in the pertinent arts will recognize that any type or form of machine learning system (e.g., hardware and/or software components or modules) may be utilized in accordance with the present disclosure. For example, a sound may be associated with one or more of an environmental condition, an operating characteristic or a physical location or position of an aerial vehicle according to one or more machine learning algorithms or techniques, including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses. Using any of the foregoing algorithms or techniques, or any other algorithms or techniques, a relative association between measured sound and such environmental conditions, operating characteristics or locations of aerial vehicles may be determined.

In some implementations, a machine learning system may identify not only a predicted sound but also a confidence interval, confidence level or other measure or metric of a probability or likelihood that the predicted sound will occur at a propeller or other location on the frame of the aerial vehicle in a given environment that is subject to given operational characteristics at a given position. Where the machine learning system is trained using a sufficiently large corpus of recorded environmental signals and sounds, and a reliable sound model is developed, the confidence interval associated with an anti-sound or dampened sound identified thereby may be substantially high.

Although one variable that may be associated with sounds occurring at various propellers or other locations on a frame of an aerial vehicle is a position of the aerial vehicle (e.g., a latitude or longitude), and that extrinsic or intrinsic information or data associated with the position may be used to predict sounds occurring at propellers or other locations on the frame of the aerial vehicle at that position, those of ordinary skill in the pertinent arts will recognize that the systems and methods of the present disclosure are not so limited. Rather, sounds may be predicted for areas or locations having similar environmental conditions or requiring aerial vehicles to exercise similar operational characteristics. For example, because environmental conditions in Vancouver, British Columbia, and in London, England, are known to be generally similar to one another, information or data gathered regarding the sounds occurring at various propellers or other locations on the frame of aerial vehicles operating in the Vancouver area may be used to predict sounds that may occur at propellers or other locations on the frame of aerial vehicles operating in the London area, or to generate anti-sounds to be output by different propellers having different positions of propeller blade treatments and rotating at different speeds when operating in the London area. Likewise, information or data gathered regarding the sounds occurring at propellers or other locations on the frame of aerial vehicles operating in the London area may be used to predict sounds occurring at propellers or other locations on the frame of aerial vehicles operating in the Vancouver area, or to generate anti-sounds or dampened sounds to be output by different propellers having different positions of propeller blade treatments and rotating at different speeds when operating in the Vancouver area.

In accordance with the present disclosure, a trained machine learning system may be used to develop sound profiles for different propeller blades having different propeller blade treatments and/or for different positions of adjustable propeller blade treatments and/or different propeller blade shapes, and when operating at different rotational speeds for different aerial vehicles based on the sizes, shapes, or configurations of the aerial vehicles, and with respect to environmental conditions, operational characteristics, and/or locations of such aerial vehicles. Based on such sound profiles, anti-sounds may be determined for propeller blade treatment adjustment controllers located on such aerial vehicles as a function of the respective environmental conditions, operational characteristics or locations and output on an as-needed basis. The propeller blade treatment adjustment controllers may utilize the determined anti-sounds and commanded lift for a propeller to select positions of one or more propeller blade treatments and rotational speed that will generate the determined anti-sound and corresponding commanded lift.

Figure 16D:
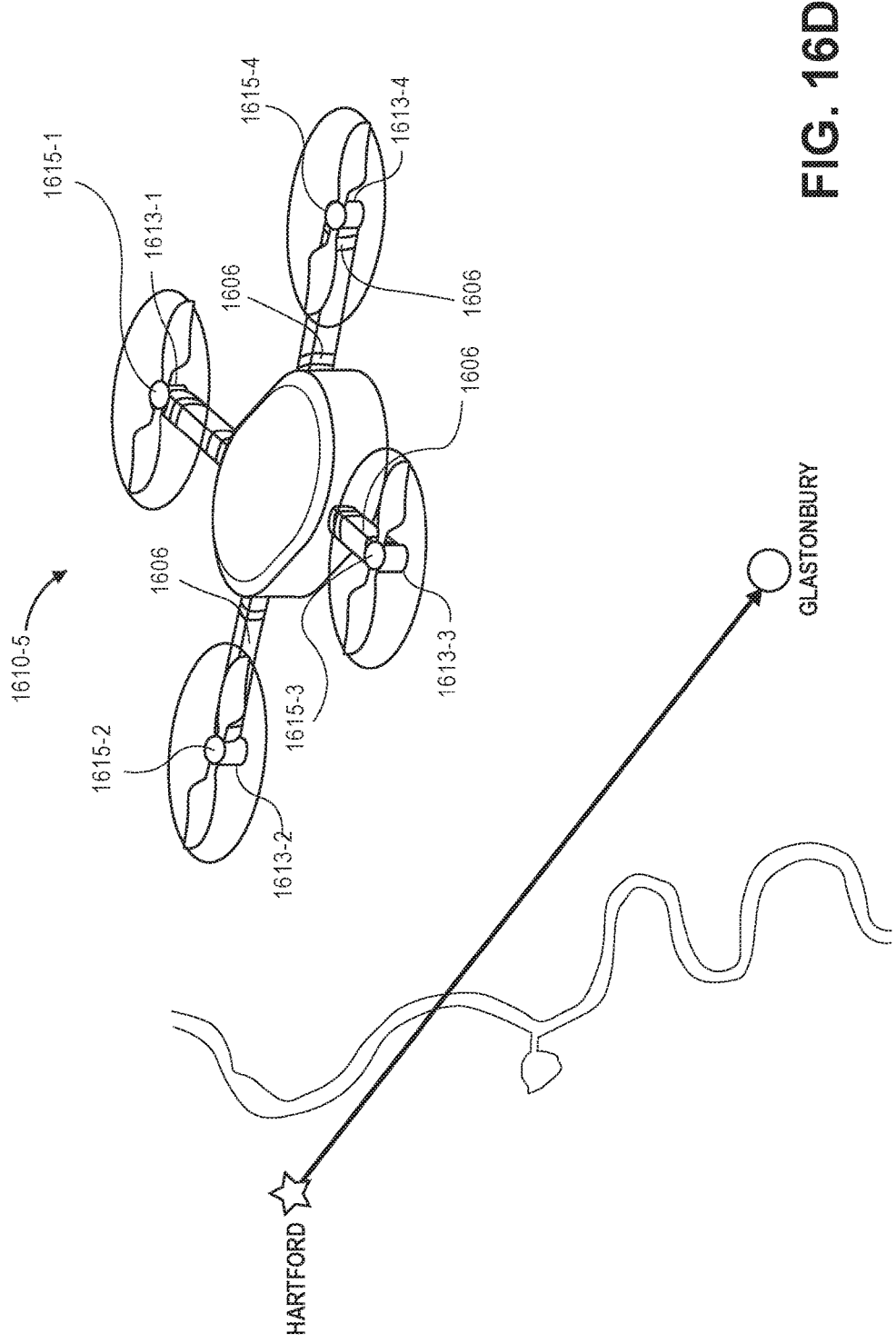

Referring to FIG. 16D, an aerial vehicle 1610-5, including a plurality of propellers 1613-1, 1613-2, 1613-3, 1613-4 and a plurality of motors 1615-1, 1615-2, 1615-3, 1615-4 is shown en route from Hartford to Glastonbury, Conn. Each propeller 1613 may generate the same or different sounds and sounds measured by sensors 1606 at different locations on the aerial vehicle may be similar or different. To cancel out, reduce, and/or otherwise alter the measured sounds, an anti-sound is determined and positions for one or more propeller blade treatments and a corresponding propeller speed are determined that will cause the propeller to generate the determined anti-sound when the propeller is rotated. As discussed above, the anti-sound may be determined based on actual sound measurements determined by sensors positioned on the aerial vehicle and/or the anti-sounds may be predicted based on intrinsic or extrinsic information or data. Likewise, the propeller blade treatments on each propeller 1613-1, 1613-2, 1613-3, 1613-4 may be adjusted independently, may be adjusted differently, the propellers may rotate at different speeds, and/or generate different anti-sounds. In some implementations, rather than, or in addition to selecting propeller blade treatment positions to generate an anti-sound, propeller blade treatment positions may be elected to dampen or otherwise alter (e.g., alter the frequency spectrum) the predicted and/or measured sounds. Likewise, the propeller shape may be adjusted to generate an anti-sound and/or to dampen or otherwise alter a generated sound.

Figure 17:
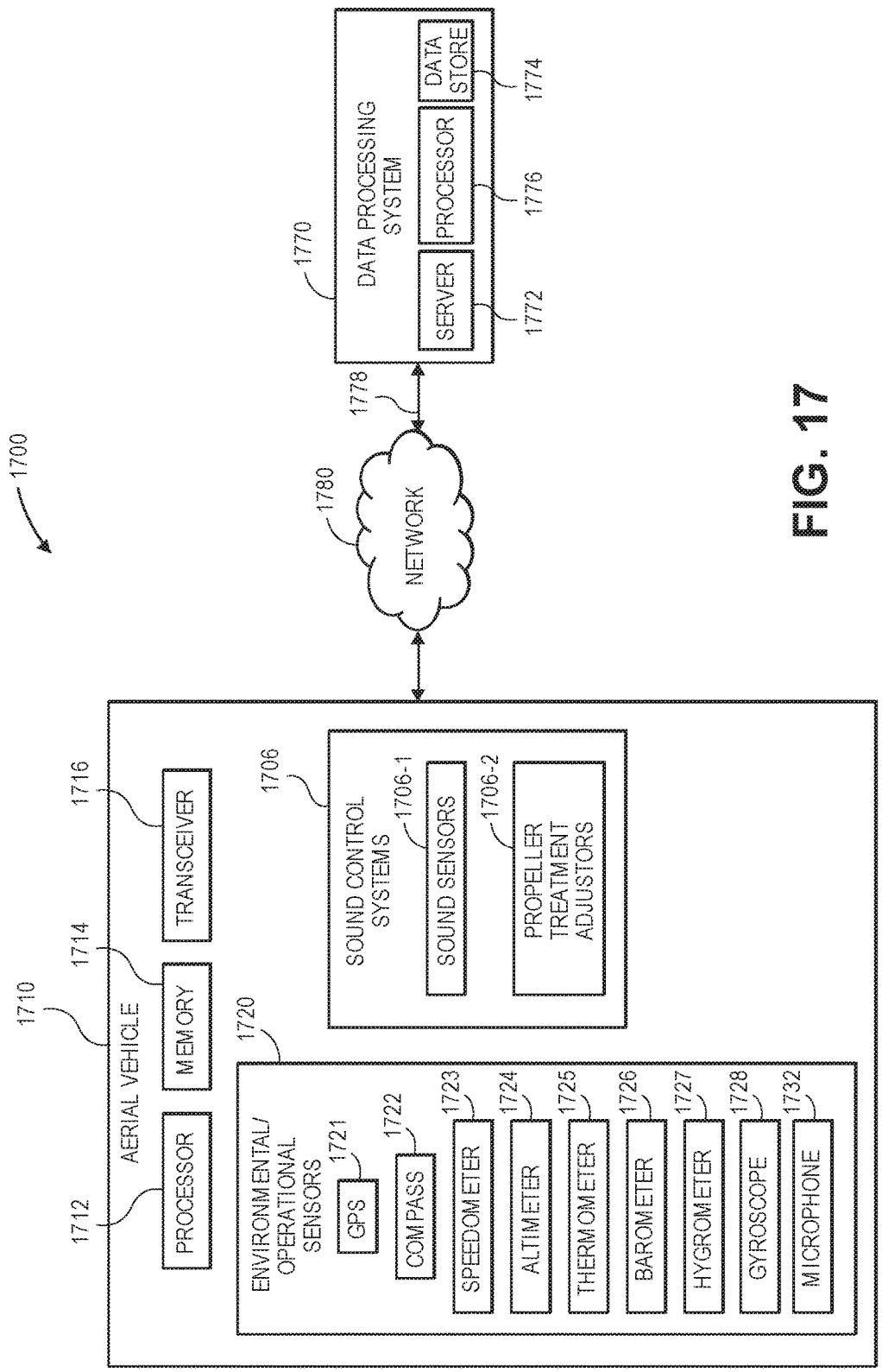
FIG. 17 is a block diagram of one system for active airborne sound control, according to an implementation.

Referring to FIG. 17, illustrated is a block diagram of components of one system 1700 for active sound control, in accordance with an implementation. The system 1700 of FIG. 17 includes an aerial vehicle 1710 and a data processing system 1770 connected to one another over a network 1780. The aerial vehicle 1710 includes a processor 1712, a memory 1714 and a transceiver 1716, as well as a plurality of environmental or operational sensors 1720 and a plurality of sound control systems 1706. Each sound control system may include a propeller blade treatment adjustment controller 1706-2 and optionally a sound sensor 1706-1.

The processor 1712 may be configured to perform any type or form of computing function, including but not limited to the execution of one or more machine learning algorithms or techniques. For example, the processor 1712 may control any aspects of the operation of the aerial vehicle 1710 and the one or more computer-based components thereon, including but not limited to the transceiver 1716, the environmental or operational sensors 1720, and/or the sound control systems 1706. The aerial vehicle 1710 may likewise include one or more control systems (not shown) that may generate instructions for conducting operations thereof, e.g., for operating one or more rotors, motors, rudders, ailerons, flaps or other components provided thereon. Such control systems may be associated with one or more other computing devices or machines, and may communicate with the data processing system 1770 or one or more other computer devices (not shown) over the network 1780, through the sending and receiving of digital data. The aerial vehicle 1710 further includes one or more memory or storage components 1714 for storing any type of information or data, e.g., instructions for operating the aerial vehicle, or information or data captured by one or more of the environmental or operational sensors 1720 and/or the sound sensors 1706-1.

The transceiver 1716 may be configured to enable the aerial vehicle 1710 to communicate through one or more wired or wireless means, e.g., wired technologies such as Universal Serial Bus (or "USB") or fiber optic cable, or standard wireless protocols, such as Bluetooth® or any Wireless Fidelity (or "Wi-Fi") protocol, such as over the network 1780 or directly.

The environmental or operational sensors 1720 may include any components or features for determining one or more attributes of an environment in which the aerial vehicle 1710 is operating, or may be expected to operate, including extrinsic information or data or intrinsic information or data. As is shown in FIG. 17, the environmental or operational sensors 1720 may include, but are not limited to, a Global Positioning System ("GPS") receiver or sensor 1721, a compass 1722, a speedometer 1723, an altimeter 1724, a thermometer 1725, a barometer 1726, a hygrometer 1727, a gyroscope 1728, and/or a microphone 1732. The GPS sensor 1721 may be any device, component, system or instrument adapted to receive signals (e.g., trilateration data or information) relating to a position of the aerial vehicle 1710 from one or more GPS satellites of a GPS network (not shown). The compass 1722 may be any device, component, system, or instrument adapted to determine one or more directions with respect to a frame of reference that is fixed with respect to the surface of the Earth (e.g., a pole thereof). The speedometer 1723 may be any device, component, system, or instrument for determining a speed or velocity of the aerial vehicle 1710, and may include related components (not shown) such as pitot tubes, accelerometers, or other features for determining speeds, velocities, or accelerations.

The altimeter 1724 may be any device, component, system, or instrument for determining an altitude of the aerial vehicle 1710, and may include any number of barometers, transmitters, receivers, range finders (e.g., laser or radar) or other features for determining heights. The thermometer 1725, the barometer 1726 and the hygrometer 1727 may be any devices, components, systems, or instruments for determining local air temperatures, atmospheric pressures, or humidities within a vicinity of the aerial vehicle 1710. The gyroscope 1728 may be any mechanical or electrical device, component, system, or instrument for determining an orientation, e.g., the orientation of the aerial vehicle 1710. For example, the gyroscope 1728 may be a traditional mechanical gyroscope having at least a pair of gimbals and a flywheel or rotor. Alternatively, the gyroscope 1728 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 1710. The microphone 1732 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphone 1732 may also be provided as a discrete component, or in combination with one or more other components, e.g., an imaging device, such as a digital camera. Furthermore, the microphone 1732 may be configured to detect and record acoustic energy from any and all directions.

Those of ordinary skill in the pertinent arts will recognize that the environmental or operational sensors 1720 may include any type or form of device or component for determining an environmental condition within a vicinity of the aerial vehicle 1710 in accordance with the present disclosure. For example, the environmental or operational sensors 1720 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), altitude indicators, depth gauges, accelerometers or the like, as well as one or more imaging devices (e.g., digital cameras), and are not limited to the sensors 1721, 1722, 1723, 1724, 1725, 1726, 1727, 1728, 1732 shown in FIG. 17.

The data processing system 1770 includes one or more physical computer servers 1772 having a plurality of data stores 1774 associated therewith, as well as one or more computer processors 1776 provided for any specific or general purpose. For example, the data processing system 1770 of FIG. 17 may be independently provided for the exclusive purpose of receiving, analyzing or storing sounds, propeller blade treatment positions, corresponding lifting forces, and/or other information or data received from the aerial vehicle 1710 or, alternatively, provided in connection with one or more physical or virtual services configured to receive, analyze or store such sounds, information or data, as well as one or more other functions. The servers 1772 may be connected to or otherwise communicate with the data stores 1774 and the processors 1776. The data stores 1774 may store any type of information or data, including but not limited to sound information or data, and/or information or data regarding environmental conditions, operational characteristics, or positions, for any purpose. The servers 1772 and/or the computer processors 1776 may also connect to or otherwise communicate with the network 1780, as indicated by line 1778, through the sending and receiving of digital data. For example, the data processing system 1770 may include any facilities, stations or locations having the ability or capacity to receive and store information or data, such as media files, in one or more data stores, e.g., media files received from the aerial vehicle 1710, or from one another, or from one or more other external computer systems (not shown) via the network 1780. In some implementations, the data processing system 1770 may be provided in a physical location. In other such implementations, the data processing system 1770 may be provided in one or more alternate or virtual locations, e.g., in a "cloud"-based environment. In still other implementations, the data processing system 1770 may be provided onboard one or more aerial vehicles, including but not limited to the aerial vehicle 1710.

The network 1780 may be any wired network, wireless network, or combination thereof, and may comprise the Internet in whole or in part. In addition, the network 1780 may be a personal area network, local area network, wide area network, cable network, satellite network, cellular telephone network, or combination thereof. The network 1780 may also be a publicly accessible network of linked networks, possibly operated by various distinct parties, such as the Internet. In some implementations, the network 1780 may be a private or semi-private network, such as a corporate or university intranet. The network 1780 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 1710 or the data processing system 1770 may use any web-enabled or Internet applications or features, or any other client-server applications or features including E-mail or other messaging techniques, to connect to the network 1780, or to communicate with one another, such as through short or multimedia messaging service (SMS or MMS) text messages. For example, the aerial vehicle 1710 may be adapted to transmit information or data in the form of synchronous or asynchronous messages to the data processing system 1770 or to any other computer device in real time or in near-real time, or in one or more offline processes, via the network 1780. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 1712 or the processor 1776, or any other computers or control systems utilized by the aerial vehicle 1710 or the data processing system 1770, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or include signals that may be downloaded through the Internet or other networks.

Figure 18:
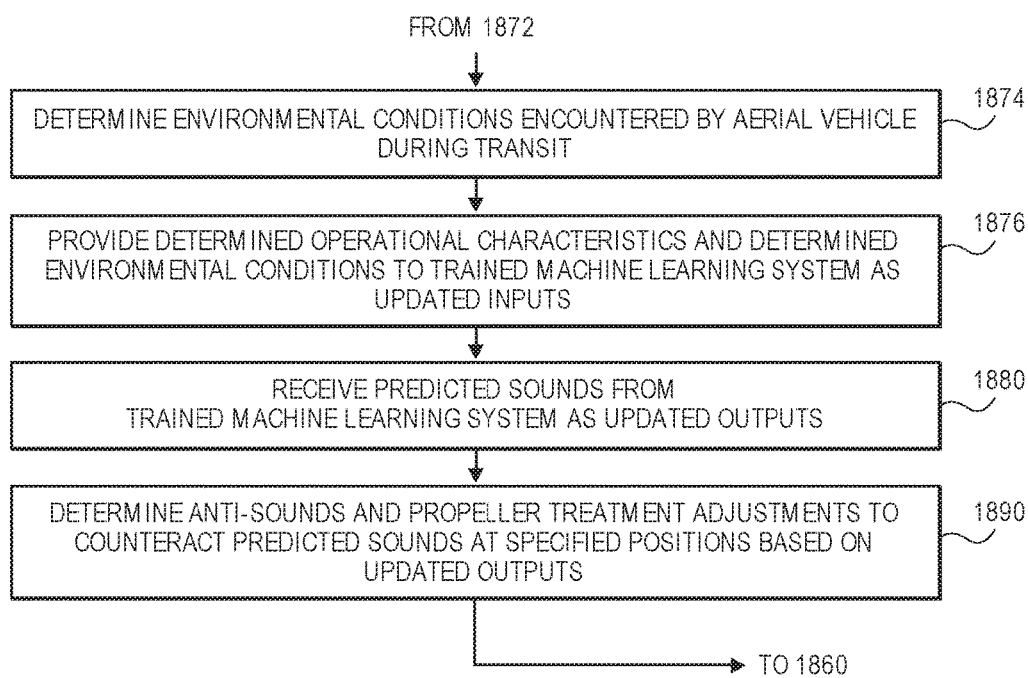
FIG. 18 is a flow diagram illustrating an example process for active airborne sound control, according to an implementation.

FIG. 18 illustrates an example process 1800 for active airborne sound control, according to an implementation. The example process 1800 begins by determining a destination of an aerial vehicle, as in 1810. A transit plan may then be determined for transit of the aerial vehicle from an origin to the destination, as in 1820. For example, the transit plan may specify an estimated time of departure from the origin, locations of any waypoints between the origin and the destination, a desired time of arrival at the destination, or any other relevant geographic or time constraints associated with the transit. Operational characteristics of the aerial vehicle that are required in order to complete the transit from the origin to the destination in accordance with the transit plan, e.g., courses or speeds of the aerial vehicle, and corresponding instructions to be provided to such motors, rotors, rudders, ailerons, flaps or other features of the aerial vehicle in order to achieve such courses or speeds, may be predicted, as in 1822. Environmental conditions expected to be encountered during the transit from the origin to the destination in accordance with the transit plan may also be predicted, as in 1824. For example, weather forecasts for the times or dates of the departure or the arrival of the aerial vehicle, and for the locations of the origin or the destination, may be identified on any basis.

The transit plan identified, the predicted operational characteristics, and the predicted environmental conditions are provided to a trained machine learning system as initial inputs, as in 1826. The machine learning system may utilize one or more algorithms or techniques, such as nearest neighbor methods or analyses, factorization methods or techniques, K-means clustering analyses or techniques, similarity measures, such as log likelihood similarities or cosine similarities, latent Dirichlet allocations or other topic models, or latent semantic analyses, and may be trained to associate environmental, operational or location-based information with sounds at the propellers or other locations on the frame of the aerial vehicle. In some implementations, the trained machine learning system resides and/or operates on one or more computing devices or machines provided onboard the aerial vehicle. In some other implementations, the trained machine learning system resides in one or more alternate or virtual locations, e.g., in a "cloud"-based environment accessible via a network.

The predicted sounds are received from the machine learning system as outputs for each respective propeller blade treatment adjustment controller located at the propellers or other locations on the frame of the aerial vehicle, as in 1830. Such sounds may be average or general sounds anticipated at each propeller for the entire transit of the aerial vehicle from the origin to the destination in accordance with the transit plan, or may change or vary based on the predicted location of the aerial vehicle, a time between the departure of the aerial vehicle from the origin and an arrival of the aerial vehicle at the destination, and/or based on the position of the sensor on the frame of the aerial vehicle. Alternatively, or additionally, the machine learning system may also determine a confidence interval, a confidence level or another measure or metric of a probability or likelihood that the predicted sound for each propeller blade treatment adjustment controller will occur in a given environment that is subject to given operational characteristics at a given position.

Based on the predicted sound, anti-sounds intended to counteract the predicted sound at each propeller blade treatment adjustment controller are determined, as in 1840. Based on the anti-sound, positions of one or more propeller blade treatments and a rotational speed are determined that will cause the propeller blade adjacent the propeller blade treatment adjustment controller to generate the anti-sound and satisfy the operational characteristics when the aerial vehicle is within a vicinity of the given location in accordance with the transit plan, as in 1845. In some implementations, the power draw for different configurations of propeller blade treatment positions that will generate the same lifting force and anti-sound may be considered in determining positions for the propeller blade treatments for use in generating the anti-sound.

In some implementations, the predicted sound may be compared to an allowable sound level and/or allowable frequency spectrum of amplitudes defined for the aerial vehicle at each given location and a determination made as to whether the predicted sound needs to be altered such that it is below the allowable sound level and/or within an allowable frequency range. If it is determined that the predicted sound is to be altered, propeller blade treatment positions that will generate an appropriate anti-sound may be determined, as discussed above. Alternatively, or in addition thereto, propeller blade treatment positions that will result in the predicted sound being dampened to a point below the allowable sound level and/or the frequency spectrum being adjusted such that amplitudes within the allowable frequency range may be determined.

The aerial vehicle departs from the origin to the destination, as in 1850, and each propeller blade treatment adjustment controller of the aerial vehicle adjusts the position of one or more propeller blade treatments of a corresponding propeller to correspond to the determined positions for the propeller blade treatments at specific positions during the transit from the origin to the destination. For example, the aerial vehicle may monitor its position during the transit using one or more GPS receivers or sensors and send instructions or provide position information to each propeller blade treatment adjustment controller. In response, each propeller blade treatment adjustment controller will cause the position of one or more propeller blade treatments to be altered to generate an anti-sound corresponding to each position and/or to dampen or otherwise alter the generated sound, as in 1860. A determination is then made as to whether the aerial vehicle has arrived at the destination, as in 1870. If the aerial vehicle has arrived at the destination, the example process 1800 completes.

If the aerial vehicle has not yet arrived at the destination, however, then the example process 1800 determines the actual operational characteristics of the aerial vehicle during the transit, as in 1872. For example, information or data regarding the actual courses or speeds of the aerial vehicle, and the operational actions, events or instructions that caused the aerial vehicle to achieve such courses or speeds, may be captured and recorded in at least one data store, which may be provided onboard the aerial vehicle, or in one or more alternate or virtual locations, e.g., in a cloud-based environment accessible via a network. Environmental conditions encountered by the aerial vehicle during the transit are also determined, as in 1874. For example, information or data regarding the actual wind velocities, humidity levels, temperatures, precipitation or any other environmental events or statuses within the vicinity of the aerial vehicle may also be captured and recorded in at least one data store.

The information or data regarding the determined operational characteristics and environmental conditions are provided to the trained machine learning system as updated inputs, in real time or in near-real time, as in 1876. In some implementations, values corresponding to the operational characteristics or environmental conditions are provided to the trained machine learning system. In some other implementations, values corresponding to differences or differentials between the determined operational characteristics or the determined environmental conditions and the predicted operational characteristics or the predicted environmental conditions may be provided to the trained machine learning system.

Based on the determined operational characteristics and/or determined environmental conditions, predicted sounds for each sound control are received from the trained machine learning system as updated outputs, as in 1880. As discussed above, sounds predicted to occur at each propeller blade treatment adjustment controller may be predicted in accordance with a transit plan for the aerial vehicle, and anti-sounds determined based on such predicted sounds may be determined based on the transit plan, as well as any other relevant information or data regarding the transit plan, including attributes of an origin, a destination or any intervening waypoints, such as locations, topography, population densities or other criteria. Anti-sounds for counteracting the predicted sounds received from the trained machine learning system based on the updated outputs are determined before the process returns to box 1860, where the position of one or more propeller blade treatments may be adjusted so that the updated anti-sounds are generated by the propellers, as in 1890. As discussed above, rather than, or in addition to generating anti-sounds, propeller blade treatment positions may be determined that will dampen or otherwise alter the updated predicted sounds.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language, such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle comprising:
   a motor configured to rotate a propeller such that the propeller generates a lifting force;
   the propeller including:
      a hub that is coupled to the motor so that the motor can rotate the propeller;
      a propeller blade extending from the hub, the propeller blade including:
         a leading edge;
         a tip;
         a trailing edge; and
         a fringe extending from the trailing edge of the propeller blade;
   a controller configured to alter a position of the fringe; and
   a sensor configured to monitor a sound generated around the aerial vehicle;
   wherein the controller alters the position of the fringe at a speed based at least in part on the sound.

2. The aerial vehicle of claim 1, wherein the controller includes:
   an adjustment arm that extends along the propeller blade and is affixed to the fringe such that:
      when the adjustment arm is in a first adjustment arm position, the fringe is in a first fringe position, and
      when the adjustment arm is in a second adjustment arm position, the fringe is in a second fringe position that is different than the first fringe position.

3. The aerial vehicle of claim 2,
   wherein the controller alters the position of the fringe by moving the adjustment arm between the first adjustment arm position and the second adjustment arm position at the speed based at least in part on the sound.

4. The aerial vehicle of claim 2, wherein:
   the fringe is retracted into the propeller blade when the adjustment arm is in the first adjustment arm position; and the fringe is extended beyond the trailing edge of the propeller blade when the adjustment arm is in the second adjustment arm position.

5. The aerial vehicle of claim 1, wherein:
a sound generated by the propeller blade is dampened by the fringe disrupting air passing the propeller blade.

6. A propeller blade, comprising:
a hub;
a tip;
a surface area that extends between the hub and the tip, the surface area having an upper side, a lower side, a leading edge that extends between the hub and the tip, and a trailing edge;
a fringe coupled along the trailing edge of the propeller blade; and
a controller configured to alter a position of the fringe at a speed based at least in part on a sound generated around the propeller blade.

7. The propeller blade of claim 6,
wherein the controller is configured to alter the position of the fringe between a retracted position and an extended position, wherein:
the fringe is retracted into the propeller blade when in the retracted position;
the fringe extends beyond the trailing edge of the propeller blade when in the extended position;
the propeller blade generates a first sound and has a first drag when rotating and the fringe is in the retracted position;
the propeller blade generates a second sound and has a second drag when rotating and the fringe is in the extended position;
the second sound is different than the first sound; and
the second drag is different than the first drag.

8. The propeller blade of claim 6, further comprising:
a second fringe coupled along a first portion of the trailing edge of the propeller blade that extends from the hub of the propeller blade; and
wherein the fringe is coupled to a second portion of the propeller blade that extends along the trailing edge of the propeller blade from the first portion toward the tip of the propeller blade.

9. The propeller blade of claim 8,
wherein the controller is configured to alter the position of at least one of the fringe or the second fringe.

10. The propeller blade of claim 8, wherein the fringe is formed of a first material and the second fringe is formed of a second material that is different than the first material.

11. The propeller blade of claim 6, wherein at least one of a shape or a length of the fringe varies.

12. The propeller blade of claim 6, wherein the fringe includes a plurality of fibers that extend from the trailing edge of the propeller blade.

13. The propeller blade of claim 12, wherein:
the fibers are configured to flex in a vertical direction with a rotation of the propeller blade; and
the fibers are configured to flex in a horizontal direction to a position in which they are aligned with a rotational direction of the propeller blade.

14. The propeller blade of claim 12, wherein:
a first fiber of the plurality of fibers includes a first shape, a first length, a first curvature, a first diameter, and is formed of a first material;
a second fiber of the plurality of fibers includes a second shape, a second length, a second curvature, a second diameter, and is formed of a second material; and
wherein at least one of:

the first shape and the second shape are different;
the first length and the second length are different;
the first curvature and the second curvature are different;
the first diameter and the second diameter are different; or
the first material and the second material are different.

15. An aerial vehicle, comprising:
a frame;
a motor coupled to the frame;
a propeller coupled to and rotatable by the motor;
a first fringe positioned on the propeller, wherein a sound generated by the propeller when the propeller is rotating is altered based at least in part on a position of the first fringe;
a second fringe positioned on the propeller, wherein the sound generated by the propeller when the propeller is rotating is further altered based at least in part on a position of the second fringe; and
a controller configured to send instructions to alter a position of at least one of the first fringe or the second fringe; and
wherein the instructions are based at least in part on a determination by the controller that the aerial vehicle is below a defined altitude.

16. The aerial vehicle of claim 15, wherein:
the first fringe extends from a first portion of a trailing edge of the propeller and is positioned toward a tip of the propeller such that the first fringe alters a sound generated by a tip vortex resulting from the rotation of the propeller; and
the second fringe extends from a second portion of the trailing edge of the propeller and alters sound generated by air passing across the propeller when the propeller is rotating.

17. The aerial vehicle of claim 15, wherein the first fringe and the second fringe are each formed of a fibrous material that flexes during rotation of the propeller.

18. The aerial vehicle of claim 15,
wherein the controller is configured to cause the position of at least one of the first fringe or the second fringe to be altered while the propeller is rotating.

19. The aerial vehicle of claim 15, further comprising:
a navigation component configured to determine an altitude of the aerial vehicle; and
wherein the controller is in communication with the navigation component.

20. The aerial vehicle of claim 15, wherein:
the first fringe may be moved between a first retracted position in which the first fringe is retracted into the propeller and a first extended position in which the first fringe extends beyond a trailing edge of the propeller;
the second fringe may be moved between a second retracted position in which the second fringe is retracted into the propeller and a second extended position in which the second fringe extends beyond the trailing edge of the propeller;
the controller sends instructions that cause at least one of the first fringe or the second fringe to move to the first extended position or the second extended position, respectively, when it is determined that the aerial vehicle is below the defined altitude;
sound generated by a tip vortex resulting from the rotation of the propeller is altered when the first fringe is in the first extended position; and sound generated by air passing the propeller when the propeller is rotating is altered when the second fringe is in the second extended position.

* * * * *